United States Patent
Takanohashi et al.

(10) Patent No.: US 11,681,051 B2
(45) Date of Patent: Jun. 20, 2023

(54) RECEPTION APPARATUS AND RECEPTION METHOD

(71) Applicant: Sony Semiconductor Solutions Corporation, Kanagawa (JP)

(72) Inventors: Kazukuni Takanohashi, Tokyo (JP); Tetsuhiro Futami, Kanagawa (JP); Katsuyuki Tanaka, Kanagawa (JP); Hideki Awata, Gunma (JP); Shinji Inoue, Kanagawa (JP); Tsunetomo Nakazato, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 187 days.

(21) Appl. No.: 17/276,311

(22) PCT Filed: Jun. 5, 2019

(86) PCT No.: PCT/JP2019/022311
§ 371 (c)(1),
(2) Date: Mar. 15, 2021

(87) PCT Pub. No.: WO2020/059219
PCT Pub. Date: Mar. 26, 2020

(65) Prior Publication Data
US 2022/0035046 A1    Feb. 3, 2022

(30) Foreign Application Priority Data
Sep. 21, 2018   (JP) .............................. JP2018-176742

(51) Int. Cl.
*G01S 19/24*    (2010.01)
*G01S 19/30*    (2010.01)
(Continued)

(52) U.S. Cl.
CPC ............ *G01S 19/243* (2013.01); *G01S 19/30* (2013.01); *G01S 19/37* (2013.01); *H04B 1/7073* (2013.01)

(58) Field of Classification Search
CPC .............................. G01S 19/243; G01S 19/24
See application file for complete search history.

(56) References Cited

U.S. PATENT DOCUMENTS

| 5,812,087 A | * | 9/1998 | Krasner | ................ | G01S 19/258 |
| | | | | | 701/532 |
| 6,380,891 B1 | * | 4/2002 | Yamashita | .............. | G01S 19/24 |
| | | | | | 375/324 |

(Continued)

FOREIGN PATENT DOCUMENTS

| JP | H11304899 A | 11/1999 |
| JP | 2011506974 A | 3/2011 |

(Continued)

OTHER PUBLICATIONS

International Search Report (PCT/ISA/210), International Application No. PCT/JP2019/022311, dated Jun. 5, 2019.

*Primary Examiner* — Gregory C. Issing
(74) *Attorney, Agent, or Firm* — Michael Best & Friedrich LLP

(57) ABSTRACT

The presence or absence of a preamble is detected with accuracy in a reception apparatus that receives a signal including a preamble.
A reception section receives a subframe including a subframe preamble and a message and a frame including a frame preamble. A processing section performs a process of detecting the presence or absence of the subframe preamble according to whether or not a given relation holds between a reception timing of the subframe preamble and a reception timing of the frame preamble. A message decoding section (Continued)

extracts the message from the subframe and decodes the message in a case where the presence of the subframe preamble is detected.

20 Claims, 40 Drawing Sheets

(51) Int. Cl.
*G01S 19/37* (2010.01)
*H04B 1/7073* (2011.01)

(56) References Cited

U.S. PATENT DOCUMENTS

| | | | | |
|---|---|---|---|---|
| 7,447,253 | B2* | 11/2008 | Abraham | G01S 19/24 |
| | | | | 342/357.23 |
| 7,453,926 | B2* | 11/2008 | Chen | G01S 19/24 |
| | | | | 375/364 |
| 2001/0033627 | A1 | 10/2001 | Syrjarinne | |
| 2009/0021427 | A1* | 1/2009 | Tsai | G01S 19/235 |
| | | | | 342/357.62 |
| 2015/0078249 | A1* | 3/2015 | Hoang | G01S 19/243 |
| | | | | 370/316 |

FOREIGN PATENT DOCUMENTS

| | | | |
|---|---|---|---|
| JP | 2012073083 | A | 4/2012 |
| JP | 2015068767 | A | 4/2015 |
| JP | 2015206695 | A | 11/2015 |

* cited by examiner

F I G . 9
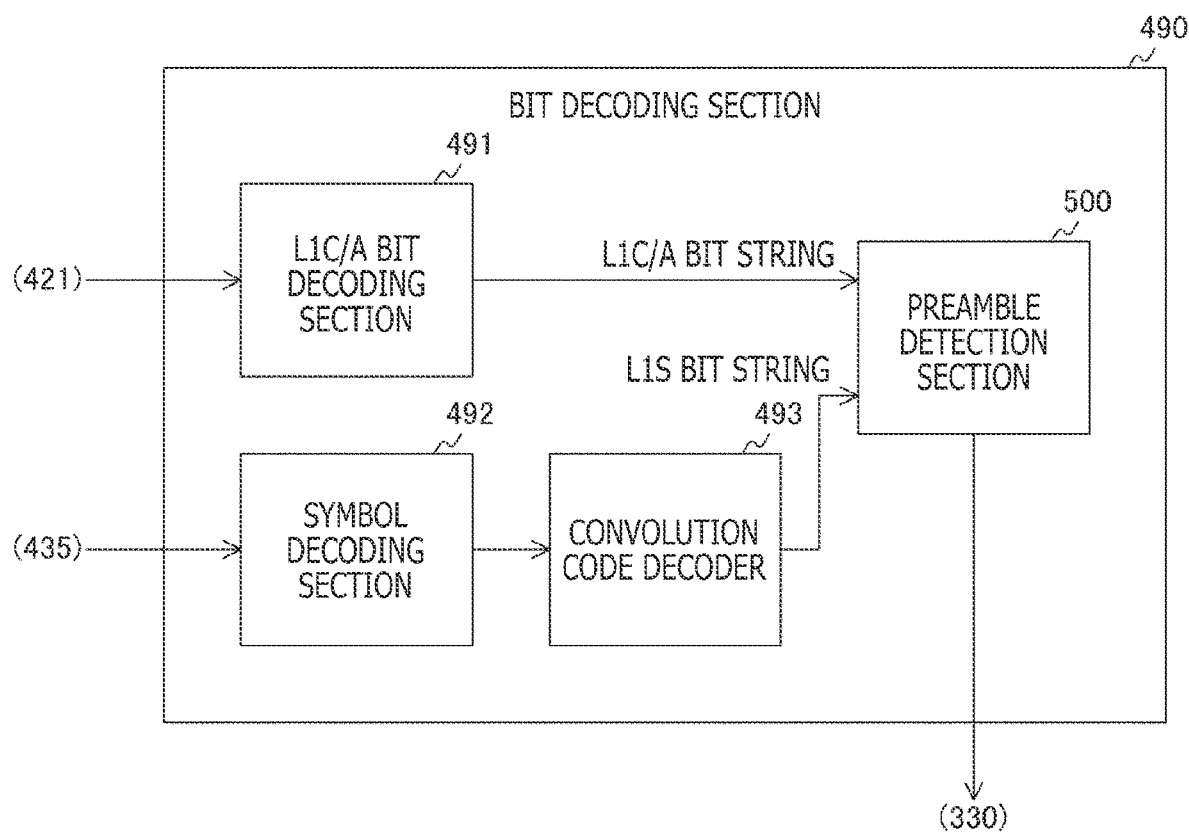

F I G . 1 7
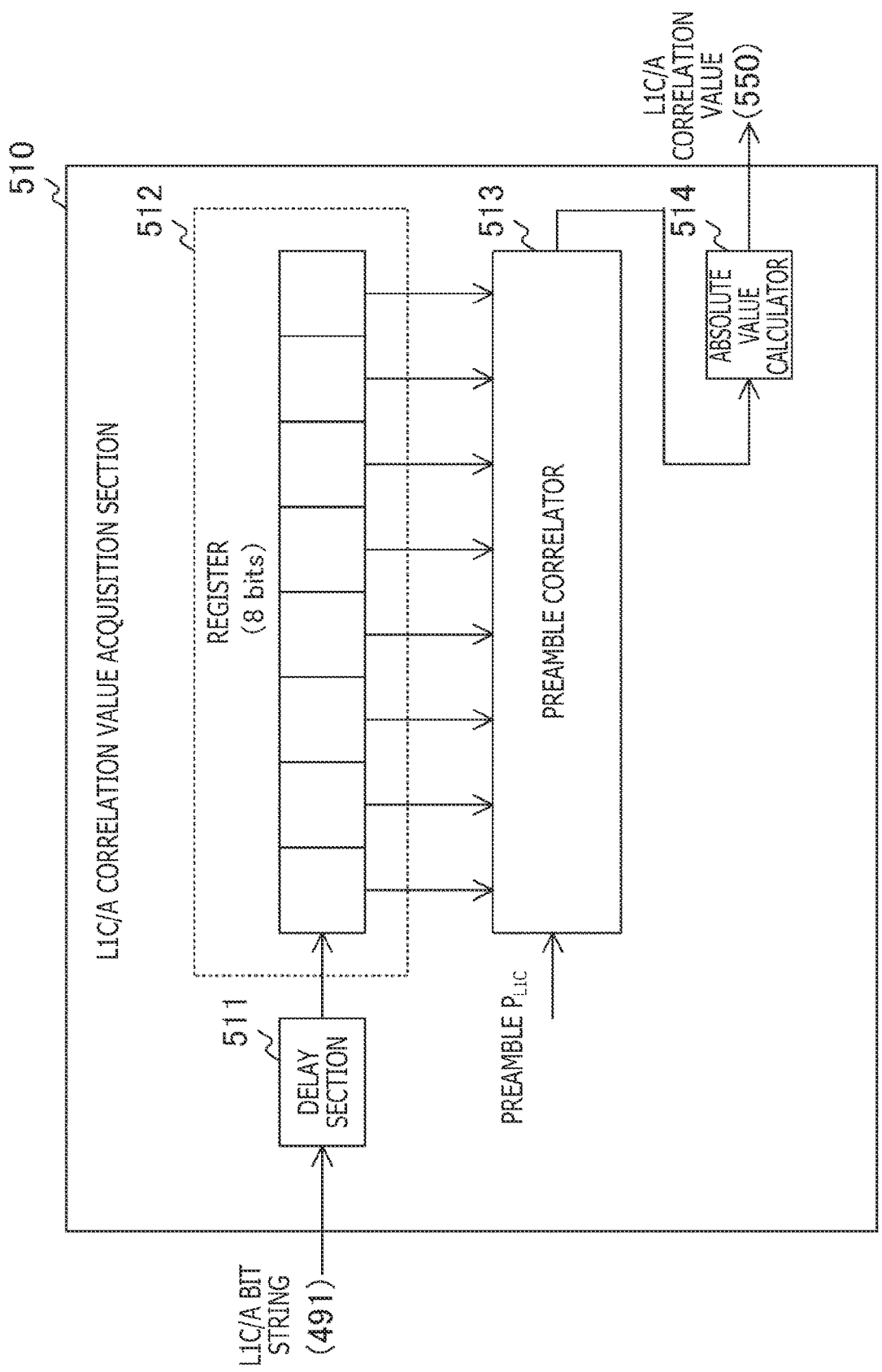

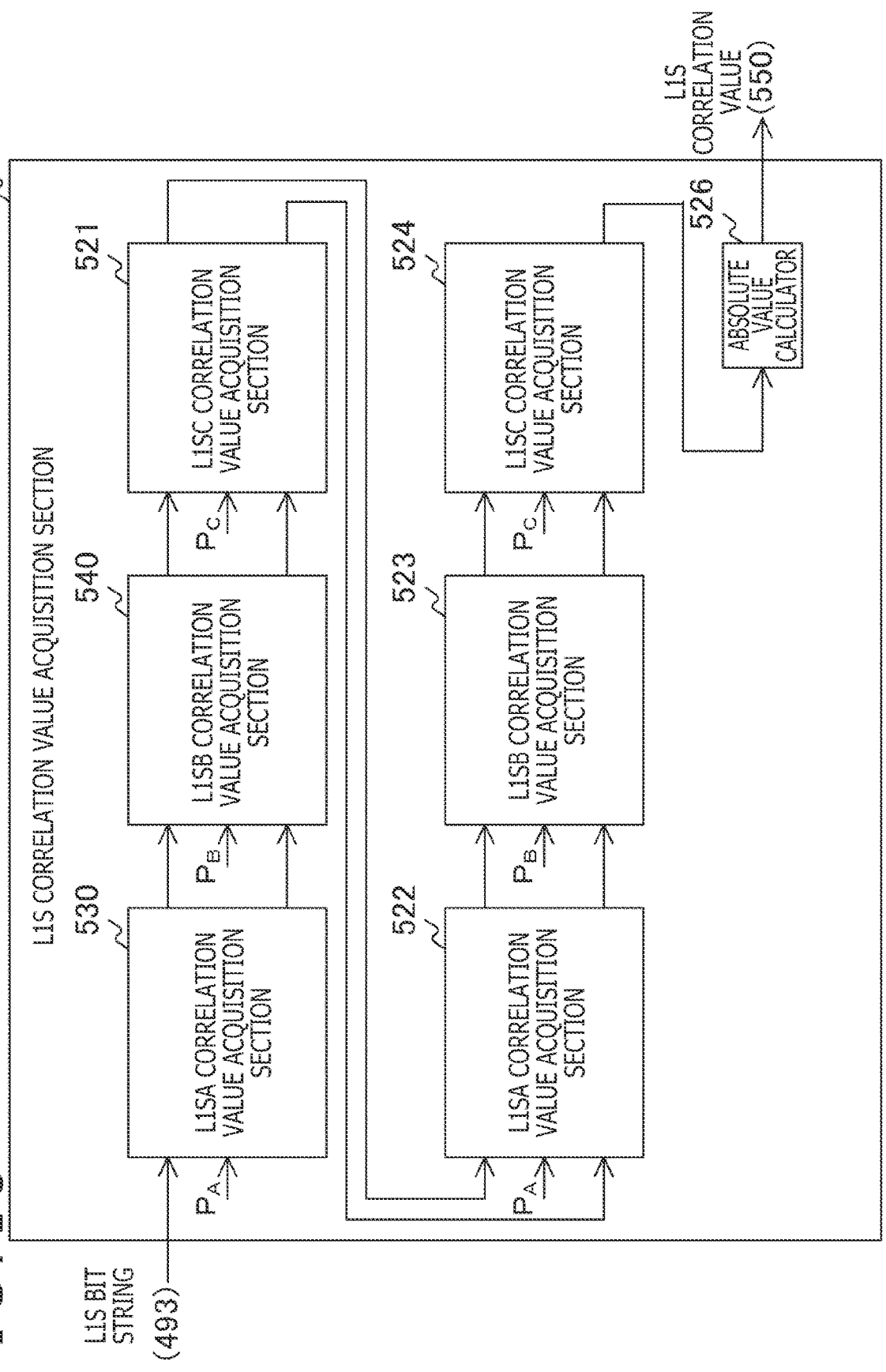
F I G. 18

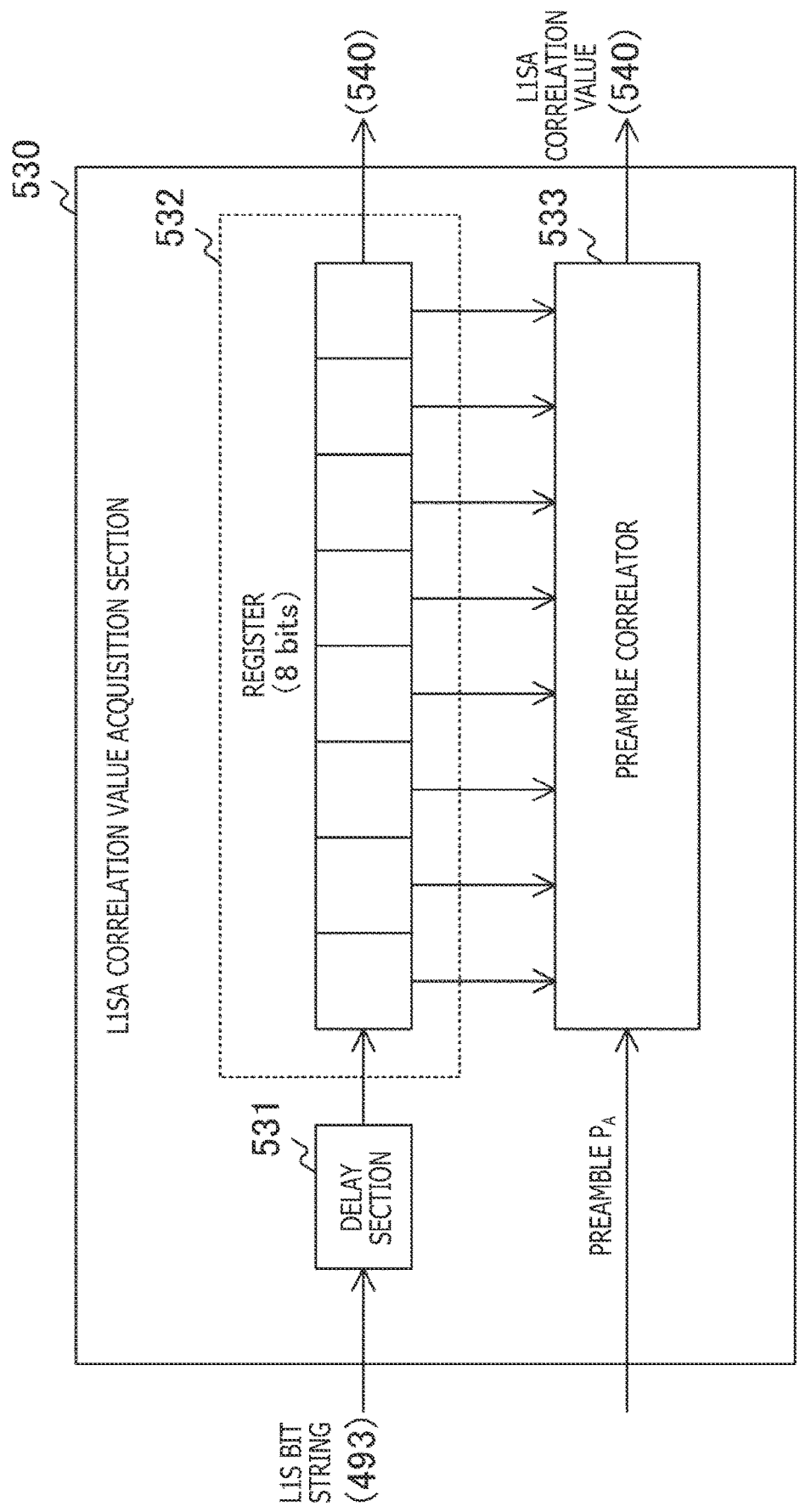
F I G . 1 9

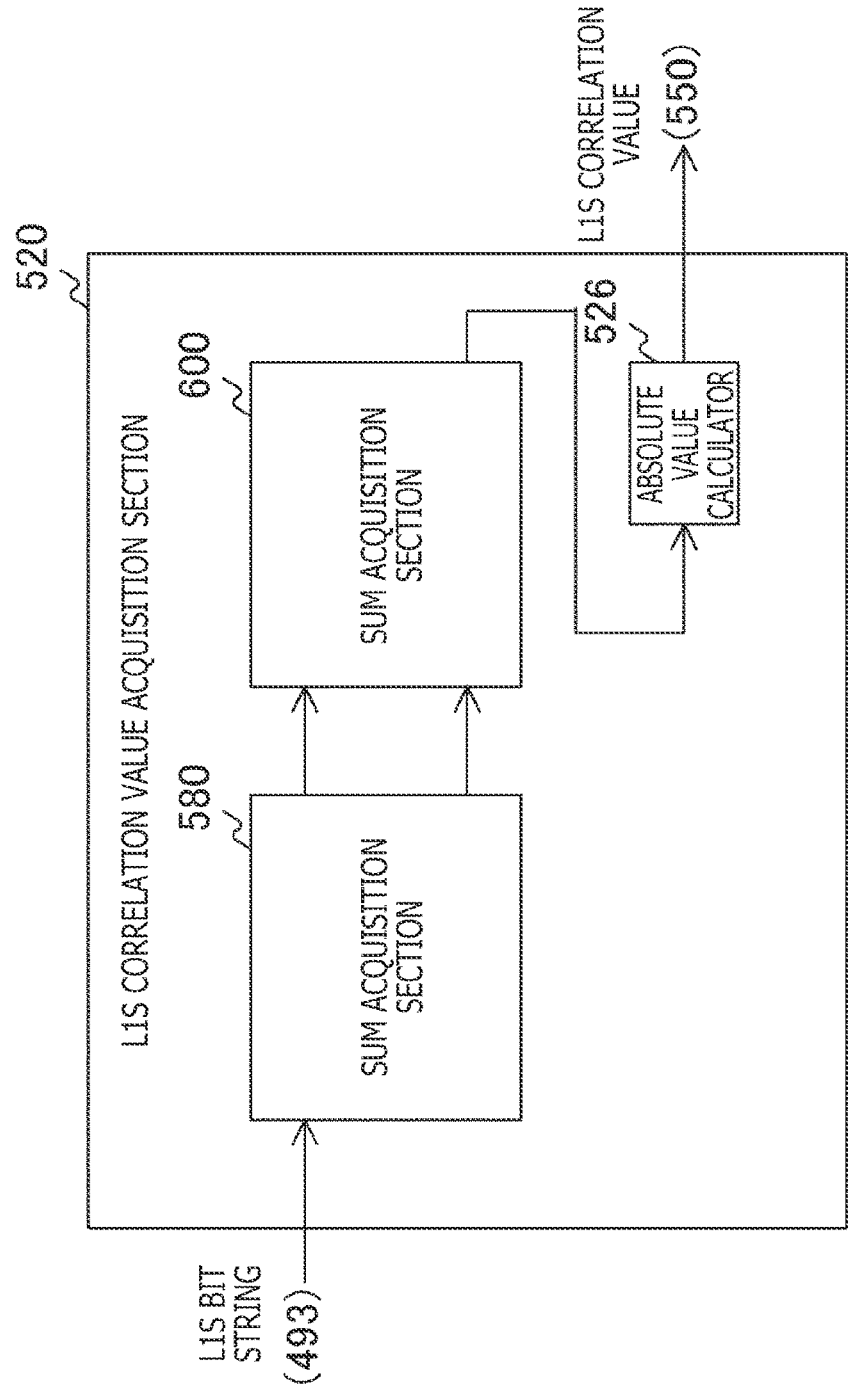

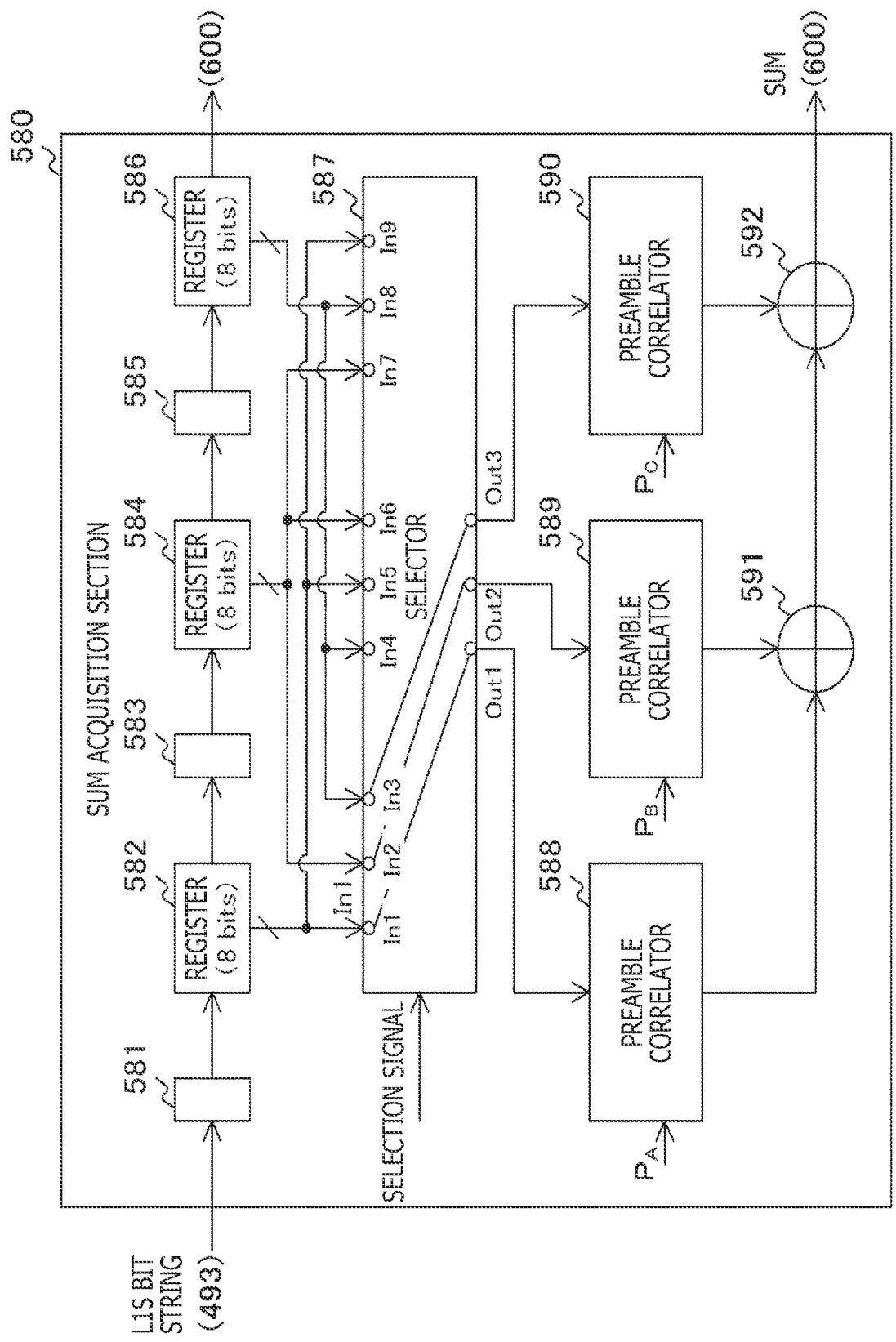
F I G . 3 1

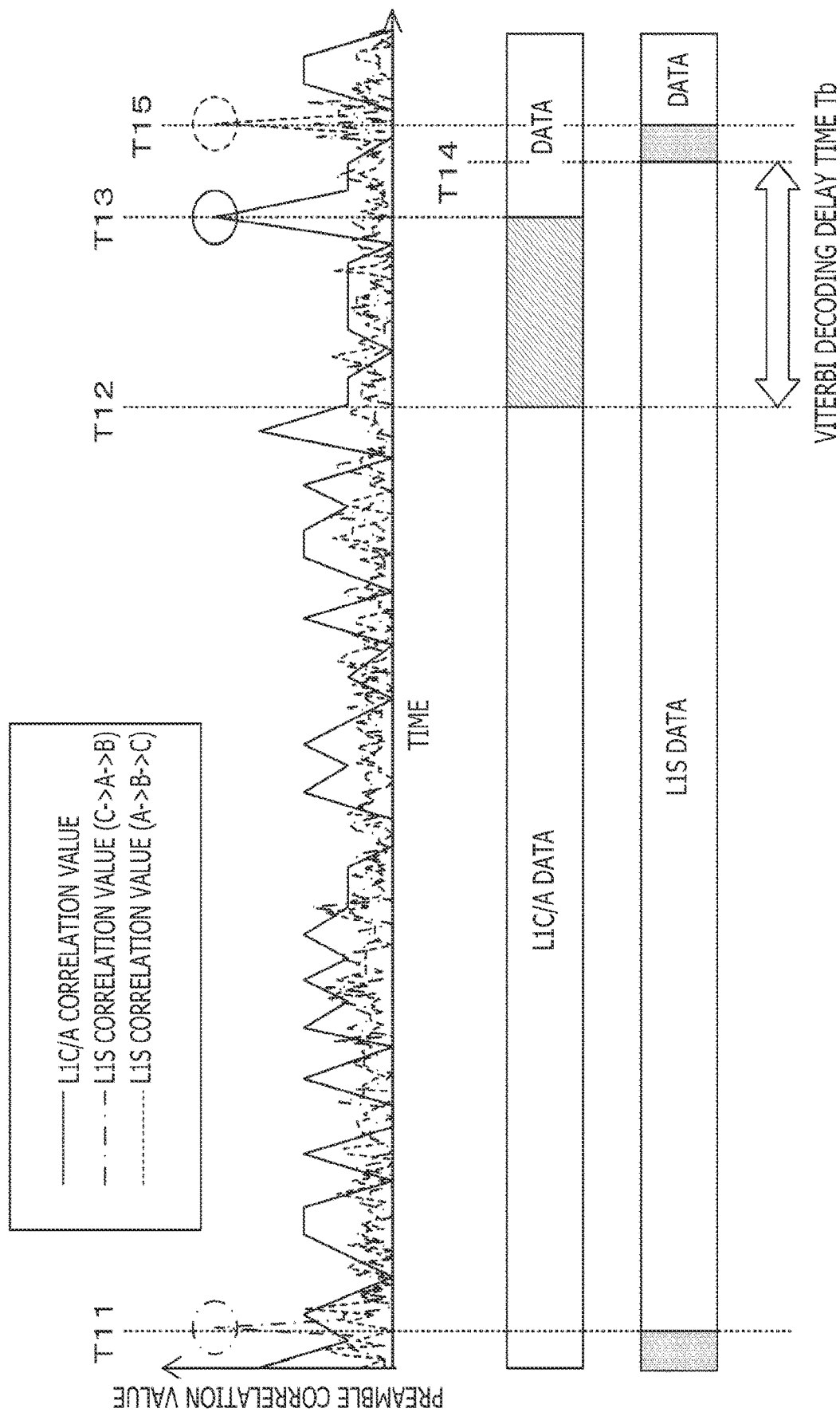

F I G . 3 5
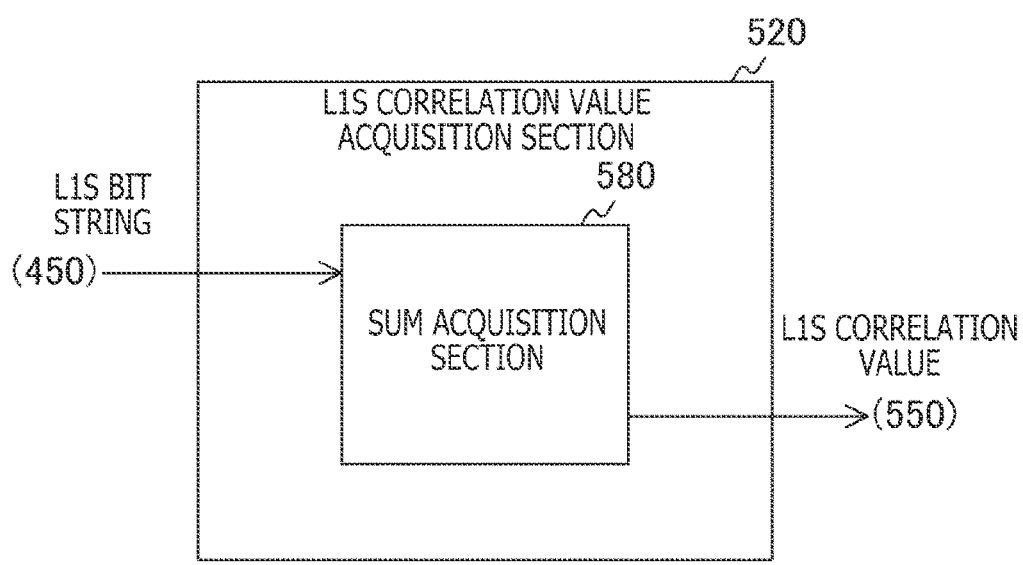

IoT SYSTEM 9000

RECEPTION APPARATUS AND RECEPTION METHOD

TECHNICAL FIELD

The present technology relates to a reception. apparatus and a reception method. More specifically, the present technology relates to a reception apparatus and a reception method for receiving a signal from a positioning satellite.

BACKGROUND ART

A global navigation satellite system (GNSS) that obtains a current position of a reception apparatus by receiving signals from a plurality of satellites has been pervasive. GPS (Global Positioning System), Galileo, and QZSS (Quasi-zenith Satellite System) can be cited as examples of GNSSs currently in service. Of these GNSSs, navigation message data sent from GPS satellites is transmitted frame by frame, and each frame includes five subframes. Then, first eight bits of each subframe are a bit string having a specific pattern called a preamble, and after the preamble, a TOW (Time Of Week) count indicating a date and time after a day of the week, orbit data, and the like are stored. For example, there has been proposed a reception apparatus that detects the presence or absence of a preamble to correct the time of day and, in the presence of a preamble, extracts the TOW count following the preamble (refer, for example, to PTL 1).

CITATION L1ST

Patent Literature

[PTL 1]
Japanese Patent Laid-open No. 2015-206695

SUMMARY

Technical Problems

The above reception apparatus allows correction of a time of day by using a TOW count. However, the above reception apparatus may erroneously detect the presence or absence of a preamble, possibly resulting in failed correction of the time of day. The reason for this is that there is a possibility that a bit string having the same pattern as a preamble may occur in data other than the preambles. For example, a TOW count is a number whose counting starts from "0" with elapse of time, and a bit string identical to the preamble occurs on a fixed date and time. Also, a bit string having the same pattern as the preamble may also occur when a bit error occurs due to, for example, noise. As far as a standard is concerned, a preamble is sent every six seconds, which is a subframe transmission period. Accordingly, erroneous detection can be prevented by a process of detecting a preamble a plurality of times on a receiving side at six-second intervals. However, this preventive measure is not preferred because of a long delay time caused by the process.

The present technology has been devised in light of the abovementioned circumstances, and it is an object of the present technology to detect the presence or absence of a preamble by a reception apparatus that receives a signal including the preamble.

Solution to Problems

The present technology has been devised to solve the above problems, and a first aspect thereof is a reception apparatus that includes a reception section, a processing section, and a message decoding section. The reception section receives a subframe including a subframe preamble and a message and a frame including a frame preamble. The processing section performs a process of detecting the presence or absence of the subframe preamble according to whether or not a given relation holds between a reception timing of the subframe preamble and a reception timing of the frame preamble. The message decoding section extracts the message from the subframe and decodes the message in a case where the presence of the subframe preamble is detected. This provides an advantageous effect of detecting the presence or absence of a subframe preamble according to whether or not a given relation holds between a reception timing of a subframe preamble and a reception timing of a frame preamble.

Also, in this first aspect, the processing section may include a satellite tracking section and a preamble detection section. The satellite tracking section tracks a satellite signal from a given satellite. The preamble detection section detects the presence or absence of the subframe preamble according to whether or not the given relation holds on the basis of the subframe and frame included in the satellite signal. This provides an advantageous effect of detecting a subframe preambling a tracked satellite signal.

Also, in this first aspect, the satellite tracking section may include a first correlator, a first code generator, a first numerically controlled oscillator, a second correlator, a second code generator, and a second numerically controlled oscillator. The first correlator outputs a first correlation output signal indicating a correlation between the satellite signal and a first code. The first code generator generates the first code according to a first control signal. The first numerically controlled oscillator generates the first control signal on the basis of the first correlation output signal. The second correlator outputs a second correlation output signal indicating a correlation between the satellite signal and a second code. The second code generator generates the second code according to a second control signal. The second numerically controlled oscillator generates the second control signal on the basis of the second correlation output signal. This provides an advantageous effect of tracking an L1C/A signal and an L1S signal separately.

Further, in this first aspect, the satellite tracking section may include a first correlator, a first code generator, a second correlator, a second code generator, a correlation value addition section, and a numerically controlled oscillator. The first correlator outputs a first correlation output signal indicating a correlation between the satellite signal and a first code. The first code generator generates the first code according to a given control signal. The second correlator outputs a second correlation output signal indicating a correlation between the satellite signal and a second code. The second code generator generates the second code according to the control signal. The correlation value addition section adds the first and second correlation output signals together to output a sum signal. The numerically controlled oscillator generates the control signal on the basis of the sum signal. This provides an advantageous effect of reducing circuits is the satellite tracking section.

Also, in this first aspect, the preamble detection section may include a subframe correlation value acquisition section, a frame correlation value acquisition section, and a subframe preamble detection section. The subframe correlation value acquisition section obtains a subframe correlation value indicating a degree of similarity between a bit string obtained by delaying a bit string in the subframe and a specified value of the subframe preamble. The frame correlation value acquisition section obtains a frame correlation value indicating a degree of similarity between a bit string obtained by delaying a bit string in the frame and a specified value of the frame preamble. The subframe preamble detection section detects the presence or absence of the subframe preamble on the basis of the subframe correlation value and the frame correlation value. This provides an advantageous effect of detecting the presence or absence of a subframe preamble on the basis of a subframe correlation value and a frame correlation value.

Also, in this first aspect, the subframe preamble detection section may detect the presence or absence of the subframe preamble according to whether or not a condition where the subframe correlation value is equal to or larger than a first threshold and where the frame correlation value is equal to or larger than a second threshold holds. This provides an advantageous effect of detecting a subframe preamble when the subframe correlation value is equal to or larger than a first threshold and where the frame correlation value is equal to or larger than a second threshold.

Also, in this first aspect, the subframe preamble detection section may detect the presence or absence of the subframe preamble according to whether or not a value obtained by multiplying and adding at least either the subframe correlation value or the frame correlation value is equal to or larger than a given threshold. This provides an advantageous effect of detecting a subframe preamble when a value obtained by multiplying and adding at least either a subframe correlation value or a frame correlation value is equal to or larger than a given. threshold.

Also, in this first aspect, the subframe preamble detection section may detect the presence or absence of the subframe preamble accord in to whether or not a condition where the larger of the subframe correlation value delayed by a certain period and the subframe correlation value that is not delayed is equal to or larger than a first threshold and where the frame correlation value is equal to or larger than a second threshold holds. This provides an advantageous effect of detecting a subframe preamble when the larger of a non-delayed subframe correlation value and a delayed subframe correlation value is equal to or larger than a first threshold and when a frame correlation value is equal to or larger than a second threshold.

Also, in this first aspect, the frame preamble may include first, second, and third frame preambles different from each other. This provides an advantageous effect of detecting the presence or absence of a subframe preamble on the basis of a subframe correlation value and frame correlation values corresponding to first, second, and third frame preambles.

Also, in this first aspect, the frame correlation. value acquisition section may include first, second, and third correlation value acquisition sections. The first correlation value acquisition section obtains a first correlation value indicating a degree of similarity between a first delayed bit string obtained by delaying a bit string in the frame and a specified value of the first frame preamble. The second correlation value acquisition section not only obtains a second correlation value indicating a degree of similarity between a second delayed bit string obtained by delaying the first delayed bit string and a specified value of the second frame preamble but also adds the first and second correlation values together to output a sum of the two values. The third correlation value acquisition section not only obtains a third correlation value indicating a degree of similarity between a third delayed bit string obtained by delaying the second delayed bit string and a specified value of the third frame preamble but also adds the sum and the third correlation value together. This provides an advantageous effect of detecting the presence or absence of a subframe preamble on the basis of a subframe correlation value and a sum of first, second, and third frame correlation values.

Also, in this first aspect, the frame correlation. value acquisition section may further include a fourth sum acquisition section and fifth and sixth correlation value acquisition sections. The fourth sum acquisition section not only obtains a fourth correlation value indicating a degree of similarity between a fourth delayed bit string obtained by delaying the third delayed bit string and a specified value of the first frame preamble but also further adds the fourth correlation value to the sum. The fifth correlation value acquisition section not only obtains a fifth correlation value indicating a degree of similarity between a fifth delayed bit string obtained by delaying the fourth delayed bit string and a specified value of the second frame preamble but also further adds the fifth correlation value to the sum. The sixth correlation value acquisition section not only obtains a sixth correlation value indicating a degree of similarity between a sixth delayed bit string obtained by delaying the fifth delayed bit string and a specified value of the third frame preamble but also further adds the sixth correlation value to the sum. This provides an advantageous effect of detecting the presence or absence of a subframe preamble on the basis of a subframe correlation value and a sum of first to sixth frame correlation values.

Also, in this first aspect, the frame correlation value acquisition section may include a first selector and first, second, and third correlation value acquisition sections. The first selector outputs a first delayed bit string obtained by delaying a bit string in the frame, a second delayed bit string obtained by further delaying the first delayed bit string, and a third delayed bit string obtained by further delaying the second delayed bit string, in an order consistent with a given selection signal, as first, second, and third selection signals. The first correlation value acquisition section obtains a first correlation value indicating a degree of similarity between a first selection signal and a specified value of the first frame preamble. The second correlation value acquisition section not only obtains a second correlation value indicating a degree of similarity between the second selection signal and a specified value of the second frame preamble but also adds the first and second correlation values together to output a sum of the two values. The third correlation value acquisition section not only obtains a third correlation value indicating a degree of similarity between the third selection signal and a specified value of the third frame preamble but also adds the sum and the third correlation value together. This provides an advantageous effect of calculating a frame correlation value when the order of preambles is changed.

Also, in this first aspect, the frame correlation value acquisition section may further include an accumulation section that accumulates the sum obtained by adding the third correlation value. This provides an advantageous effect of detecting the presence or absence of a subframe preamble on the basis of a cumulative sum.

Also, in this first aspect, the frame correlation value acquisition section may include a second selector and fourth, fifth, and sixth sum acquisition sections. The second selector outputs a fourth delayed bit string obtained by further delaying the second delayed bit string, a fifth delayed bit string obtained by further delaying the fourth delayed bit string, and a sixth delayed bit string obtained by further delaying the fifth delayed bit string, in an order consistent with a given selection signal, as fourth, fifth, and sixth selection signals. The fourth sum acquisition section not only obtains a fourth correlation value indicating a degree of similarity between the fourth selection signal and a specified value of the first frame preamble but also further adds the sum and the fourth correlation value together. The fifth sum acquisition section not only obtains a fifth correlation value indicating a degree of similarity between the fifth selection signal and a specified value of the second frame preamble but also further adds the sum and the fifth correlation value together. The sixth sum acquisition section not only obtains a sixth correlation value indicating a degree of similarity between the sixth selection signal and a specified value of the third frame preamble but also further adds the sum and the sixth correlation value together. This provides an advantageous effect of calculating a frame correlation value when the order of preambles is changed.

Also, in this first aspect, the processing section may include first and second satellite processing units and a preamble detection section. The first satellite processing unit processes a first satellite signal including the subframe. The second satellite processing unit processes a second satellite signal including the frame. The preamble detection section detects the presence or absence of the subframe preamble according to whether or not the given relation holds on the basis of the subframe and the frame. This provides an advantageous effect of processing a first satellite signal including a subframe and a second satellite signal including a frame, with different satellite processing units.

Also, in this first aspect, the subframe may be an L1C/A subframe in QZSS (Quasi-Zenith Satellite System), and the frame may be an L1S frame in the QZSS. This provides an advantageous effect of detecting the presence or absence of a subframe preamble in QZSS.

BRIEF DESCRIPTION OF DRAWINGS

FIG. 9 is a block diagram illustrating a configuration example of a bit decoding section in the first embodiment of the present technology.

FIG. 17 is a block diagram illustrating a configuration example of an L1C/A correlation value acquisition section in the first embodiment of the present technology.

FIG. 18 is a block diagram illustrating a configuration example of an L1S correlation value acquisition section in the first embodiment of the present technology.

FIG. 19 is a block diagram illustrating a configuration example of an L1SA correlation value acquisition section in the first embodiment of the present technology.

FIG. 30 is a block diagram illustrating a configuration example of an L1S correlation value acquisition section at a first stage in a sixth embodiment of the present technology.

FIG. 31 is a block diagram illustrating a configuration example of a sum acquisition section at a first stage in the sixth embodiment of the present technology.

FIG. 34 is a diagram illustrating examples of fluctuations of correlation values in the sixth embodiment of the present technology.

FIG. 35 is a block diagram illustrating a configuration example of an L1S correlation value acquisition section in a first modification example of the sixth embodiment of the present technology.

DESCRIPTION OF EMBODIMENTS

A description will be given below of modes for carrying out the present technology (hereinafter referred to as embodiments). The description will be given in the following order.

1. First embodiment (an example in which a preamble is detected from two correlation values)

2. Second embodiment (an example in which a preamble is detected from two correlation values after reducing circuits in the satellite tracking section.)

3. Third embodiment (an example in which a preamble is detected from a composite value of two correlation values)

4. Fourth embodiment (an example in which a preamble is detected from a correlation value, either a non-delayed or delayed value, and another correlation value)

5. Fifth embodiment (an example in which a preamble is detected from three seconds worth of a correlation value and another correlation value)

6. Sixth embodiment (an example in which a preamble is detected from a correlation value obtained by changing the order of preambles and another correlation value)

7. Seventh embodiment (an example in which a preamble detection section is shared by a plurality of satellite processing units)

8. Applicable example

1. First Embodiment

[Configuration Example of the Positioning System]

Figure 1:
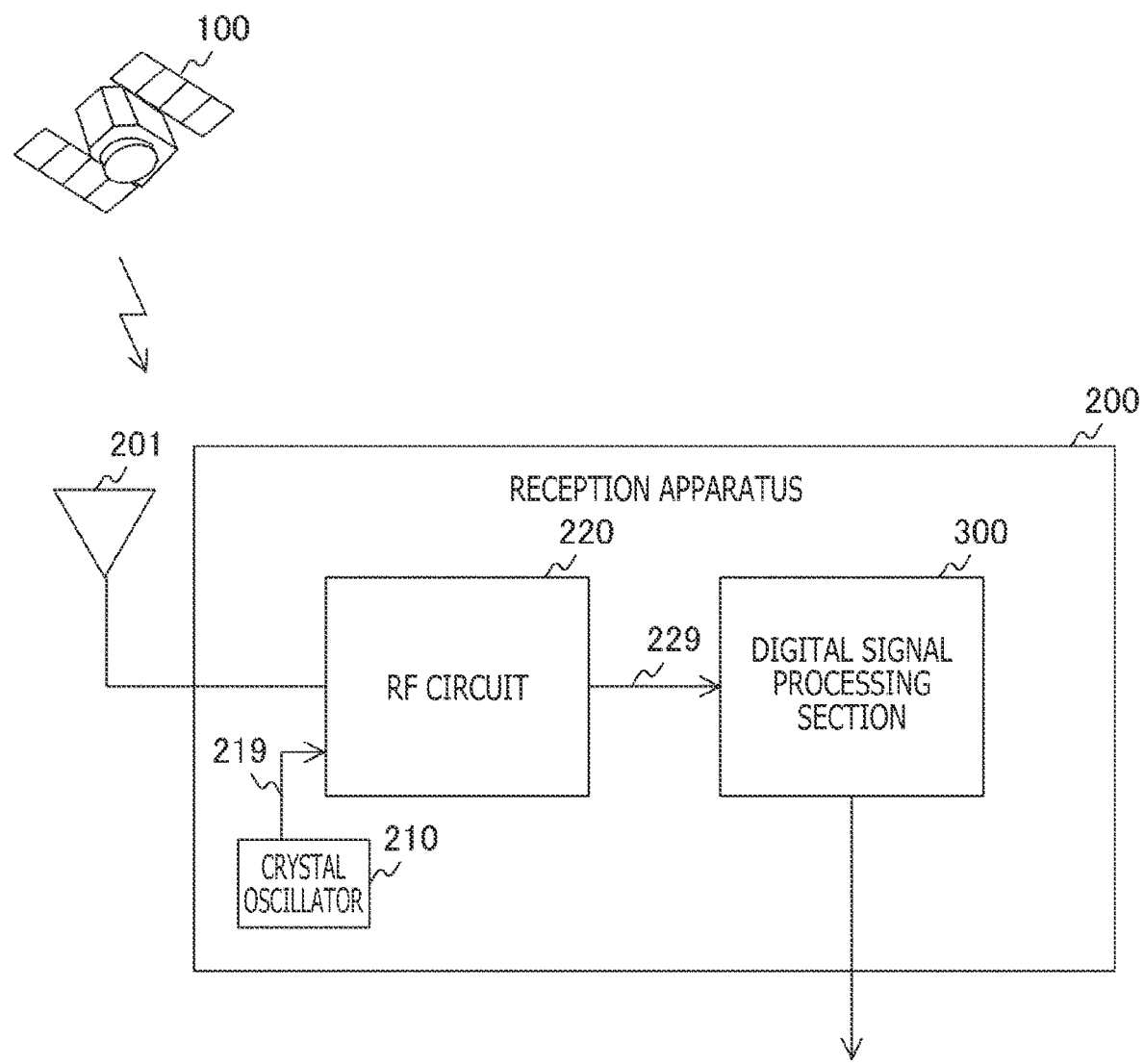
FIG. 1 is a general view illustrating a configuration example of a positioning system in a first embodiment of the present technology.

FIG. 1 is a general view illustrating a configuration example of a positioning system is a first embodiment of the present technology. This positioning system is designed to acquire its current position by using a signal from a satellite and includes a positioning satellite 100 and a reception apparatus 200.

The reception apparatus 200 receives a satellite signal from the positioning satellite 100 in GNSS and acquires its current position by using the signal. The reception apparatus 200 includes an antenna 201, a crystal oscillator 210, an RF circuit 220, and a digital signal processing section 300. During positioning, the reception apparatus 200 captures, for example, a plurality of positioning satellites in GPS, Galileo, or QZSS, as the positioning satellite 100. In addition, these satellites are assumed to include at least quasi-zenith satellites that are positioning satellites in QZSS.

The antenna 201 receives a signal sent from the positioning satellite 100. The crystal oscillator 210 generates a clock signal at a constant frequency by using piezoelectric properties of crystals. The crystal oscillator 210 supplies the generated clock signal to the RF circuit 220 via a signal line 219.

The RF circuit 220 amplifies an RF signal and converts it into a digital signal in synchronism with the clock signal. The RF circuit 220 supplies the converted digital signal to the digital signal processing section 300 via a signal line 229.

The digital signal processing section 300 processes the digital signal, acquires the current position and the current time, and outputs the position and the time to external equipment.

[Configuration Example of the RF Circuit]

Figure 2:
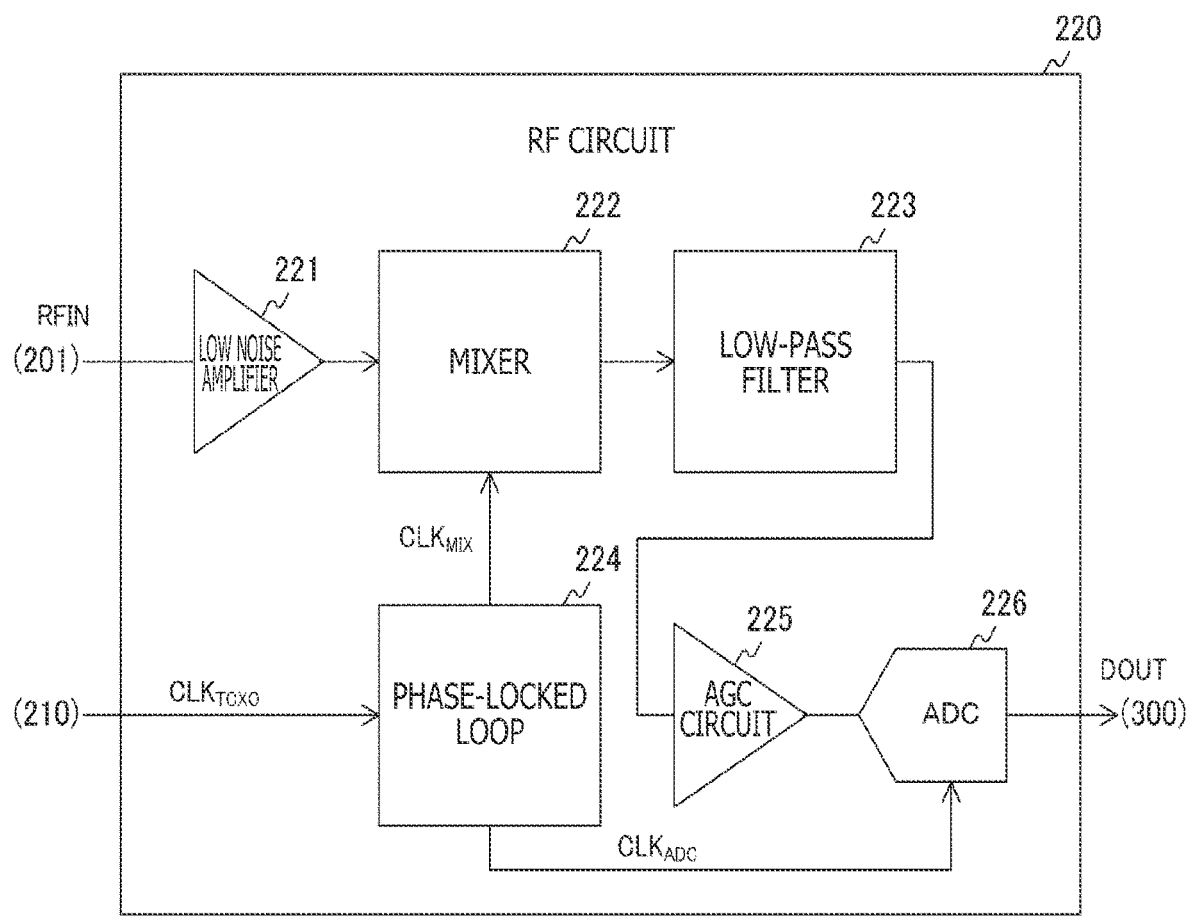
FIG. 2 is a block diagram illustrating a configuration example of an RF (Radio Frequency) circuit in the first embodiment of the present technology.

FIG. 2 is a block diagram illustrating a configuration example of the RF circuit 220 in the first embodiment of the present technology. The RF circuit 220 includes a low-noise amplifier 221, a mixer 222, a low-pass filter 223, and a phase-locked loop 224. Also, the RF circuit 220 includes an AGC (Auto Gain Control) circuit 225 and an ADC (Analog to Digital Converter) 226.

The low-noise amplifier 221 amplifies RFIN that is an RF signal from the antenna 201. The low-noise amplifier 221 supplies the amplified RFIN to the mixer 222.

The phase-locked loop 224 multiplies a clock signal $CLK_{TCXO}$ from the crystal oscillator 210. The phase-locked loop 224 generates clock signals $CLK_{MIX}$ and $CLK_{ADC}$ through multiplication. Then, the phase-locked loop 224 supplies the clock signal $CLK_{MIX}$ to the mixer 222 and the clock signal $CLK_{ADC}$ to the ADC 226.

The mixer 222 down-converts the frequency of an RF signal to a lower first intermediate frequency by mixing the RF signal RFIN with a local signal. The mixer 222 supplies the post-mixing first intermediate frequency signal to the low-pass filter 223.

The low-pass filter 223 passes frequency components of the first intermediate frequency signal at or below a given cutoff frequency and supplies these frequency components to the AGC circuit 225.

The AGC circuit 225 controls a gain of the input first intermediate frequency signal according to the level thereof and outputs the first intermediate frequency signal at a certain level to the ADC 226.

The ADC 226 converts the first intermediate frequency signal from the AGC circuit 225 into a digital signal DOUT and supplies the digital signal DOUT to the digital signal processing section 300.

[Configuration Example of the Digital Signal Processing Section]

Figure 3:
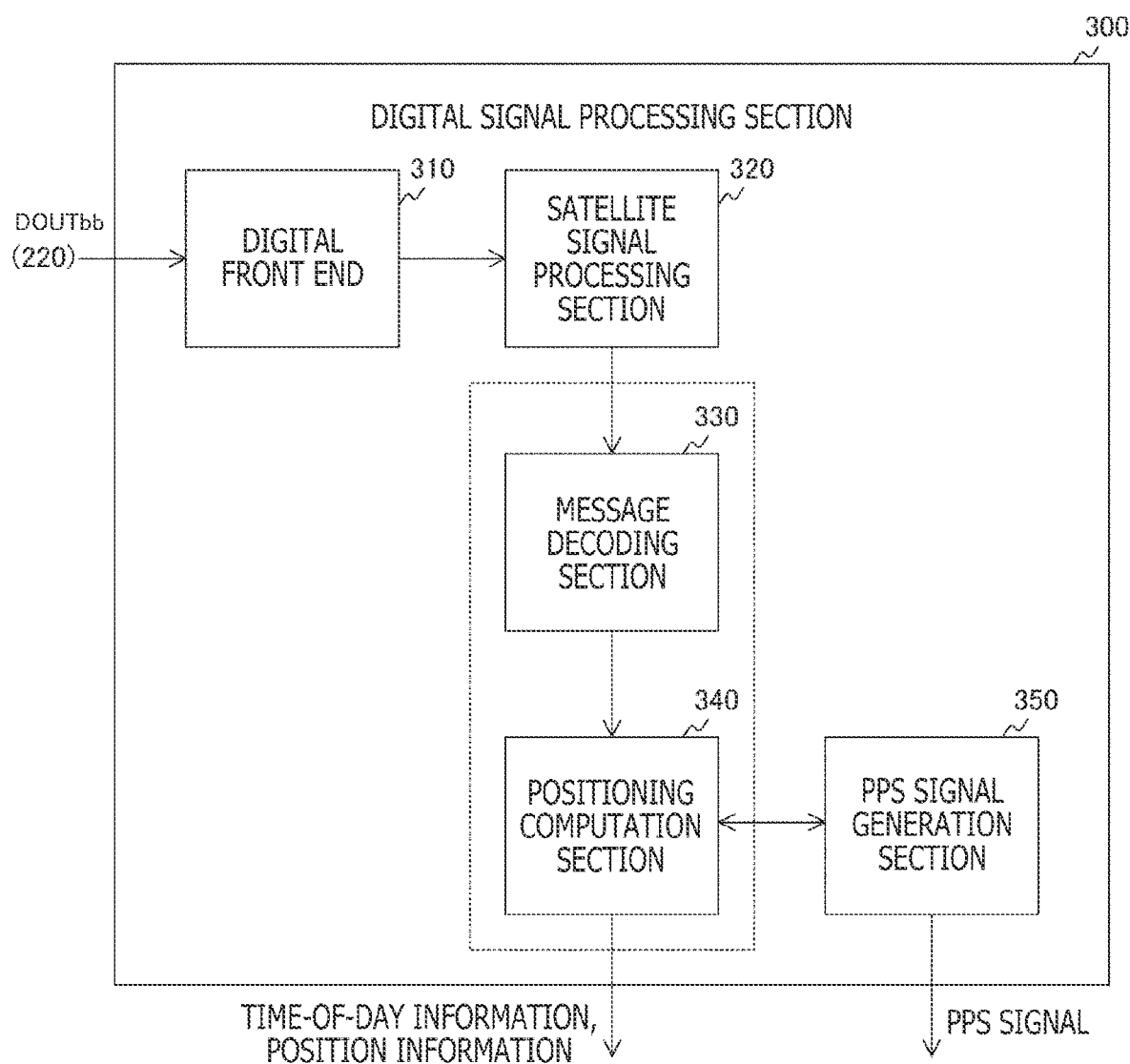
FIG. 3 is a block diagram illustrating a configuration example of a digital signal processing section in the first embodiment of the present technology.

FIG. 3 is a block diagram illustrating a configuration example of the digital signal processing section 300 in the first embodiment of the present technology. The digital signal processing section 300 includes a digital front end 310, a satellite signal processing section 320, a message decoding section 330, a positioning computation section 340, and a PPS (Pulse Per Second) signal generation section 350.

The digital front end 310 handles, for example, a process of reducing the frequency of the digital signal DOUT having the first intermediate frequency from the RF circuit 220 to a second intermediate frequency by passing the signal through a digital filter. The digital front end 310 supplies the digital signal having the second intermediate frequency to the satellite signal processing section 320, as a baseband signal. This allows a baseband signal to be received by the digital front end 310. It should be noted that the digital front end 310 is an example of the reception section set forth in the claims.

The satellite signal processing section 320 captures and tracks a given number of positioning satellites 100 on the basis of the baseband signal, decodes signals of the tracked satellites, and acquires navigation data. Also, the satellite signal processing section 320 obtains a pseudo distance from a satellite time of day that is a transmission time of day of the tracked satellite and a current time of day of the reception apparatus 200. Also, the satellite signal processing section 320 detects the presence or absence of a preamble in a frame in a message sent, frame by frame, from the satellite and supplies the detection result thereof to the message decoding section 330 together with the pseudo distance.

The message decoding section 330 acquires navigation data by decoding a message. The message decoding section 330 extracts, on the basis of the preamble detection result, a message following the preamble and decodes the message. Then, the message decoding section 330 supplies navigation data acquired through decoding to the positioning computation section 340 together with the pseudo distance.

The positioning computation section 340 acquires a current time of day on the basis of the pseudo distance and navigation data from the satellite signal processing section 320 and measures the current position. The positioning computation section 340 outputs time-of-day information indicating the current time of day and position information indicating the current position to external equipment. Also, the positioning computation section 340 supplies time-of-day information to the PPS signal generation section 350.

Functions of the message decoding section 330 and the positioning computation section 340 described above can be realized, for example, as a result of execution of a given program by a CPU (Central Processing Unit). It should be noted that at least one of the message decoding section 330 or the positioning computation section 340 can be realized by circuitry.

The PPS signal generation section 350 generates a PPS signal which is a one Hertz (Hz) pulse signal. The PPS signal generation section 350 generates a PPS signal on the basis of time-of-day information from the positioning computation section 340 and outputs the signal to external equipment.

It should be noted that, although outputting all of time-of-day information, position information, and a PPS signal, the digital signal processing section 300 can also generate and output at least one thereof (e.g., only time-of-day information).

[Configuration Example of the Satellite Signal Processing Section]

Figure 4:
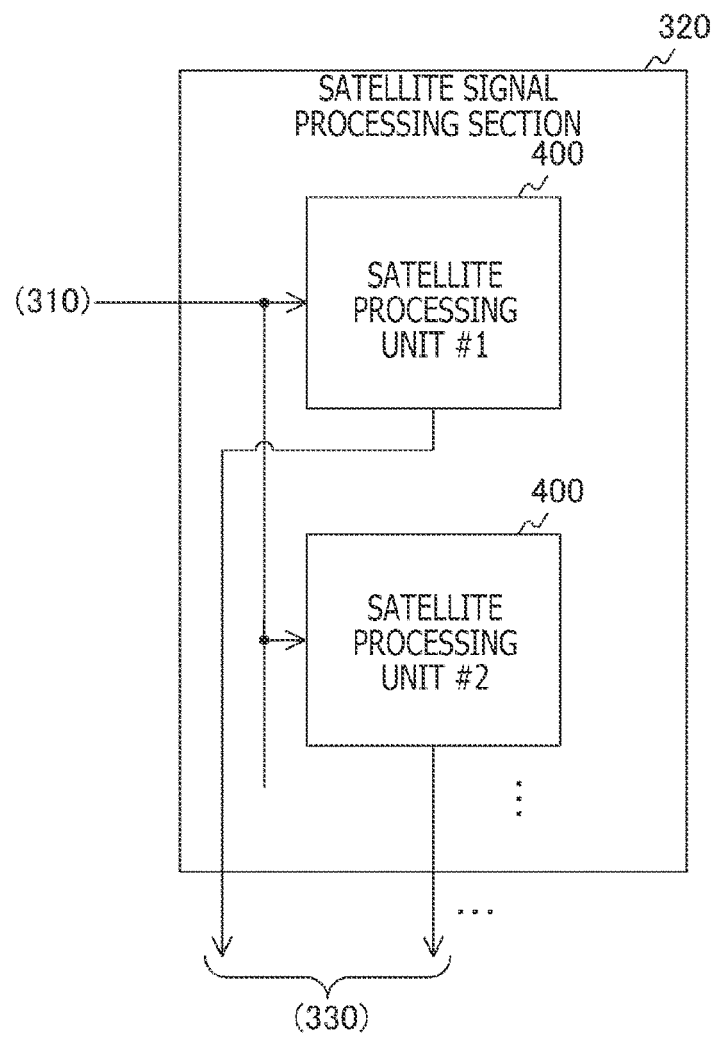
FIG. 4 is a block diagram illustrating a configuration example of a satellite signal processing section in the first embodiment of the present technology.

FIG. 4 is a block diagram illustrating a configuration example of the satellite signal processing section 320 in the first embodiment of the present technology. The satellite signal processing section 320 has a plurality of satellite processing units 400. Each of the satellite processing units 400 is assigned a different satellite as a target to be captured. Positioning computations require four or more positioning satellites, and it is desirable to assign eight or more positioning satellites for more stable positioning accuracy. Also, at least one of the satellite processing units 400 is assigned a QZSS positioning satellite as a target to be captured.

[Configuration Example of the Satellite Processing Unit]

Figure 5:
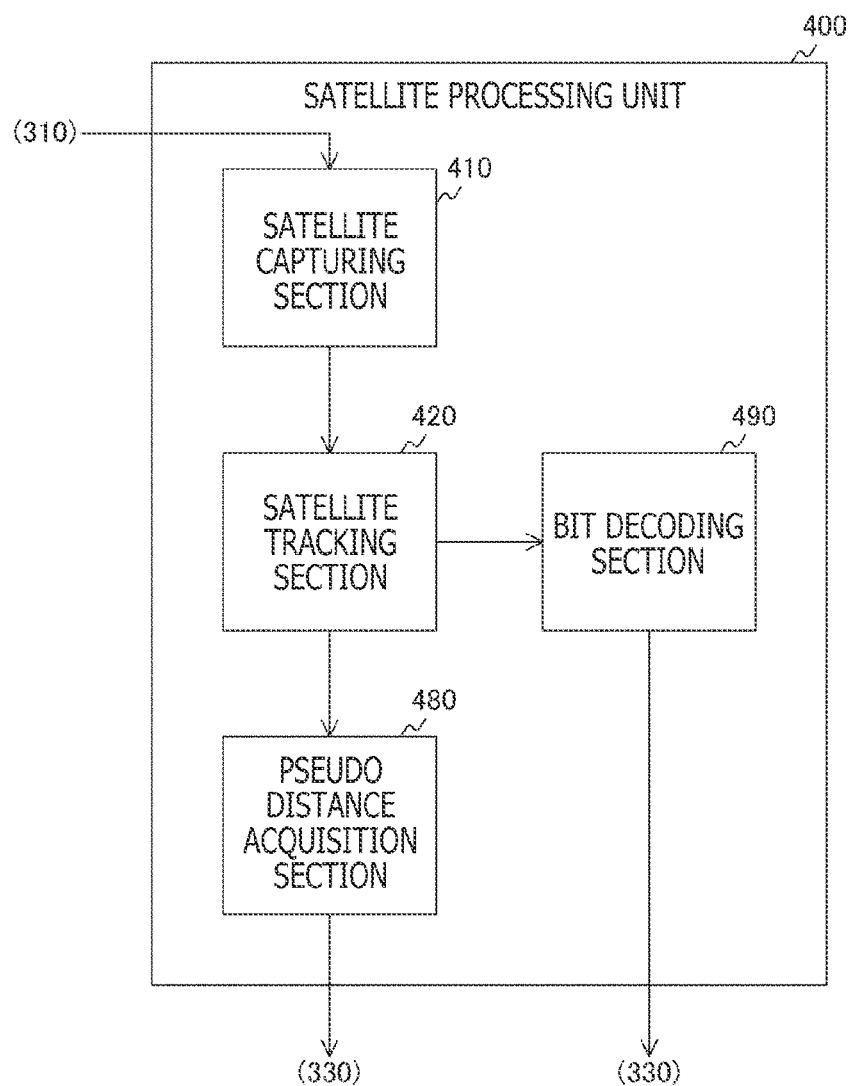
FIG. 5 is a block diagram illustrating a configuration example of a satellite processing unit in the first embodiment of the present technology.

FIG. 5 is a block diagram illustrating a configuration example of the satellite processing unit 400 in the first embodiment of the present technology. The satellite processing unit 400 includes a satellite capturing section 410, a satellite tracking section 420, a pseudo distance acquisition section 480, and a bit decoding section 490.

The satellite capturing section 410 captures the assigned satellite. The satellite capturing section 410 supplies a baseband signal from the captured satellite to the satellite tracking section 420.

The satellite tracking section 420 tracks the captured satellite. The satellite tracking section 420 achieves synchronization with a carrier and a code timing by using a carrier frequency offset and a code phase as initial values, thus reproducing the satellite time of day. The satellite tracking section 420 supplies information indicating the satellite time of day to the pseudo distance acquisition section 480. Also, the satellite tracking section 420 supplies a demodulated signal that is synchronous with a physical frame, to the bit decoding section 490.

The pseudo distance acquisition section 480 acquires a pseudo distance through computation. The pseudo distance acquisition section 480 estimates a satellite signal propagation time from a difference between a satellite time of day and a reception timing of day of the reception apparatus 200 and estimates a propagation distance between the positioning satellite 100 and the reception apparatus 200 by multiplying the propagation time by the speed of light. This estimated propagation distance is referred to as a pseudo distance as it includes, as compared to an actual geometrical distance, satellite clock and satellite orbit errors and errors attributable to ionosphere, troposphere, multipath, and other delays. The pseudo distance acquisition section 480 supplies the acquired pseudo distance to the positioning computation section 340 via the message decoding section 330.

The bit decoding section 490 decodes a demodulated signal from the captured satellite and detects the presence or absence of a preamble. The bit decoding section 490 supplies the decoded signal and the preamble detection result to the message decoding section 330.

[Configuration Example of the Satellite Tracking Section]

Figure 6:
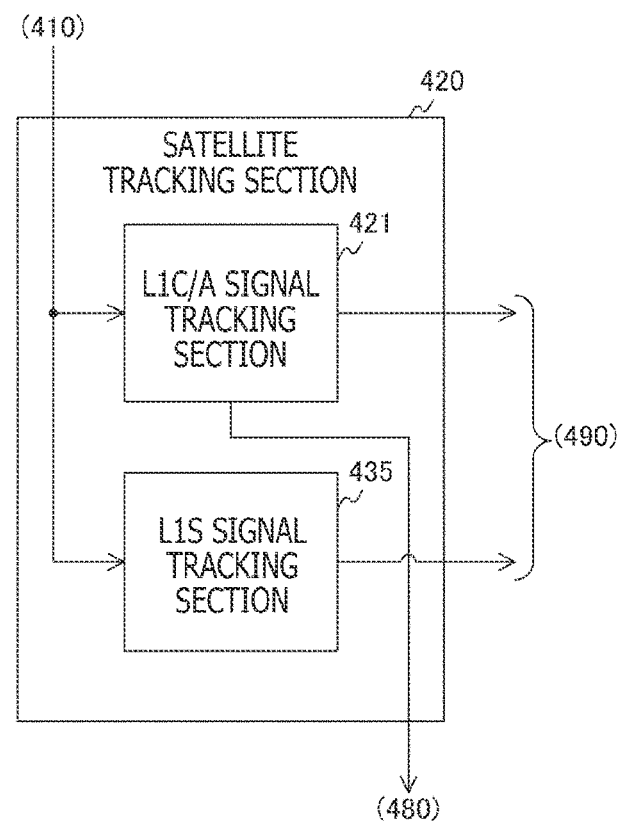
FIG. 6 is a block diagram illustrating a configuration example of a satellite tracking section in the first embodiment of the present technology.

FIG. 6 is a block diagram illustrating a configuration example of the satellite tracking section 420 in the first embodiment of the present technology. The satellite tracking section 420 includes an L1C/A signal tracking section 421 and an L1S signal tracking section 435.

The L1C/A signal tracking section 421 tracks a captured satellite and acquires an L1C/A signal from the satellite. The L1S signal tracking section 435 tracks a captured satellite and acquires an L1S signal from the satellite.

Here, L1C/A signal is used to provide a positioning service and is sent from GPS and QZSS positioning satellites. Meanwhile, L1S signal is used to provide a submeter level positioning augmentation service or a disaster/risk management notification service and is sent from QZSS positioning satellites. Data structures of these signals will be described in detail later.

The L1C/A signal tracking section 421 supplies the acquired L1C/A signal to the bit decoding section 490, and the L1S signal tracking section 421 supplies the acquired L1S signal to the bit decoding section 490. Also, the L1C/A signal tracking section 421 generates information indicating a satellite time of day and supplies the information to the pseudo distance acquisition section 480.

[Configuration Example of the L1C/A Signal Tracking Section]

Figure 7:
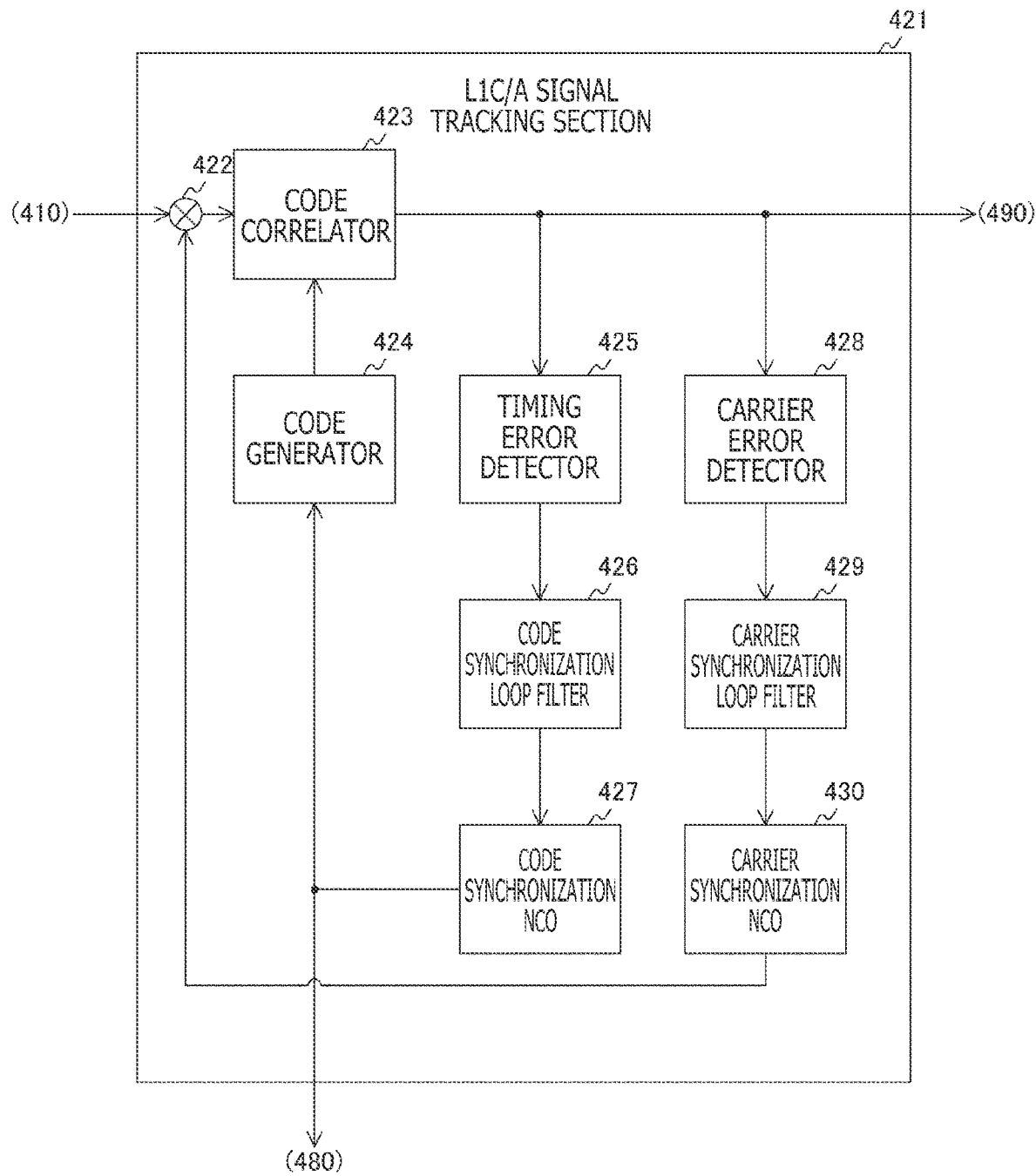
FIG. 7 is a block diagram illustrating a configuration example of an L1C/A signal tracking section in the first embodiment of the present technology.

FIG. 7 is a block diagram illustrating a configuration example of the L1C/A signal tracking section 421 in the first embodiment of the present technology. The L1C/A signal tracking section 421 includes a multiplier 422, a code correlator 423, and a code generator 424. Also, the L1C/A signal tracking section 421 further includes a timing error detector 425, a code synchronization loop filter 426, and a code synchronization NCO (Numerically Controlled Oscillator) 427. Further, the L1C/A signal tracking section 421 includes a carrier error detector 428, a carrier synchronization loop filter 429, and a carrier synchronization NCO 430.

The multiplier 422 multiplies a baseband signal from the satellite capturing section 410 by a periodic signal from the carrier synchronization NCO 430 and supplies the multiplication result to the code correlator 423. The frequency of this periodic signal is set to the carrier frequency.

The code correlator 423 obtains a correlation value between the multiplication result from the multiplier 422 and an identification code from the code generator 424. The code correlator 423 supplies a correlation output signal indicating the correlation value to the timing error detector 425 and the carrier error detector 428. Also, this correlation output signal is supplied to the bit decoding section 490, as an L1C/A signal. It should be noted that the code correlator 423 is an example of the first correlator set forth in the claims.

The code generator 424 generates an identification code for an assigned positioning satellite. A C/A (Coarse/acquisition) code is, for example, used as an identification code. The code generator 424 supplies the generated identification code to the code correlator 423. Also, the code generator 424 adjusts a generation timing of an identification code according to a control signal from the code synchronization NCO 427. It should be noted that the code generator 424 is an example of the first code generator set forth in the claims.

The timing error detector 425 detects an error in an identification code generation timing on the basis of a correlation output signal. The timing error detector 425 outputs the detection result to the code synchronization NCO 427 via the code synchronization loop filter 426.

The code synchronization NCO 427 synchronizes a code generated by the code generator 424 with a code in a signal from the multiplier 422 by using a control signal. The code synchronization NCO 427 generates a control signal for correcting an error in a code generation timing and supplies the control signal to the code generator 424 and the pseudo distance acquisition section 480. It should be noted that the code synchronization NCO 427 is an example of the first numerically controlled oscillator set forth in the claims.

The carrier error detector 428 detects periodic signal phase error on the basis of a correlation output signal. The carrier error detector 428 supplies the detection result to the carrier synchronization NCO 430 via the carrier synchronization loop filter 429.

The carrier synchronization NCO 430 synchronizes a periodic signal generated by itself and a carrier of a baseband signal. This carrier synchronization NCO 430 generates a periodic signal with corrected phase error on the basis of the detected phase error and supplies the periodic signal to the multiplier 422.

[Configuration Example of the L1C/A Signal Tracking Section]

Figure 8:
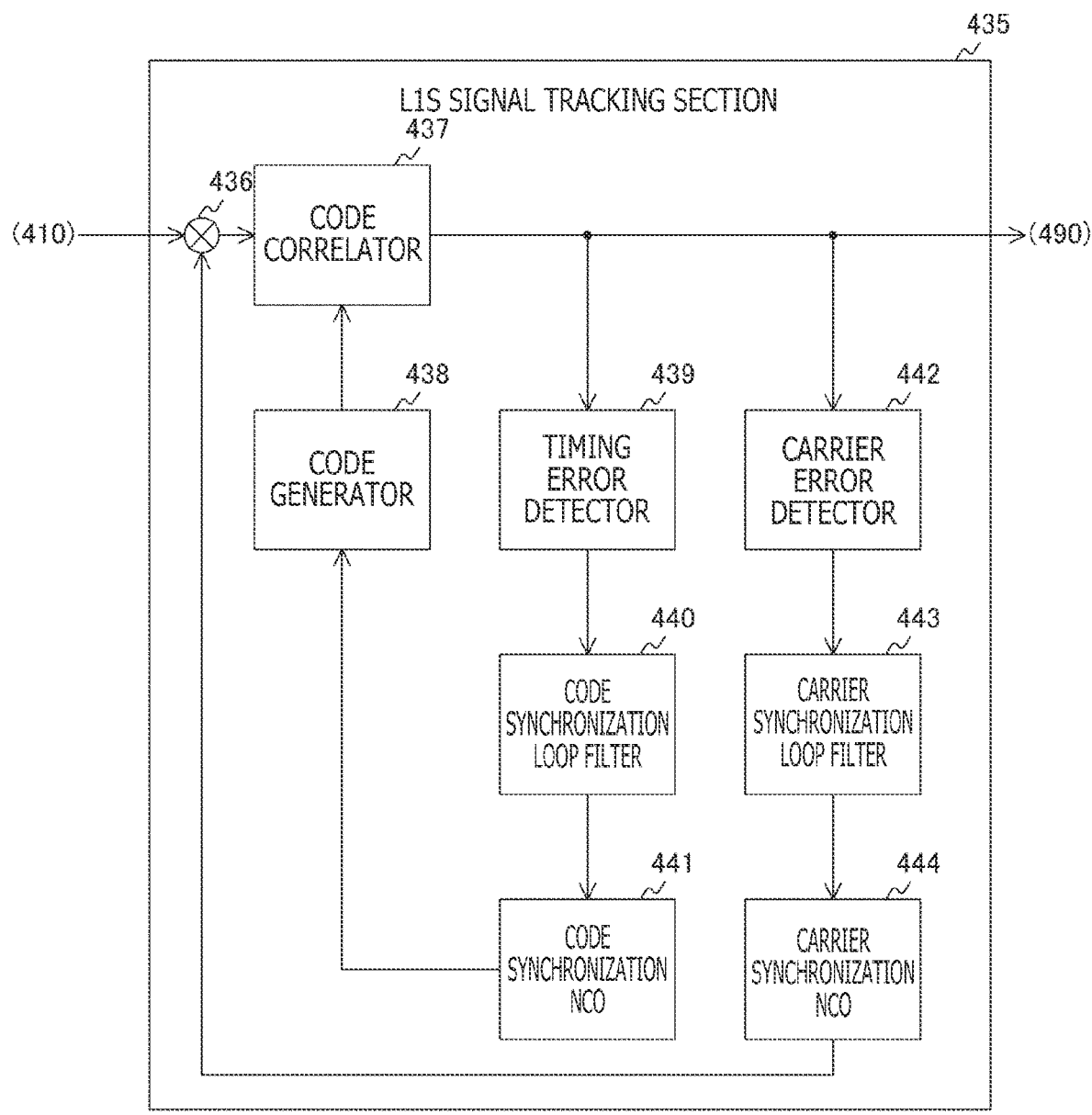
FIG. 8 is a block diagram illustrating a configuration example of an L1S signal tracking section in the first embodiment of the present technology.

FIG. 8 is a block diagram illustrating a configuration example of the L1S signal tracking section 435 in the first embodiment of the present technology. The L1S signal tracking section 435 includes a multiplier 436, a code correlator 437, and a code generator 438. Also, the L1S signal tracking section 435 includes a timing error detector 439, a code synchronization loop filter 440, a code synchronization NCO 441, a carrier error detector 442, a carrier synchronization loop filter 443, and a carrier synchronization NCO 444.

Each of the circuits in the L1S signal tracking section 435 is similar in configuration to its counterpart in the L1C/A signal tracking section 421. It should be noted, however, that the code generator 438 generates an L1S code.

It should be noted that the code correlator 437 is an example of the second correlator set forth in the claims. Also, the code generator 438 is an example of the second code generator set forth is the claims. The code synchronization NCO 441 is an example of the second numerically controlled oscillator set forth in the claims.

[Configuration Example of the Bit Decoding Section]

FIG. 9 is a block diagram illustrating a configuration example of the bit decoding section 490 in the first embodiment of the present technology. The bit decoding section 490 includes an L1C/A bit decoding section 491, a symbol decoding section 492, a convolution code decoder 493, and a preamble detection section 500.

The L1C/A bit decoding section 491 decodes a bit string in an L1C/A signal from the L1C/A signal tracking section 421. The L1C/A signal is already coded in the form of Hamming code, and the L1C/A bit decoding section 491 decodes the code as an L1C/A bit string and supplies the bit string to the preamble detection section 500.

The symbol decoding section 492 decodes a symbol in an L1S signal from the L1S signal tracking section 435. The L1S signal has been coded in the order of a convolution code and a CRC (Cyclic Redundancy Check) code, and the symbol decoding section 492 decodes the CRC code and supplies the code to the convolution code decoder 493.

The convolution code decoder 493 decodes a convolution code by using a Viterbi decoding algorithm. The convolution code decoder 493 supplies a decoded bit string to the preamble detection section 500, as an L1S bit string. The longer the delay time required for Viterbi decoding, the longer the time it takes to acquire decoded data while the better the capability to correct error becomes. Although dependent upon design, delay time caused by decoding is a fixed amount and known on the side of the reception apparatus 200.

The preamble detection section 500 detects the presence or absence of a preamble of the L1S signal on the basis of the L1C/A bit string and the L1S bit string. The preamble detection section 500 supplies a detection flag indicating the detection result of the preamble and the L1C/A signal to the message decoding section 330.

Figure 10:
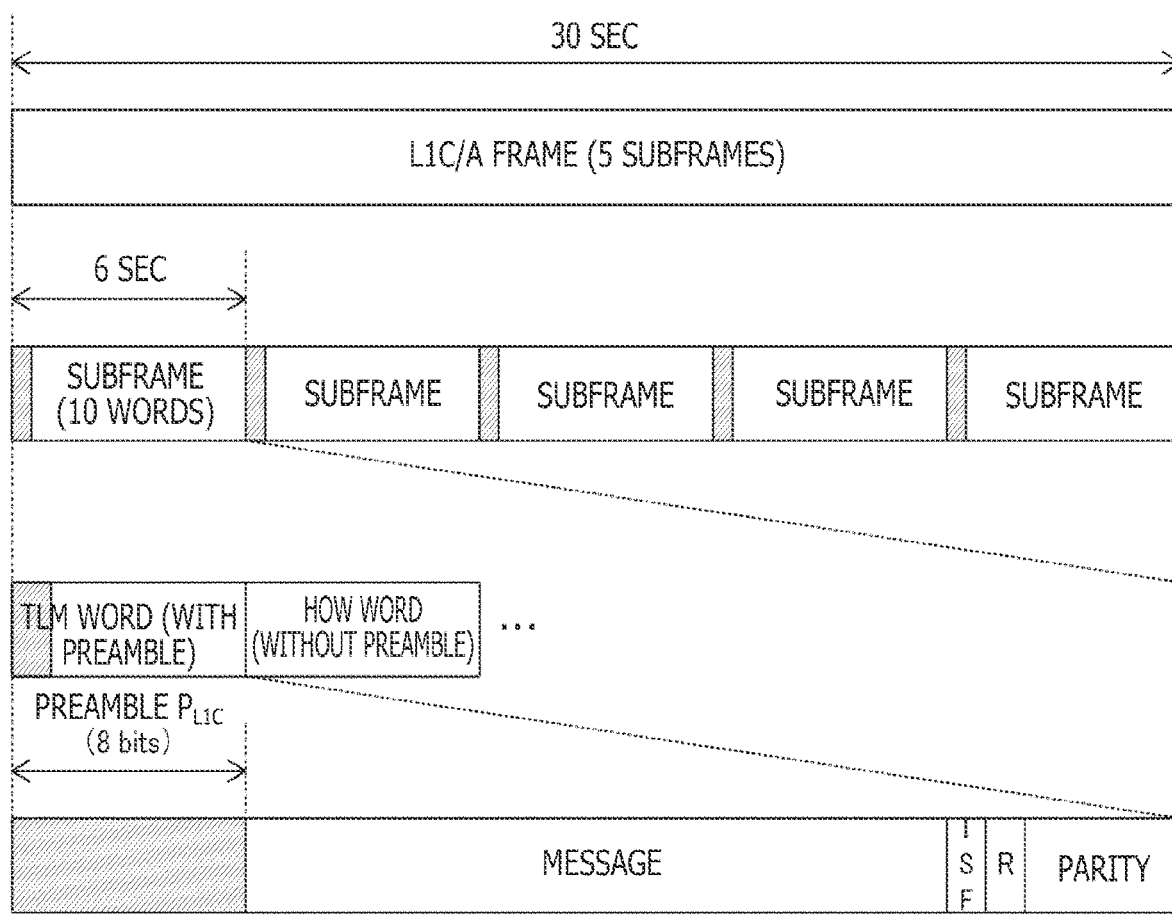
FIG. 10 is a diagram illustrating an example of a data structure of an L1C/A frame in the first embodiment of the present technology.

FIG. 10 is a diagram illustrating an example of a data structure of an L1C/A frame in the first embodiment of the present technology. A navigation message in an L1C/A signal is sent in units called frames every 30 seconds. Each frame includes five L1C/A subframes of equal size. It takes six seconds to send each subframe. For distinction from an L1S signal frame, an L1C/A signal frame will be referred to as an "L1C/A frame," and an L1C/A signal subframe will be referred to as an "L1C/A subframe."

Also, each L1C/A subframe includes 10 words. A TLM word is placed at the beginning of these words and followed by a HOW word. The first eight bits of the TLM word are a preamble. After the preamble, a message, an ISF (Integrity Status Flag), a reserved bit, and a parity are stored. The preamble of the L1C/A subframe will hereinafter be referred to as a "$P_{L1C}$." In FIG. 10, "R" represents a reserved bit. Also, the words beyond the HOW word have no preamble $P_{L1C}$.

In FIG. 10, each shaded area represents the preamble $P_{L1C}$. As illustrated in FIG. 10, a preamble is placed at the beginning of each L1C/A subframe. It takes six seconds to send an L1C/A subframe. Therefore, the preamble $P_{L1C}$ is sent every six seconds. It should be noted that the preamble $P_{L1C}$ is an example of the subframe preamble set forth in the claims.

Figure 11:
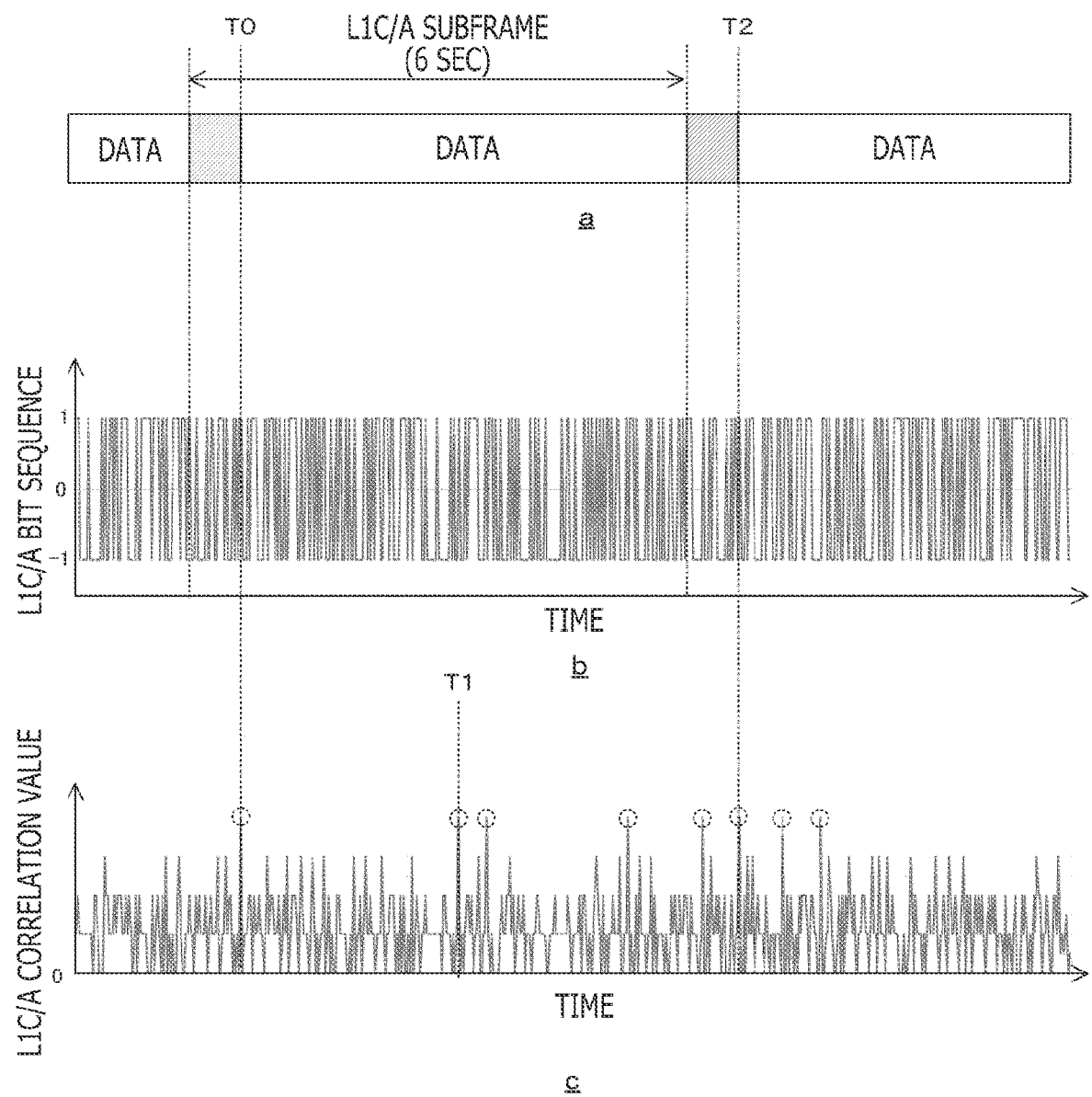
FIG. 11 depicts diagrams illustrating an example of an L1C/A subframe and an example of fluctuation of an L1C/A correlation value in the first embodiment of the present technology.

FIG. 11 depicts diagrams illustrating an example of an L1C/A subframe and an example of fluctuation of an L1C/A correlation value in the first embodiment of the present technology. In FIG. 11, a illustrates an example of a data structure of an L1C/A subframe. In FIG. 11, b illustrates an example of a bit sequence of an. L1C/A subframe. Data other than preambles is assumed to be Generated randomly. In FIG. 11, c illustrates an example of fluctuation of an L1C/A correlation value.

Here, the L1C/A correlation value indicates a degree of similarity between a bit string received by the reception apparatus 200 and a specified value of the L1C/A preamble. It is assumed that the higher the similarity, the larger the L1C/A correlation value.

The time when the reception of the preamble $P_{L1C}$ of a certain L1C/A subframe ends is denoted as T0. Because it takes six seconds to send an L1C/A subframe, the reception of the preamble $P_{L1C}$ of a next L1C/A subframe ends at time T2, i.e., in six seconds from T0. In reality, delay time occurs from the reception to the acquisition of a correlation value due to bit decoding, correlation value computation, and the like in the reception apparatus 200. However, it is assumed, for convenience of description, that there is no delay time.

The L1C/A correlation value reaches a peak at times T0 and T2 when the reception of the preamble $P_{L1C}$ ends. Accordingly, the reception apparatus 200 can acquire the reception end timings of the preamble $P_{L1C}$ by monitoring the L1C/A correlation value. However, the L1C/A correlation value reaches a peak at timings other than the above-mentioned times, such as at time T1. The reason for this is that the preamble $P_{L1C}$ is a short bit string that is only eight bits long and that a bit string having the same pattern as the preamble $P_{L1C}$ presumably occurs in data such as message due to, for example, bit error.

Accordingly, if the reception apparatus 200 performs a process of detecting the presence or absence of the preamble $P_{L1C}$ on the basis of only the L1C/A correlation value, there is a possibility that the preamble $P_{L1C}$ is erroneously detected a time T1 or another timing despite the absence of the preamble $P_{L1C}$.

Figure 12:
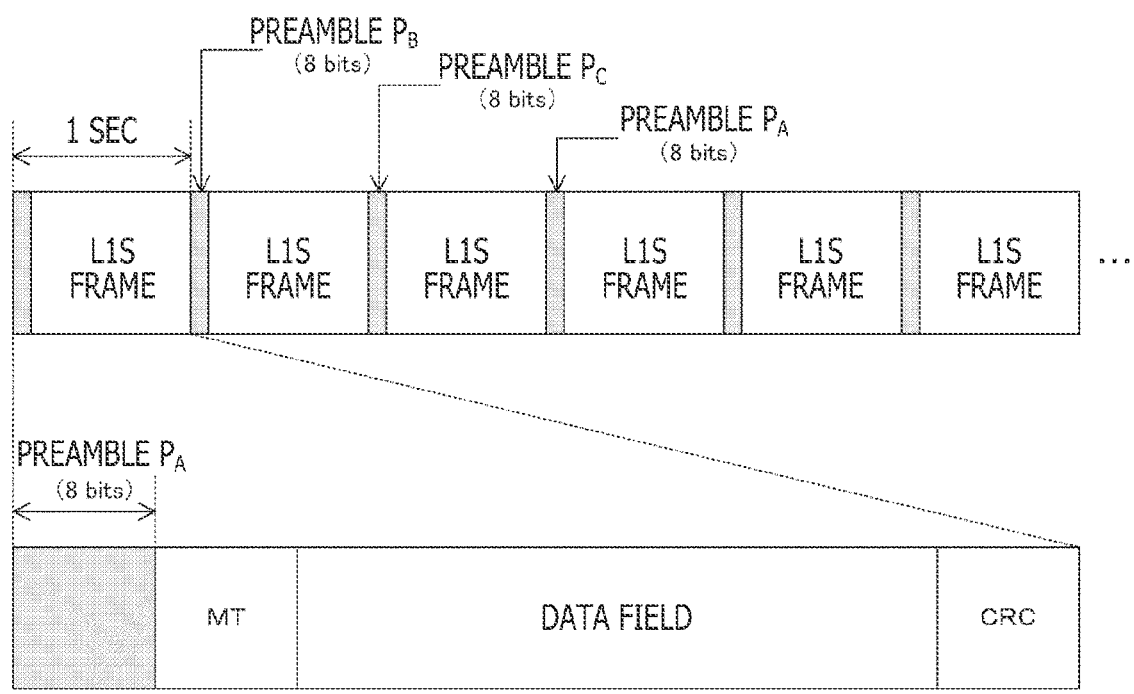
FIG. 12 is a diagram illustrating an example of a data structure of an L1S frame in the first embodiment of the present technology.

FIG. 12 is a diagram illustrating an example of a data structure of an L1S frame in the first embodiment of the present technology. A navigation message in an L1S signal is sent in units called frames every second. The first eight bits of each frame are a preamble. The preamble is followed by a message type, a data field, and a CRC code. In FIG. 12, "MT" represents a message type. For distinction from an L1C/A signal frame, an L1S signal frame will be referred to as an "L1S frame."

Also, there are three preamble patterns, namely, a pattern A, a pattern B, and a pattern C. All of these patterns are different from that of the preamble $P_{L1C}$. The preambles having the patterns A, B, and C will hereinafter be denoted as "$P_A$," "$P_B$," and "$P_C$," respectively. The preamble $P_A$ is transmitted followed by the preamble $P_B$, which is followed by the preamble $P_C$. From here onwards, the transmission is repeated similarly in the order of the preamble $P_A$, the preamble $P_B$, and the preamble $P_C$.

In FIG. 12, each gray area represents one of the preamble $P_A$, $P_B$, or $P_C$. As illustrated in FIG. 12, these preambles are sent at one-second intervals. It should be noted that the preamble $P_A$ is an example of the first frame preamble set forth in the claims and that the preamble $P_B$ is an example of the second frame preamble set forth in the claims. The preamble $P_C$ is an example of the third frame preamble set forth in the claims.

Figure 13:
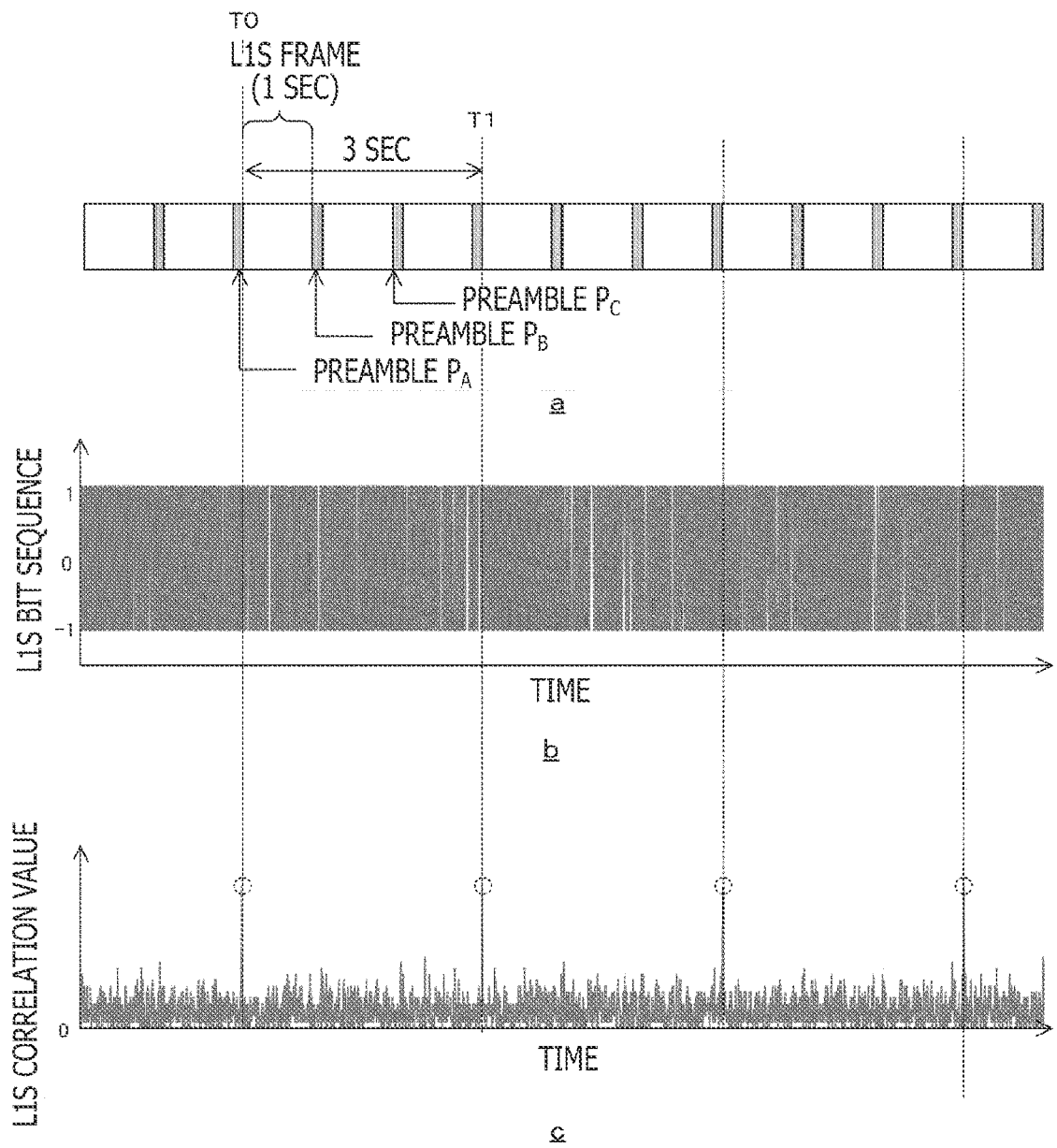
FIG. 13 depicts diagrams illustrating an example of an L1S frame and an example of fluctuation of an L1S correlation value in the first embodiment of the present technology.

FIG. 13 depicts diagrams illustrating an example of an L1S frame and an example of fluctuation of an L1S correlation value in the first embodiment of the present technology. In FIG. 13, a illustrates an example of a data structure of an L1S frame. In FIG. 13, b illustrates an example of a bit sequence of an L1S subframe. Data other than preambles is assumed to be Generated randomly. In FIG. 13, c illustrates an example of fluctuation of an L1S correlation value.

Here, the L1S correlation value indicates a degree of similarity between a bit string received by the reception apparatus 200 and a specified value of the preambles $P_A$, $P_B$, and $P_C$. It is assumed that the higher the similarity, the larger the L1S correlation value.

The time when the reception of the preamble $P_A$ at the beginning of a certain L1S frame ends is denoted as T0. Because the preambles $P_A$, $P_B$, and $P_C$ are sent every second in this order, the reception of the next preamble $P_A$ ends at time T1 that is three seconds after time T0. In reality, delay time occurs from the reception to the acquisition of a correlation value due to bit decoding (e.g., Viterbi decoding), correlation value computation, and the like in the reception apparatus 200. However, it is assumed, for convenience of description, that there is no delay time. As illustrated in FIG. 13, the L1S correlation value reaches a peak at times T0 and T1 when the reception of the preamble $P_A$ ends.

Figure 14:
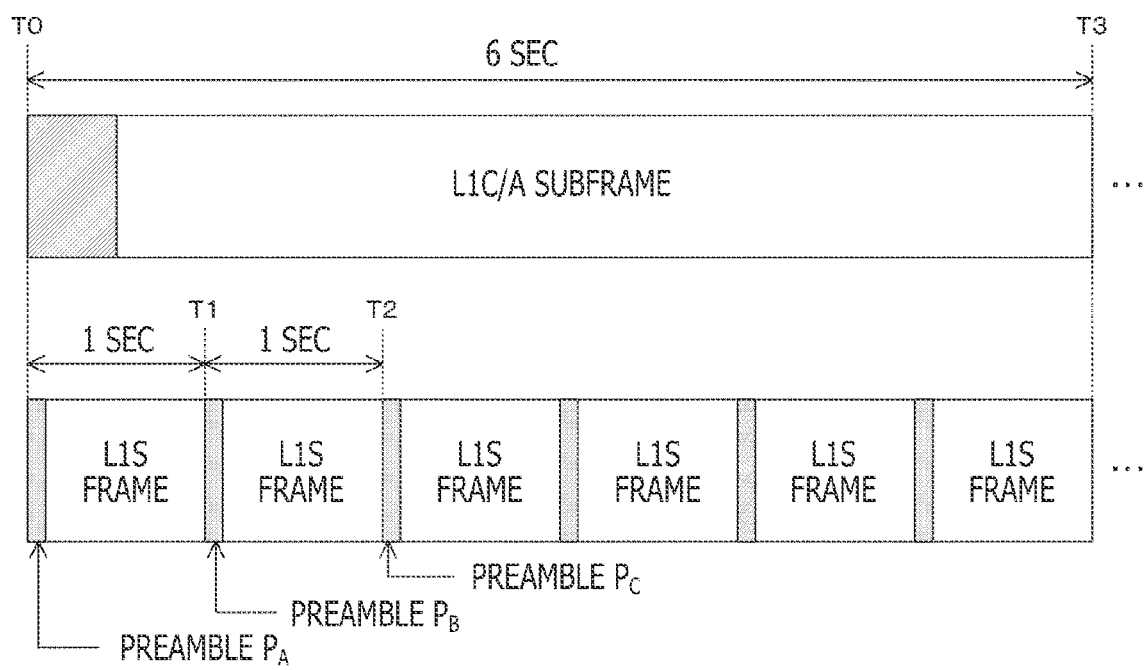
FIG. 14 is a diagram illustrating examples of transmission timings of preambles of an L1C/A subframe and an L1S frame in the first embodiment of the present technology.

FIG. 14 is a diagram illustrating examples of transmission timings of preambles of an L1C/A subframe and an L1S frame in the first embodiment of the present technology. A QZSS positioning satellite (i.e., quasi-zenith satellite) transmits an L1C/A subframe and an L1S frame after synchronizing the transmission timings thereof.

Suppose, for example, that the positioning satellite initiates the transmission of an L1C/A subframe at certain time T0 and ends the transmission at time T3 six seconds later. The positioning satellite initiates the transmission of an L1S frame at the same time as that of the L1C/A subframe at time T0 and ends the transmission of that frame at time T1 one second later. The positioning satellite initiates the transmission of a next L1S frame at time T1 and ends the transmission of that frame at time T2 one second later. Hereinafter, an L1S frame will be transmitted every second.

As illustrated in FIG. 14, the QZSS positioning satellite transmits six L1 frames at one-second intervals within an L1C/A subframe transmission period (six seconds). The transmission of the preamble $P_A$ of the L1S frame starts at the same time as the transmission of the preamble $P_{L1C}$ of the L1C/A subframe. Also, the transmission of the preamble $P_B$ of the L1S frame starts one second after the transmission of the preamble $P_{L1C}$ starts. The transmission of the preamble $P_C$ of the L1S frame starts in two seconds after the transmission of the preamble $P_{L1C}$ starts. The transmission of their succeeding preambles $P_A$, $P_B$, and $P_C$ starts respectively in four, five, and six seconds after the transmission of the preamble $P_{L1C}$ starts. As described above, the preambles of the L1C/A subframe and the preambles of the L1S frame are transmitted in synchronism.

Figure 15:
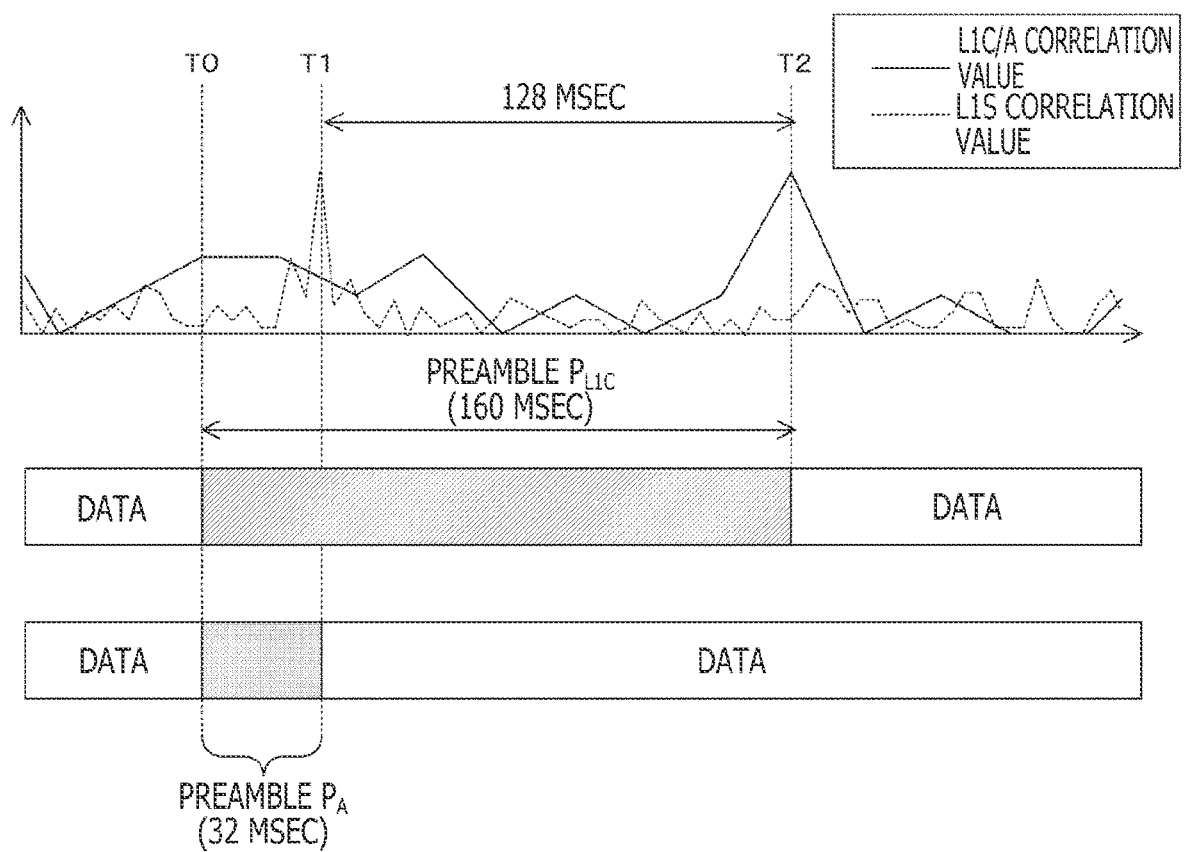
FIG. 15 is a diagram illustrating examples of timings when receptions of preambles of an L1C/A subframe and an L1S frame end and examples of fluctuation of correlation values in the first embodiment of the present technology.

FIG. 15 is a diagram illustrating examples of each timing when reception of preambles of an L1C/A subframe and reception of preambles of an L1S frame ends and examples of fluctuation of correlation values in the first embodiment of the present technology. The solid line in FIG. 15 indicates the fluctuation of the L1C/A correlation value, and the dotted line indicates the fluctuation of the L1S correlation value.

Because it takes 20 milliseconds to transmit each bit of the L1C/A subframe, it takes 160 milliseconds to send the eight-bit preamble $P_{L1C}$. Meanwhile, because it takes four milliseconds to send each bit of the L1S frame, it takes 32 milliseconds to send the eight-bit preamble $P_A$. Accordingly, in the case where the reception of the preamble $P_{L1C}$ and the preamble $P_A$ starts at time T0, the reception of the preamble $P_A$ ends 32 milliseconds later at time T1. Then, the reception of the preamble $P_{L1C}$ ends at T2 that is 160 milliseconds after time T0. Assuming that no delay time is required for bit coding and correlation value computations, the L1S correlation value reaches a peak at time T1, and the L1C/A correlation value reaches a peak at time T2 that is 128 seconds later.

As illustrated in FIG. 15, a certain relation holds between the reception timing of the preamble $P_{L1C}$ of the L1C/A subframe and the reception timings of the preambles $P_A$, $P_B$, and $P_C$ of the L1S frame. For example, time T2 when the reception of the preamble $P_{L1C}$ ends is 128 milliseconds after time T1 when the reception of the preamble $P_A$ ends. The same holds true for the timing when the correlation value reaches a peak. The reason for this is that the QZSS positioning satellite transmits an L1C/A subframe and an L1S frame synchronously.

The reception apparatus 200 monitors the correlation values of the L1C/A subframe and the L1S subframe in consideration of this relation between the reception timings, thus detecting the presence or absence of a preamble on the basis of the monitoring result. This makes it possible to provide improved preamble detection accuracy as compared to the case of monitoring only one of the two correlation values.

[Configuration Example of the Preamble Detection Section]

Figure 16:
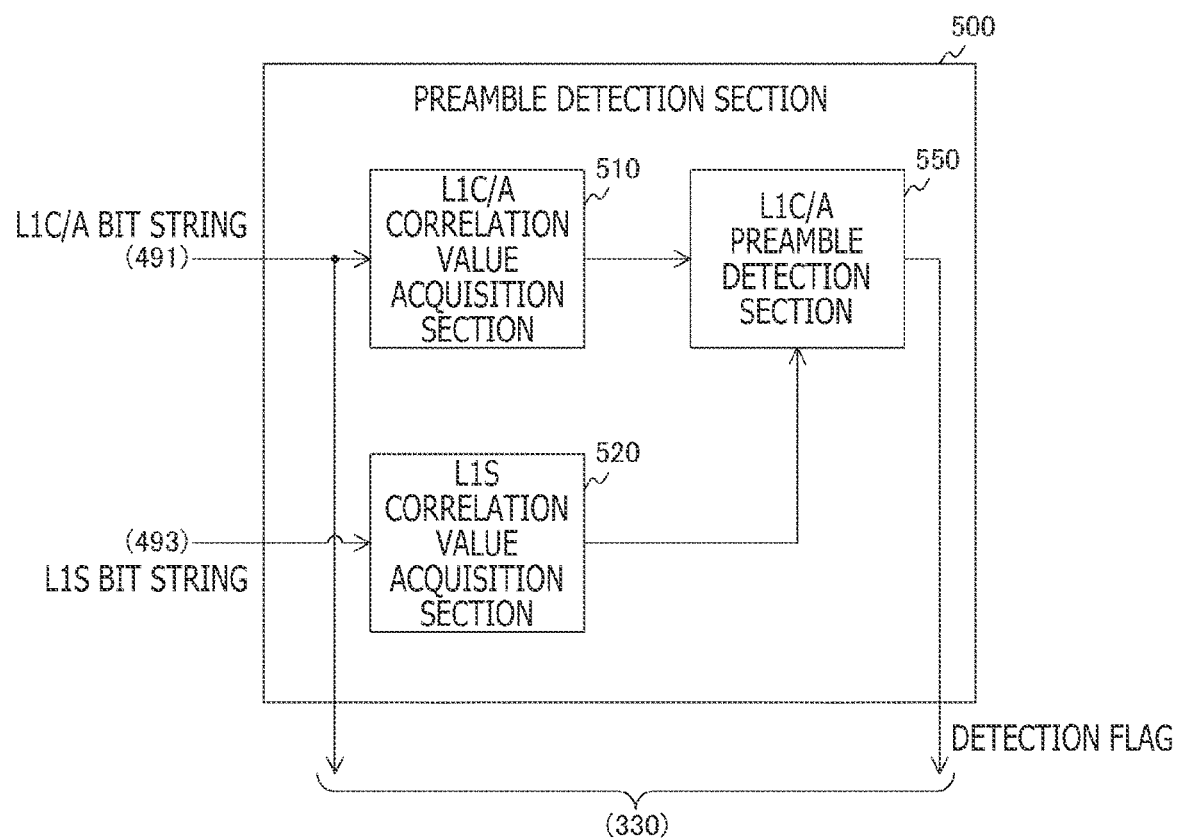
FIG. 16 is a block diagram illustrating a configuration example of a preamble detection section in the first embodiment of the present technology.

FIG. 16 is a block diagram illustrating a configuration example of the preamble detection section 500 in the first embodiment of the present technology. The preamble detection section 500 includes an L1C/A correlation value acquisition section 510, an L1S correlation value acquisition section 520, and an L1C/A preamble detection section 550.

The L1C/A correlation value acquisition section 510 acquires an L1C/A correlation value through correlation computation on a bit string obtained by delaying the L1C/A bit string from the L1C/A bit decoding section 491 and supplies the L1C/A correlation value to the L1C/A preamble detection section 550. It should be noted that the L1C/A correlation value acquisition section 510 is an example of the subframe correlation value acquisition section set forth in the claims.

The L1S correlation value acquisition section 520 acquires an L1S correlation value through correlation computation on a bit string obtained by delaying the L1S bit string from the convolution code decoder 493 and supplies the 213 correlation value to the L1C/A preamble detection section 550. It should be noted that the L1S correlation value acquisition section 520 is an example of the frame correlation value acquisition section set forth in the claims.

A delay time $T_{L1C}$ of the L1C/A correlation value acquisition section 510 and a delay time $T_{L1S}$ of the L1S correlation value acquisition section 520 are adjusted according to a difference in delay time required for bit decoding and correlation computation. The delay time required for bit decoding and correlation computation of the L1S frame is longer than the delay time required for bit decoding and correlation computation of the L1C/A subframe, and the difference therebetween is denoted as ΔT. In this case, the two delay times are adjusted such that the delay time $T_{L1C}$ is longer than the delay time $T_{L1S}$ by ΔT.

The L1C/A preamble detection section 550 detects the presence or absence of the preamble $P_{L1C}$ of the L1C/A subframe on the basis of the L1C/A and L1S correlation values. The L1C/A preamble detection section 550 supplies, to the message decoding section 330, a detection flag indicating the detection result. Also, the L1C/A bit string is supplied to the message decoding section 330, as well. It should be noted that the L1C/A preamble detection section 550 is an example of the subframe preamble detection section set forth in the claims.

As described earlier, the L1C/A and L1S correlation values reach peaks at timings corresponding to the respective reception timings of the preambles $P_{L1C}$, $P_A$, $P_B$, and $P_C$. Accordingly, the preamble detection section 500 can determine, by monitoring these correlation values, whether or not a given relation holds between the reception timing of the preamble $P_{L1C}$ and the reception timings of the preambles $P_A$, $P_B$, and $P_C$. This given relation is, for example, one in which the reception of the preamble $P_{L1C}$ ends in 128 milliseconds (ms) after the end of the reception of the preamble $P_A$ and in which the reception of the preamble $P_B$ and that of the preamble $P_C$ end respectively in one and two seconds after the end of the reception of the preamble $P_A$.

[Configuration Example of the L1C/A Correlation Value Acquisition Section]

FIG. 17 is a block diagram illustrating a configuration example of the L1C/A correlation value acquisition section 510 in the first embodiment of the present technology. The L1C/A correlation value acquisition section 510 includes a delay section 511, a register 512, a preamble correlator 513, and an absolute value calculator 514.

The delay section 511 delays an L1IC/A bit string from the L1C/A bit decoding section 491 by a period of the delay time $T_{L1C}$. The delay section 511 causes the register 512 to retain the delayed bit string. The register 512 retains an eight-bit bit string.

The preamble correlator obtains a correlation value through correlation computation between the bit string retained by the register 512 and a specified value of the preamble $P_{L1C}$ and supplies the correlation value to the absolute value calculator 514. The absolute value calculator 514 supplies, to the L1C/A preamble detection section 550, an absolute value of the correlation value from the preamble correlator 513, as the L1C/A correlation value.

[Configuration Example of the L1S Correlation Value Acquisition Section]

FIG. 18 is a block diagram illustrating a configuration example of the L1S correlation value acquisition section 520 in the first embodiment of the present technology. The L1S correlation value acquisition section 520 includes an L1SA correlation value acquisition section 530, an L1SB correlation value acquisition section 540, an L1SC correlation value acquisition section 521, an L1SA correlation value acquisition section 522, an L1SB correlation value acquisition section 523, and an L1SC correlation value acquisition section 524. Also, the L1S correlation value acquisition section 520 includes an absolute value calculator 526.

The L1SA correlation value acquisition section 530 acquires an. L1SA correlation value through correlation computation on a bit string obtained by delaying the L1S bit string from the convolution code decoder 493. Here, the L1SA correlation value indicates a degree of similarity between a bit string received by the reception apparatus 200 and a specified value of the preamble $P_A$. It is assumed that the higher the similarity, the larger the L1SA correlation value. The L1SA correlation value acquisition section 530 supplies the delayed bit string and the L1SA correlation value to the L1SB correlation value acquisition section 540. It should be noted that the L1SA correlation value acquisition section 530 is an example of the first correlation value acquisition section set forth in the claims.

The L1SB correlation value acquisition section 540 acquires an L1SB correlation value through correlation computation on a bit string obtained by delaying the bit string from the L1SA correlation value acquisition section 530. Here, the L1SB correlation value indicates a degree of similarity between a bit string received by the reception apparatus 200 and a specified value of the preamble $P_B$. It is assumed that the higher the similarity, the larger the L1SB correlation value. The L1SB correlation value acquisition section 540 supplies the delayed bit string and the sum of the L1SA correlation value and the L1SB correlation value to the L1SC correlation value acquisition section 521. It should be noted that the L1SB correlation value acquisition section 540 is an example of the second correlation value acquisition section set forth in the claims.

The L1SC correlation value acquisition section 521 acquires an L1S C correlation value through correlation computation on a bit string obtained by delaying the bit string from the L1SB correlation value acquisition section 540. Here, the L1SC correlation value indicates a degree of similarity between a bit string received by the reception apparatus 200 and a specified value of the preamble $P_C$. It is assumed that the higher the similarity, the larger the L1SC correlation value. The L1SC correlation value acquisition section 521 supplies, to the L1SA correlation value acquisition section 522, the delayed bit string and a sum of the L1SC correlation value and the sum from the previous stage. It should be noted that the L1SC correlation value acquisition section 521 is an example of the third correlation value acquisition section set forth in the claims.

The L1SA correlation value acquisition section 522 acquires an L1SA correlation value through correlation computation on a bit string obtained by delaying the bit string from the L1SC correlation value acquisition section 521. The L1SA correlation value acquisition section 522 supplies, to the L1SB correlation value acquisition section 523, the delayed bit string and a sum of the L1SA correlation value and the sum from the previous stage. It should be noted that the L1SA correlation value acquisition section 522 is an example of the fourth correlation value acquisition section set forth in the claims.

The L1SB correlation value acquisition section 523 acquires an L1SB correlation value through correlation computation on a hit string obtained by delaying the hit string from the L1SA correlation value acquisition section 522. The L1SB correlation value acquisition section 523 supplies, to the L1SC correlation value acquisition section 524, the delayed bit string and a sum of the L1SB correlation value and the sum from the previous stage. It should be noted that the L1SB correlation value acquisition section 523 is an example of the fifth correlation value acquisition section set forth in the claims.

The L1SC correlation value acquisition section 524 acquires an L1SC correlation value through correlation computation on a bit string obtained by delaying the bit string from the L1SB correlation value acquisition section 523. The L1SC correlation value acquisition section 524 supplies, to the absolute value calculator 526, a sum of the L1SC correlation value and the sum from the previous stage. It should be noted that the L1SC correlation value acquisition section 524 is an example of the sixth correlation value acquisition section set forth in the claims.

The absolute value calculator 526 supplies the absolute value of the sum from the L1SC correlation value acquisition section 524 to the L1C/A preamble detection section 550, as an L1S correlation value.

[Configuration Example of the L1SA Correlation Value Acquisition Section]

FIG. 19 is a block diagram illustrating a configuration example of the L1SA correlation value acquisition section 530 in the first embodiment of the present technology. The L1SA correlation value acquisition section 530 includes a delay section 531, a register 532, and a preamble correlator 533.

The delay section 531 delays an L1S bit string from the convolution code decoder 493 by a certain period of time. The delay section 531 causes the register 532 to retain the delayed bit string. The register 532 retains an eight-bit bit string. Also, the bit string retained by the register 532 is supplied to the L1SB correlation value acquisition section 540 one bit at a time in sequence.

The preamble correlator 533 obtains an L1SA correlation value through correlation computation between the bit string retained by the register 532 and a specified value of the preamble $P_A$ and supplies the L1SA correlation value to the L1SB correlation value acquisition section 540.

[Configuration Example of the L1SB Correlation Value Acquisition Section]

Figure 20:
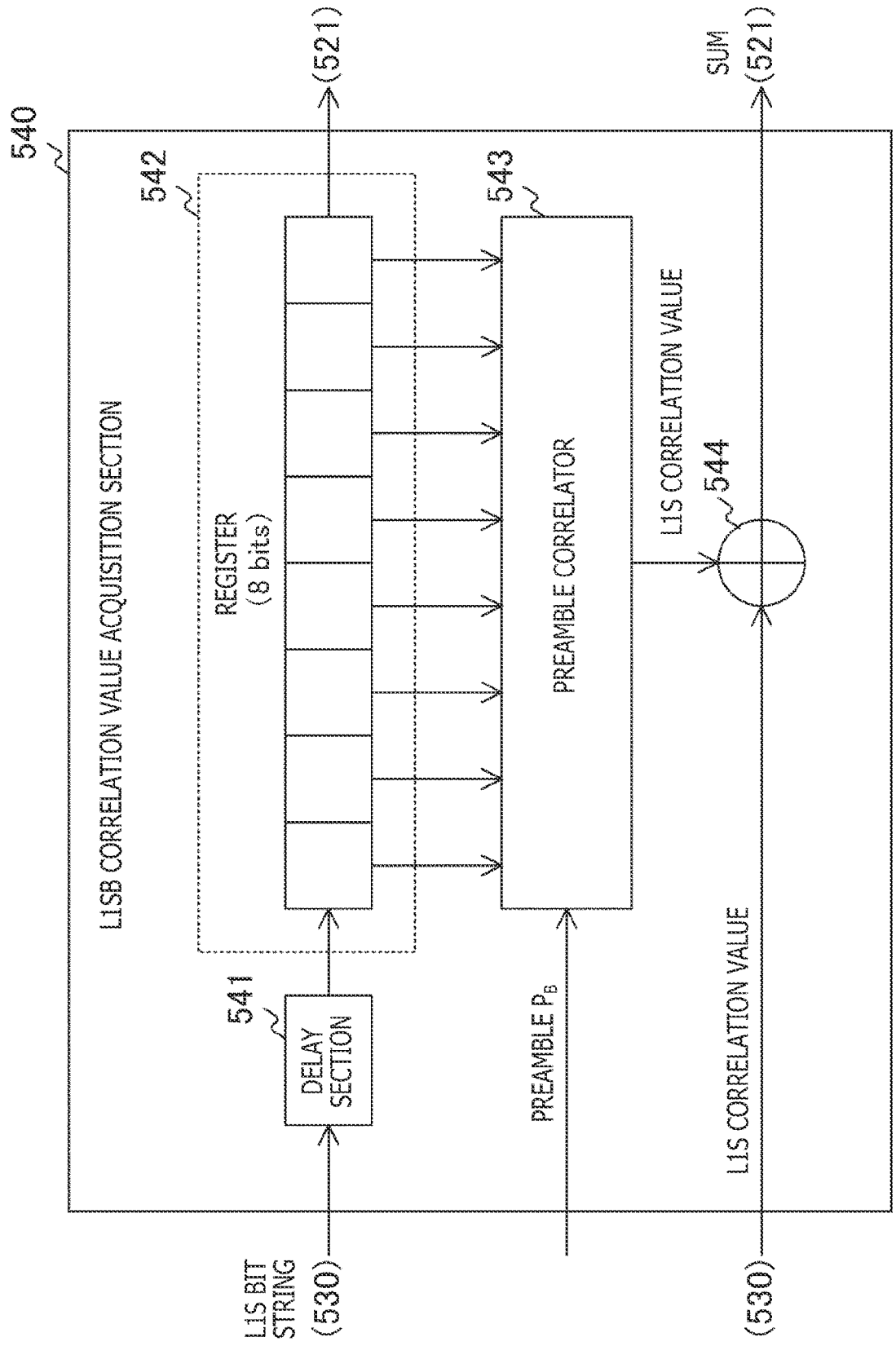
FIG. 20 is a block diagram illustrating a configuration example of an L1SB correlation value acquisition section in the first embodiment of the present technology.

In FIG. 20, the L1SB correlation value acquisition section 540 includes a delay section 541, a register 542, a preamble correlator 543, and an adder 544.

The delay section 541, the register 542, and the preamble correlator 543 are configured similarly to the delay section 531, the register 532, and the preamble correlator 533 at the previous stage, respectively. It should be noted, however, that the preamble correlator 543 obtains an L1SB correlation value through correlation computation with a specified value of the preamble $P_B$ and supplies the L1SB correlation value to the adder 544.

The adder 544 adds the L1SB correlation value to the L1SA correlation value from the previous stage and supplies the sum to the L1SC correlation value acquisition section 521.

Further, the L1SC correlation value acquisition section 521, the L1SA correlation value acquisition section 522, the L1SB correlation value acquisition section 523, and the L1SC correlation value acquisition section 524 are configured similarly to the L1SB correlation value acquisition section 540.

[Configuration Example of the L1C/A Preamble Detection Section]

Figure 21:
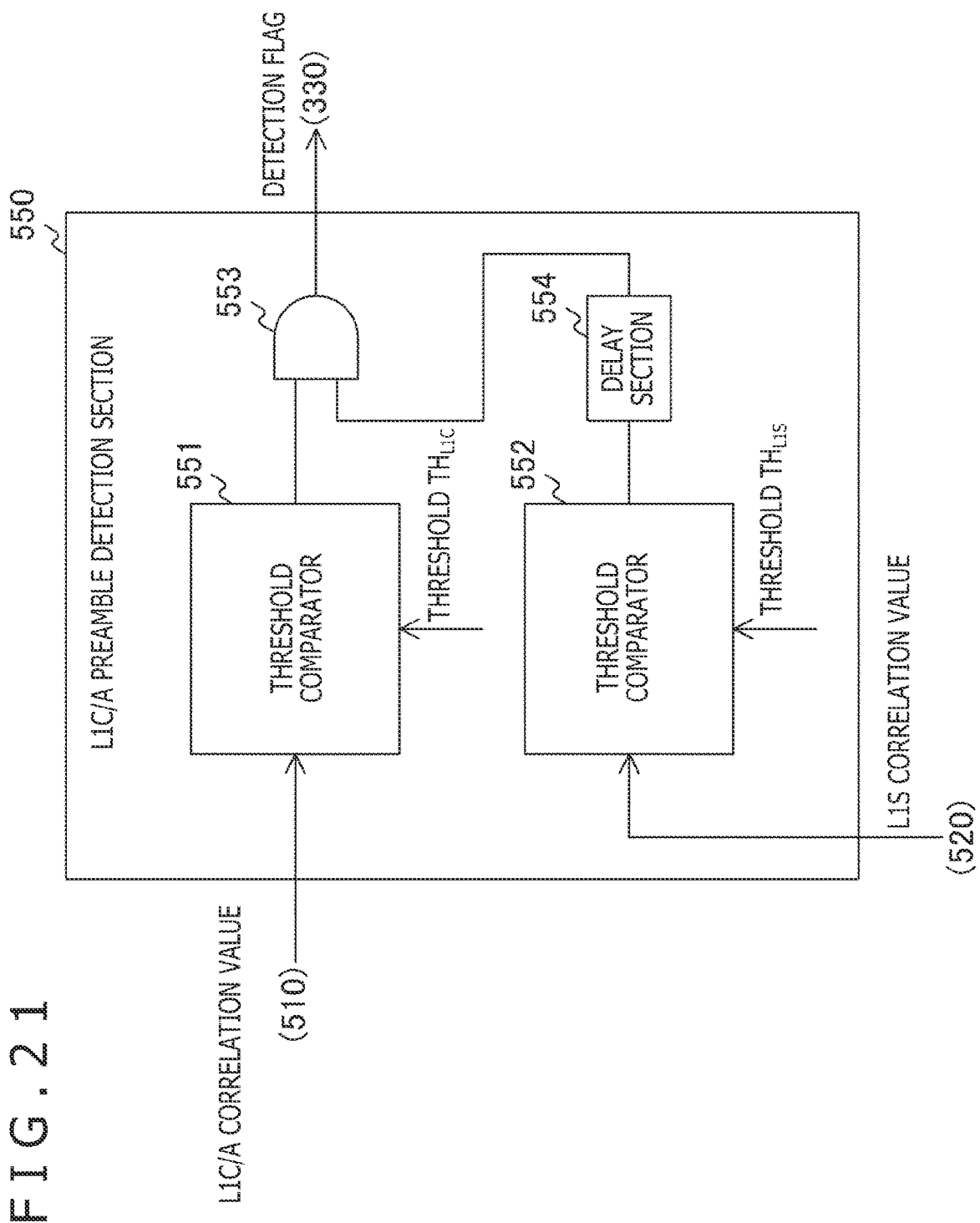
FIG. 21 is a block diagram illustrating a configuration example of an L1C/A preamble detection section in the first embodiment of the present technology.

FIG. 21 is a block diagram illustrating a configuration example of the L1C/A preamble detection section 550 in the first embodiment of the present technology. The L1C/A preamble detection section 550 includes threshold comparators 551 and 552, an AND (logical product) gate 553, and a delay section 554.

The threshold comparator 551 compares the L1C/A correlation value from the L1C/A correlation value acquisition section 510 and a given threshold $TH_{L1C}$. A peak L1C/A correlation value or a value slightly lower than the peak is set as the threshold $TH_{L1C}$. The threshold comparator 551 supplies the comparison result to the AND gate 553. This comparison result is, for example, set to a high level in the case where the L1C/A correlation value is equal to or larger than the threshold $TH_{L1C}$ and is otherwise set to a low level.

The threshold comparator 552 compares the L1S correlation value from the L1S correlation value acquisition section 520 and a given threshold $TH_{L1S}$. A peak L1S correlation value or a value slightly lower than the peak is set as the threshold $TH_{L1S}$. The threshold comparator 552 supplies the comparison result to the delay section 554. This comparison result is, for example, set to a high level in the case where the L1S correlation value is equal to or larger than the threshold $TH_{L1S}$ and is otherwise set to a low level.

The delay, section 554 delays the comparison result from the threshold comparator 552 by a certain period of time to match the timings of the comparison results. The amount of delay produced by the delay section 554 is the difference between the timing when the reception of the preamble of the L1C/A subframe ends and the timing when the reception of the preamble of the L1S frame ends, which is, for example, 128 milliseconds. The delay section 554 supplies the delayed comparison result to the AND gate 553.

The AND gate 553 obtains a logical product of the comparison results of the threshold comparators 551 and 552. The AND gate 553 supplies a bit indicating the logical product to the message decoding section 330, as a detection flag. In the case where the detection flag is "1," the presence of the preamble $P_{L1C}$ is detected. Meanwhile, in the case where the detection flag is "0," The absence of the preamble $P_{L1C}$ is detected.

The above configuration makes it possible for the L1C/A preamble detection section 550 to detect the presence or absence of the preamble $P_{L1C}$ according to whether or not a condition where the L1C/A correlation value is equal to or larger than the threshold $TH_{L1C}$ and where the L1S correlation value is equal to or larger than the threshold $TH_{L1S}$ holds.

The correlation values reach peaks at timings delayed from the reception timings of the corresponding preambles. The L1C/A correlation value reaches a peak at a timing corresponding to the reception timing of the preamble $P_{L1C}$, and the L1S correlation value reaches peaks at timings corresponding to the reception timings of the preambles $P_A$, $P_B$, and $P_C$. It is possible to adjust the L1C/A correlation value and the L1S correlation value such that the two reach peaks when the reception timings of the preambles $P_{L1C}$, $P_A$, $P_B$, and $P_C$ satisfy a given relation owing to delay times of the respective signals in the preamble detection section 500. Whether or not the L1/A correlation value and the L1S correlation value have both reached peaks can be determined by comparison with the threshold $TH_{L1C}$ and the threshold $TH_{L1S}$.

Accordingly, the L1C/A preamble detection section 550 detects the preamble $P_{L1C}$ in the case where a condition where the L1C/A correlation value is equal to or larger than the threshold $TH_{L1C}$ and where the L1S correlation value is equal to or larger than the threshold $TH_{L1S}$ holds.

Even if the same pattern as the preamble $P_{L1C}$ occurs in data other than the preamble $P_{L1C}$ in the L1C/A subframe, it is highly unlikely, on the other hand, that the same patterns as the preambles $P_A$, $P_B$, and $P_C$ will occur in the L1S frame. Accordingly, the preamble detection section 500 can prevent erroneous detection of the preamble $P_{L1C}$ by monitoring both the L1C/A correlation value and the L1S correlation value.

It is possible to provide improved reliability in the processes of obtaining time-of-day information and position information by preventing erroneous detection of the preamble $P_{L1C}$. Here, two approaches are possible, i.e., one which calculates time-of-day information by substituting pseudo distances of respective four or more positioning satellites into simultaneous equations and another which obtains time-of-day information from a phase error of C/A codes from one or more positioning satellites. While highly reliable, the former involves a number of computations, thus resulting in high power consumption. Meanwhile, while unreliable, the latter involves a small number of computations and offers low power consumption. It is possible to provide improved reliability of time-of-day information while at the same time keeping power consumption to a minimum by applying the processes of the preamble detection section 500 to the latter approach.

It should be noted that, although detecting only the presence or absence of the preamble $P_{L1C}$, the preamble detection section 500 can further detect the presence or absence of each of the preambles $P_A$, $P_B$, and $P_C$. In this case, for example, the preamble detection section 500 need only compare each of the L1SA correlation value, the L1SB correlation value, and the L1SC correlation value with the threshold. Also, in this case, the message decoding section 330 extracts the L1S message on the basis of the detection results of the preambles $P_A$, $P_B$, and $P_C$ and further decodes the L1S message. Then, the positioning computation section 340 corrects position information by using augmentation data in the L1S message. This provides improved positioning accuracy.

[Example of Operation of the Reception Apparatus]

Figure 22:
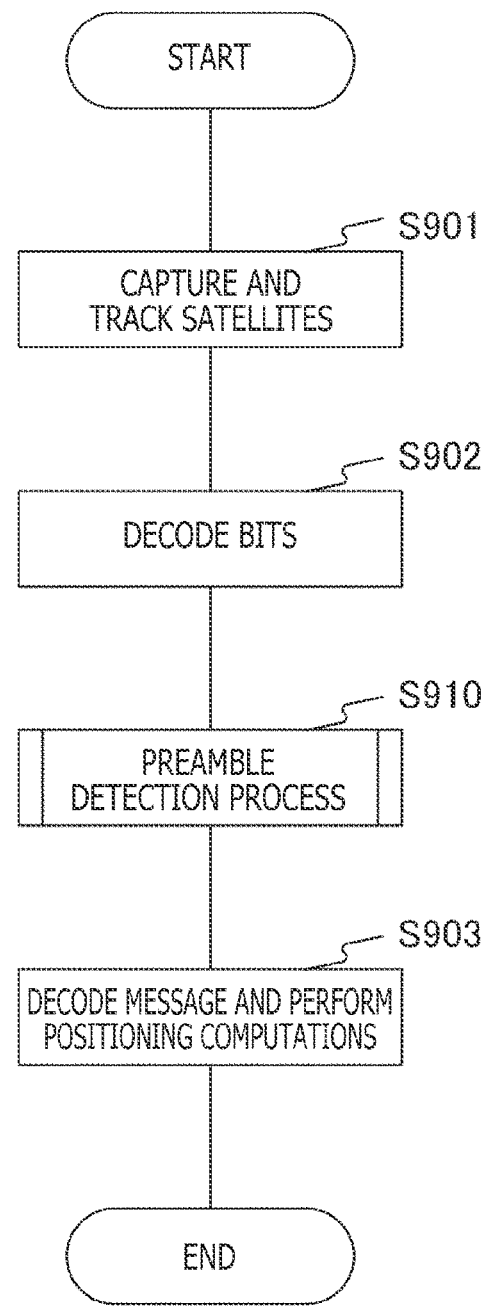
FIG. 22 is a flowchart illustrating an example of operation of a reception apparatus in the first embodiment of the present technology.

FIG. 22 is a flowchart illustrating an example of operation of the reception apparatus 200 in the first embodiment of the present technology. This operation is initiated, for example, when a given application for obtaining position information is executed.

The reception apparatus 200 captures and tracks satellites (step S901), performs bit decoding (step S902), and performs a preamble detection process of detecting the preambles (S910). Then, the reception apparatus 200 decodes the message and performs positioning computations (step S903). After step S903, the reception apparatus 200 terminates its operation. In the case where position information is obtained at certain time intervals, the processes from step S901 to step S903 are repeated at that certain time intervals.

Figure 23:
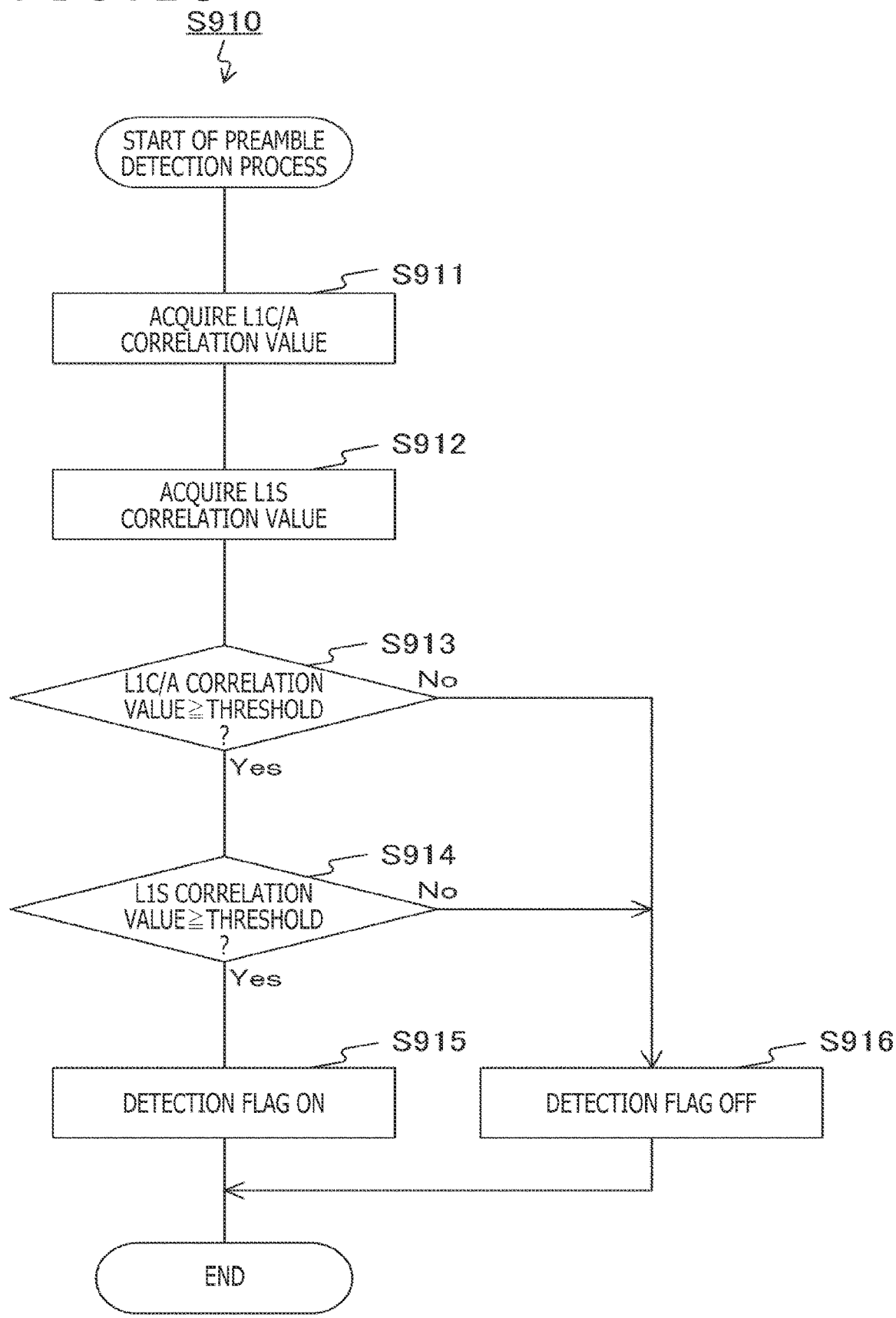
FIG. 23 is a flowchart illustrating an example of a preamble detection process in the first embodiment of the present technology.

FIG. 23 is a flowchart illustrating an example of the preamble detection process in the first embodiment of the present technology. The preamble detection section 500 acquires an L1C/A correlation value (step S911) and then acquires an L1S correlation value (step S912). Then, the preamble detection section 500 determines whether or not the L1C/A correlation value is equal to or larger than the corresponding threshold (step S913). In the case where the L1C/A correlation value is equal to or larger than the corresponding threshold (Yes in step S913), the preamble detection section 500 determines whether or not the L1S correlation value is equal to or larger than the corresponding threshold (step S914).

In the case where the L1S correlation value is equal to or larger than the corresponding threshold (Yes in step S914), the preamble detection section 500 turns ON the detection flag (step S915). In the case where the L1C/A correlation value is smaller than the corresponding threshold (No in step S913), or in the case where the L1S correlation value is smaller than the corresponding threshold (No in step S914), the preamble detection section 500 turns OFF the detection flag (step S916). After step S913 or S914, the preamble detection section 500 terminates the preamble detection process.

As described above, in the first embodiment of the present technology, the preamble detection section 500 detects the presence or absence of the preamble $P_{L1C}$ according to whether or not the reception timing of the preamble $P_{L1C}$ and those of the preambles $P_A$, $P_B$, and $P_C$ satisfy a given relation. This allows accurate detection of the preamble $P_{L1C}$ from among the preambles $P_{L1C}$, $P_A$, $P_B$, and $P_C$ that have been transmitted synchronously at timings satisfying that relation.

2. Second Embodiment

In the first embodiment described above, circuitry for tracking the L1C/A signal (e.g., multiplier 422) and circuitry for tracking the L1S signal are provided separately for each satellite processing unit 400. However, this configuration leads to an increased circuit scale as the number of satellite processing units 400 increases. The satellite tracking section 420 of this second embodiment differs from the counterpart of the first embodiment in that the circuit scale is reduced by sharing part of circuitry between the circuitry handling the L1C/A signal and the circuitry handling the L1S signal.

Figure 24:
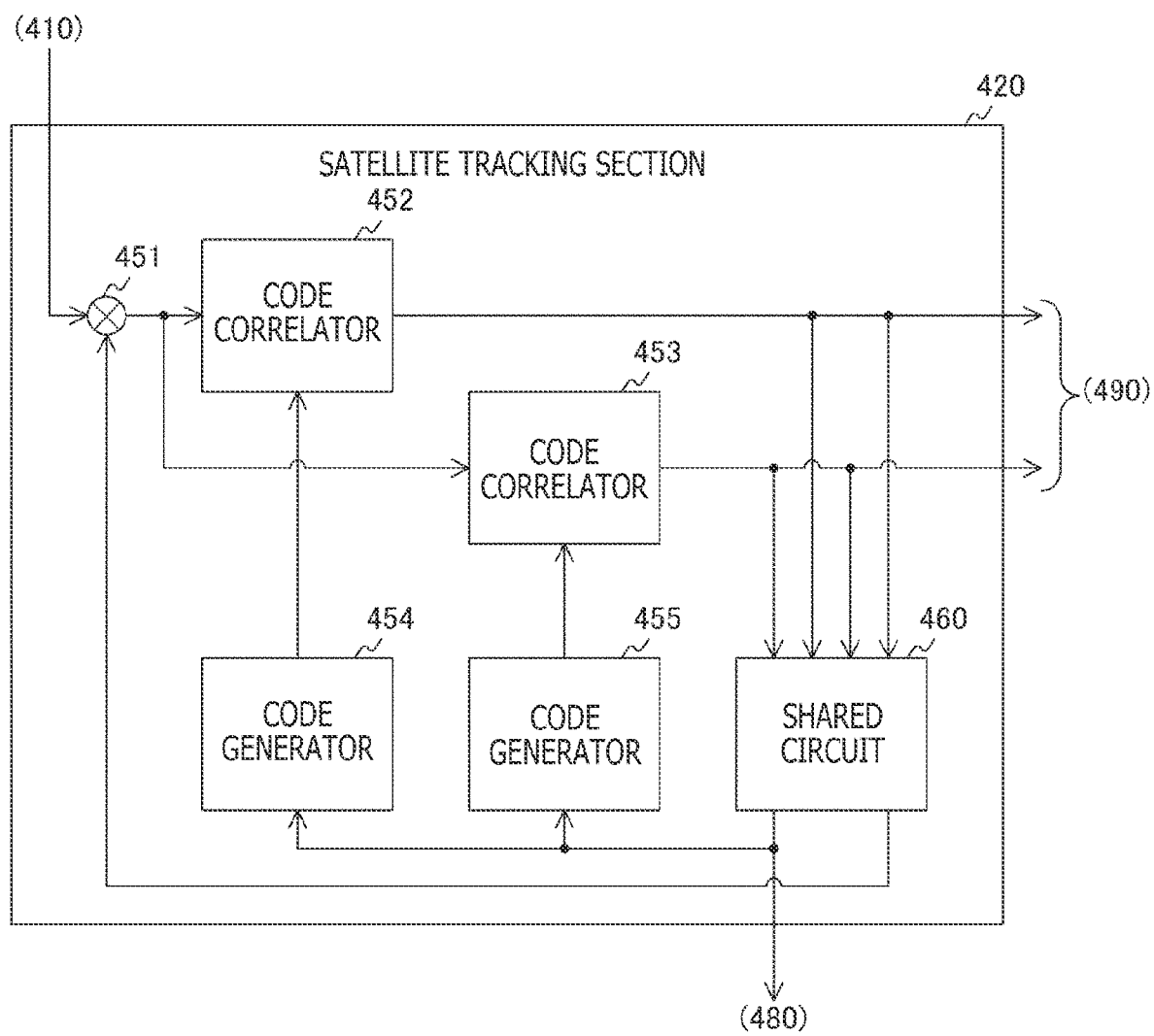
FIG. 24 is a block diagram illustrating a configuration example of a satellite tracking section in a second embodiment of the present technology.

FIG. 24 is a block diagram illustrating a configuration example of the satellite tracking section 420 in the second embodiment of the present technology. The satellite tracking section 420 in the second embodiment includes a multiplier 451, code correlators 452 and 453, code generators 454 and 455, and a shared circuit 460.

The multiplier 451 multiplies a baseband signal from the satellite capturing section 410 by a periodic signal from the shared circuit 460 and supplies the multiplication result to the code correlators 452 and 453.

The code correlator 452 obtains a correlation value between the multiplication result from the multiplier 451 and an identification code from the code generator 454. The code correlator 452 supplies a correlation output signal indicating the correlation value to the shared circuit 460. Also, this correlation output signal is supplied to the bit decoding section 490, as an L1C/A signal. It should be noted that the code correlator 452 is an example of the first correlator set forth in the claims.

The code generator 454 generates an identification code for an assigned positioning satellite. A C/A (Coarse/Acquisition) code is, for example, used as an identification code. It should be noted that the code generator 454 is an example of the first code generator set forth in the claims.

The code correlator 453 obtains a correlation value between the multiplication result from the multiplier 451 and a code from the code generator 455. The code correlator 453 supplies a correlation output signal indicating the correlation value to the shared circuit 460. Also, this correlation output signal is supplied to the bit decoding section 490, as an L1S signal. It should be noted that the code correlator 453 is an example of the second correlator set forth in the claims.

The code generator 455 generates an L1S code. It should be noted that the code generator 455 is an example of the second code generator set forth in the claims.

The shared circuit 460 is a circuit shared by the L1C/A circuitry such as the code correlator 452 and the L1S circuitry such as the code correlator 453.

Figure 25:
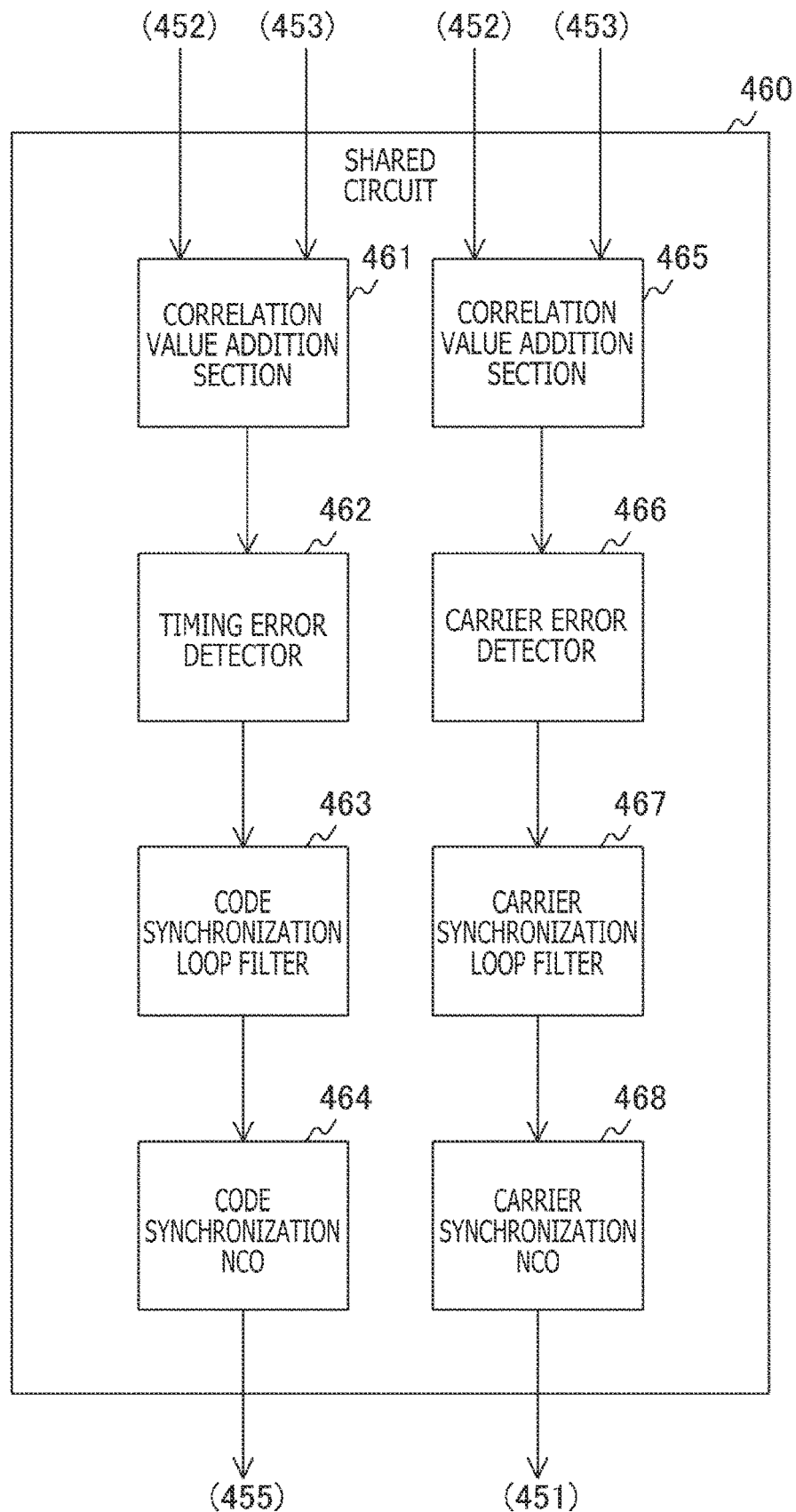
FIG. 25 is a block diagram illustrating a configuration example of a shared circuit in the second embodiment of the present technology.

FIG. 25 is a block diagram illustrating a configuration example of the shared circuit 460 in the second embodiment of the present technology. The shared circuit 460 includes a correlation value addition section 461, a timing error detector 462, a code synchronization loop filter 463, a code synchronization NCO 464, a correlation value addition section 465, carrier error detector 466, a carrier synchronization loop filter 467, and a carrier synchronization NCO 468.

The correlation value addition sections 461 and 465 add the correlation output signal from the code correlator 452 and the correlation output signal from the code correlator 453 together. The correlation value addition section 461 supplies the sum signal to the timing error detector 462, and the correlation value addition section 465 supplies the sum signal to the carrier error detector 466. This addition process provides larger signal inputs to the timing error detector 462 and the carrier error detector 466, thus ensuring improved SN (Signal-Noise) ratio as compared to the case without any addition.

The timing error detector 462, the code synchronization loop filter 463, the code synchronization NCO 464, the carrier error detector 466, the carrier synchronization loop filter 467, and the carrier synchronization NCO 468 are configured similarly to their counterparts in the first embodiment, respectively. It should be noted that the code synchronization NCO 464 supplies a control signal to the code generators 454 and 455.

As described above, according to the second. embodiment of the present technology, the circuitry handling the L1C/A signal and the circuitry handling the L1S signal share circuits such as the timing error detector 462, thus achieving a reduced circuit scale as compared to the configuration having separate circuits.

3. Third Embodiment

In the first embodiment described above, the L1C/A preamble detection section 550 compares the L1C/A correlation value and the L1S correlation value with their corresponding thresholds. However, the correlation values may decrease due to, for example, noise, thus resulting in degraded preamble detection accuracy. The L1C/A preamble detection section 550 in this third embodiment differs from the counterpart of the first embodiment in that the SN ratio is improved by multiplying any one of the L1C/A correlation value or the L1S correlation value and adding the product thereof and the other of the two.

Figure 26:
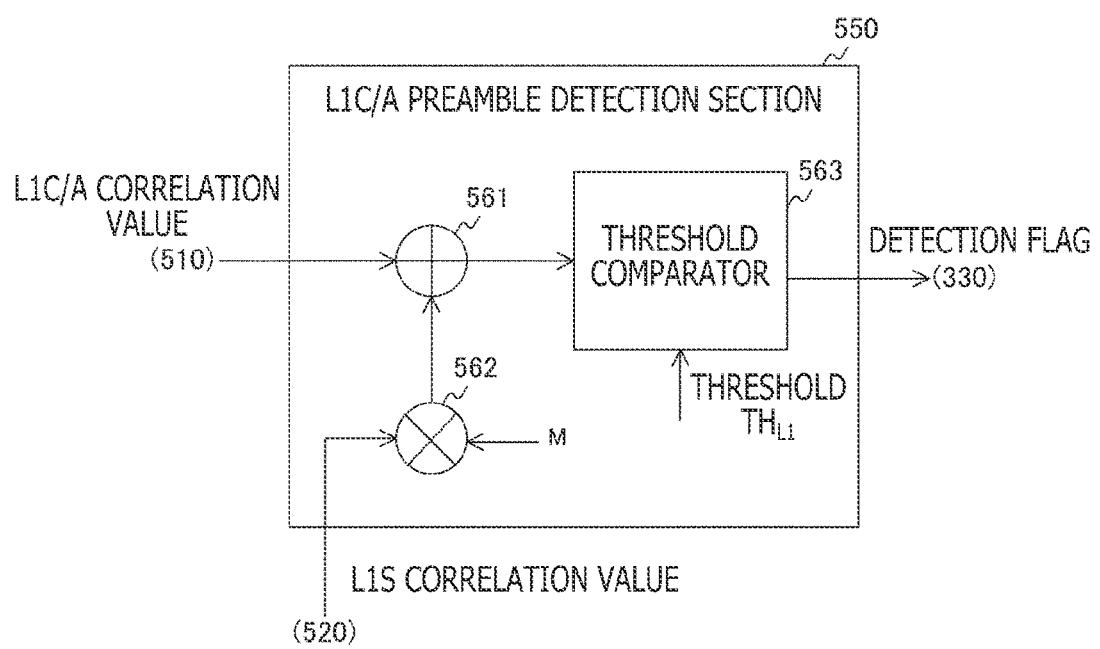
FIG. 26 is a block diagram illustrating a configuration example of an L1C/A preamble detection section in a third embodiment of the present technology.

FIG. 26 is a block diagram illustrating a configuration example of the L1C/A preamble detection section 550 in the third embodiment of the present technology. The L1C/A preamble detection section 550 in this third embodiment includes an adder 561, a multiplier 562, and a threshold comparator 563.

The multiplier 562 multiplies the L1S correlation value from the L1S correlation value acquisition section 520 by a given value M (where M is an integer). The multiplier 562 supplies the multiplication result to the adder 561.

The adder 561 adds the L1C/A correlation value from the L1C/A correlation value acquisition section 510 and the multiplication result from the multiplier 562 together. The adder 561 supplies the sum to the threshold comparator 563.

The threshold comparator 563 compares the sum from the adder 561 and a threshold $TH_{L1}$. In the case where the peak of the L1C/A correlation value is denoted as $PK_{L1C}$ and where the peak of the L1S correlation value is denoted as $PK_{L1S}$, a value satisfying the following equation is set as a threshold $TH_{L1}$, for example.

$$TH_{L1} = PK_{L1C} + PK_{L1S} \times M - a$$

Where, in the above equation, "a" is a margin and set to a small integer smaller than the peaks $PK_{L1C}$ and $PK_{L1S}$.

It should be noted that, although multiplying the L1S correlation value and adding the product thereof to the L1C/A correlation value, the L1C/A preamble detection section 550 can also conversely multiply the L1C/A value and add the product thereof to the L1S correlation value. Also, although multiplying only the L1S correlation value, the L1C/A preamble detection section 550 can multiply each of the L1C/A correlation value and the L1S correlation value and add the products thereof together.

The threshold comparator 563 supplies a comparison result to the message decoding section 330, as a detection flag. The adder 561 and the multiplier 562 multiply the L1S correlation value and add the product to the L1C/A correlation value, thus providing a higher level of signal to be compared with the threshold, as compared to the case in which these operations are not performed and ensuring improved SN ratio.

It should be noted that circuitry can be reduced in the satellite tracking section 420 of the third embodiment as in the second embodiment.

As described above, according to the third embodiment of the present technology, the L1C/A preamble detection section 550 multiplies the L1S correlation value and adds the product to the L1C/A correlation value, thus providing a higher level of signal to be compared with the threshold as compared to the case in which these operations are not performed. This ensures improved SN ratio.

4. Fourth Embodiment

In the first embodiment described above, the L1C/A preamble detection section 550 compares the L1C/A correlation value and the L1S correlation value with their corresponding thresholds. In this configuration, however, the L1C/A correlation value reaches a peak at six-second intervals, thus causing the detection flag to turn ON at six-second intervals. The L1C/A preamble detection section 550 of this fourth embodiment differs from the counterpart of the first embodiment in that the detection intervals are reduced by comparing the larger of the delayed L1C/A correlation value and the non-delayed L1C/A correlation value with the threshold.

Figure 27:
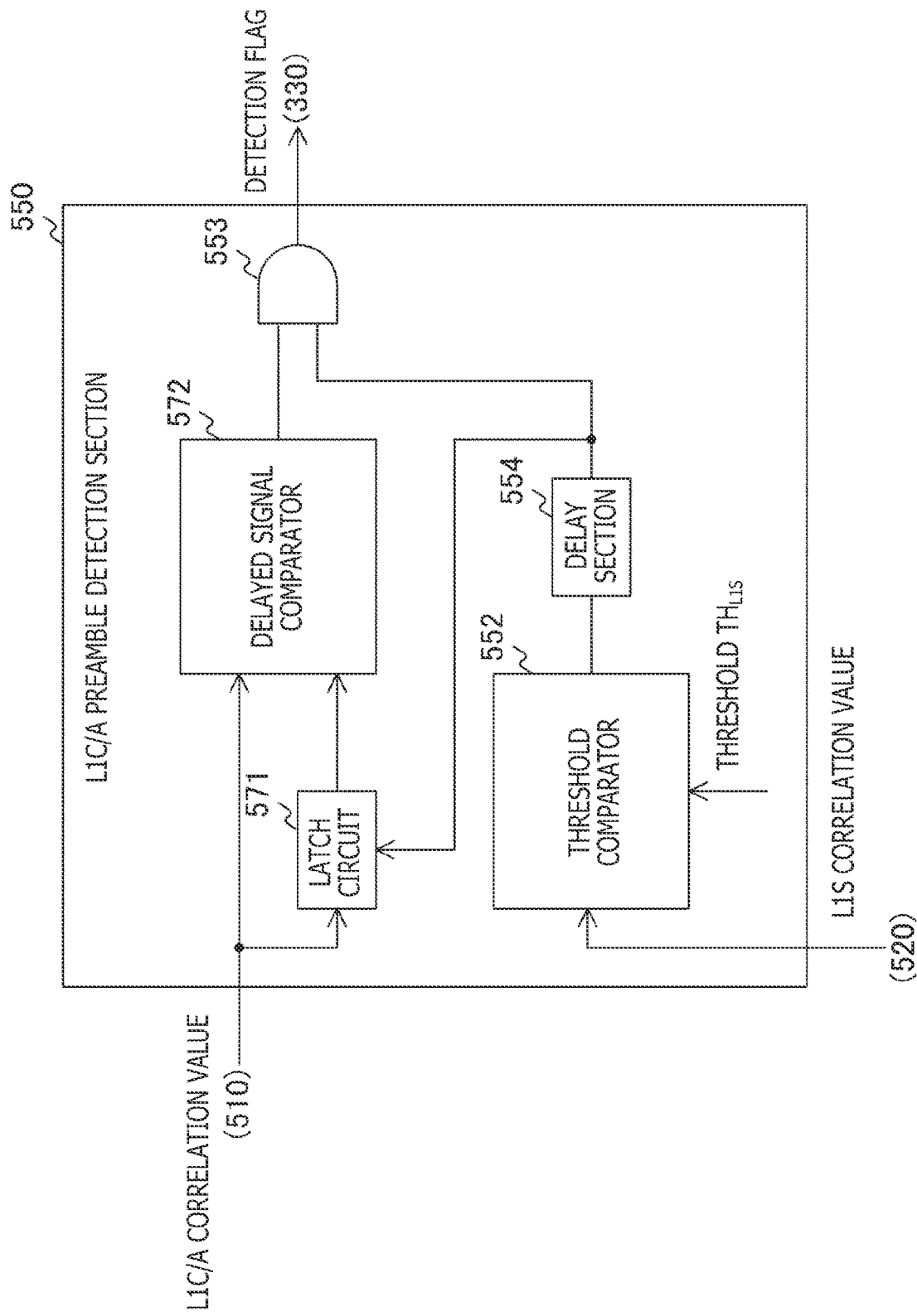
FIG. 27 is a block diagram illustrating a configuration example of an L1C/A preamble detection section in a fourth embodiment of the present technology.

FIG. 27 is a block diagram illustrating a configuration example of the L1C/A preamble detection section 550 in the fourth embodiment of the present technology. The L1C/A preamble detection section 550 of the fourth embodiment includes a latch circuit 571, a delayed signal comparator 572, an AND gate 553, a threshold comparator 552, and a delay section 554.

The threshold comparator 552 compares the L1S correlation value and the threshold $TH_{L1S}$ as in the first embodiment and supplies the comparison result to the delay section 554. The delay section 554 delays the comparison result from the threshold comparator 552 by a certain period of time. The amount of delay produced by the delay section 554 is the difference between the timing when the reception of the preamble of the L1C/A subframe ends and the timing when the reception of the preamble of the L1S frame ends, which is, for example, 128 milliseconds. The delay section 554 supplies the delayed comparison result to the latch circuit 571 and the AND gate 553.

The latch circuit 571 retains the L1C/A correlation value from the L1C/A correlation value acquisition section 510. The latch circuit 571 updates the retained value when the comparison result from the delay section 554 reaches a given value (e.g., high level). The comparison result is updated every three seconds. Accordingly, the L1C/A correlation value is delayed by three seconds by the latch circuit 571. The latch circuit 571 supplies the delayed correlation value to the delayed signal comparator 572.

The delayed signal comparator 572 compares the larger of the non-delayed L1C/A correlation value and the delayed L1C/A correlation value from the latch circuit 571 with the threshold $TH_{L1C}$. The delayed correlation value is delayed by three seconds as compared to the value before being delayed. Accordingly, the correlation value to be compared with the threshold $TH_{L1C}$ reaches a peak every three seconds. The delayed signal comparator 572 supplies the comparison result to the AND gate 553. The AND gate 553 is configured similarly to the counterpart of the first embodiment.

Owing to the above configuration, the L1C/A preamble detection section 550 detects the preamble $P_{L1C}$ in the case where the larger of the delayed L1C/A. correlation value and the non-delayed L1C/A correlation value is equal to or larger than the threshold $TH_{L1C}$ and in the case where the L1S correlation value is equal to or larger than the threshold $TH_{L1S}$. The larger of the delayed L1C/A correlation value and The non-delayed L1C/A correlation value reaches a peak every three seconds assuming that the delay time is three seconds. In addition, the L1S correlation value also reaches a peak every three seconds. Accordingly, the L1C/A preamble detection section 550 can detect the preamble $P_{L1C}$ every three seconds, thus providing reduced detection intervals as compared to the first embodiment in which the preamble $P_{L1C}$ is detected every six seconds.

It should be noted that circuitry can be reduced in the satellite tracking section 420 of the fourth embodiment as in the second embodiment.

As described above, in the fourth embodiment of the present technology, the L1C/A preamble detection section 550 detects the preamble $P_{L1C}$ in the case where the larger of the delayed L1C/A correlation value and the non-delayed L1C/A correlation value is equal to or larger than the threshold $TH_{L1C}$ and in the case where the L1S correlation value is equal to or larger than the threshold $TH_{L1S}$. This provides reduced detection intervals of the preamble $P_{L1C}$ as compared to the first embodiment in which the 1C/A correlation value is not delayed.

5. Fifth Embodiment

In the first embodiment described above, the L1S correlation value is obtained by adding six seconds worth of the L1SA, L1SB, and L1SC correlation values for each of the satellite processing units 400. However, this configuration requires, for each satellite processing units 400, six circuits for computing the correlation values such as preamble correlators, thus resulting in an increased circuit scale with increase in the number of the satellite processing units 400. The L1S correlation value acquisition section 520 of this fifth embodiment differs from the counterpart of the first embodiment in that the circuit scale is reduced by adding three seconds worth of the correlation values.

Figure 28:
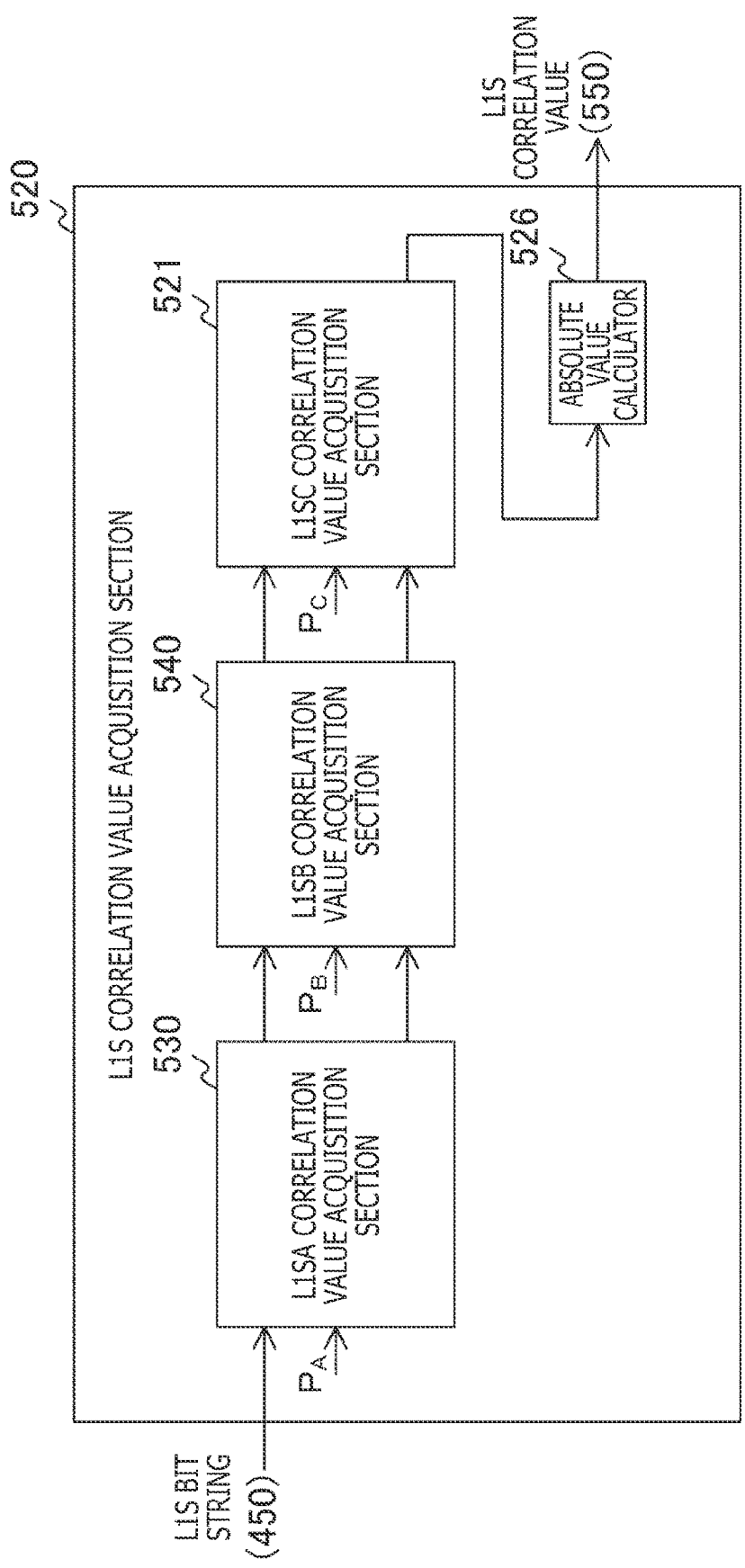
FIG. 28 is a block diagram illustrating a configuration example of an L1S correlation value acquisition section in a fifth embodiment of the present technology.

FIG. 28 is a block diagram illustrating a configuration example of the L1S correlation value acquisition section 520 in the fifth embodiment of the present technology. The L1S correlation value acquisition section 520 of this fifth embodiment differs from the counterpart of the first embodiment in that the L1SA correlation value acquisition section 522, the L1SB correlation value acquisition section 523, and the L1SC correlation value acquisition section 524 are not provided. Also, the L1SC correlation value acquisition section 521 supplies the sum to the absolute value calculator 526.

The above configuration achieves a reduced circuit scale of the L1S correlation value acquisition section 520 by as much as the removal of the L1SA correlation value acquisition section 522, the L1SB correlation value acquisition section 523, and the L1SC correlation value acquisition section 524.

It should be noted that circuitry can be reduced in the satellite tracking section 420 of the fifth embodiment as in the second embodiment. Also, the circuitry of the third or fourth embodiment is applicable to the L1C/A preamble detection section 550 of the fifth embodiment.

As described above, in the fifth embodiment of the present technology, the LASA correlation value acquisition section 522, the L1SB correlation value acquisition section 523, and the L1SC correlation value acquisition section 524 have been removed, thus achieving a reduced circuit scale of the L1S correlation value acquisition section 520 by as much as the removal thereof.

MODIFICATION EXAMPLE

In the fifth embodiment described above, the L1S correlation value is obtained by adding three seconds worth of the L1SA, L1SB, and L1SC correlation values for each of the satellite processing units. However, this configuration requires, for each satellite processing units 400, three circuits for computing the correlation values such as preamble correlators, thus resulting in an increased circuit scale with increase in the number of the satellite processing units 400. The L1S correlation value acquisition section 520 of this modification example of the fifth embodiment differs from the counterpart of the fifth embodiment in that the circuit scale is further reduced.

Figure 29:
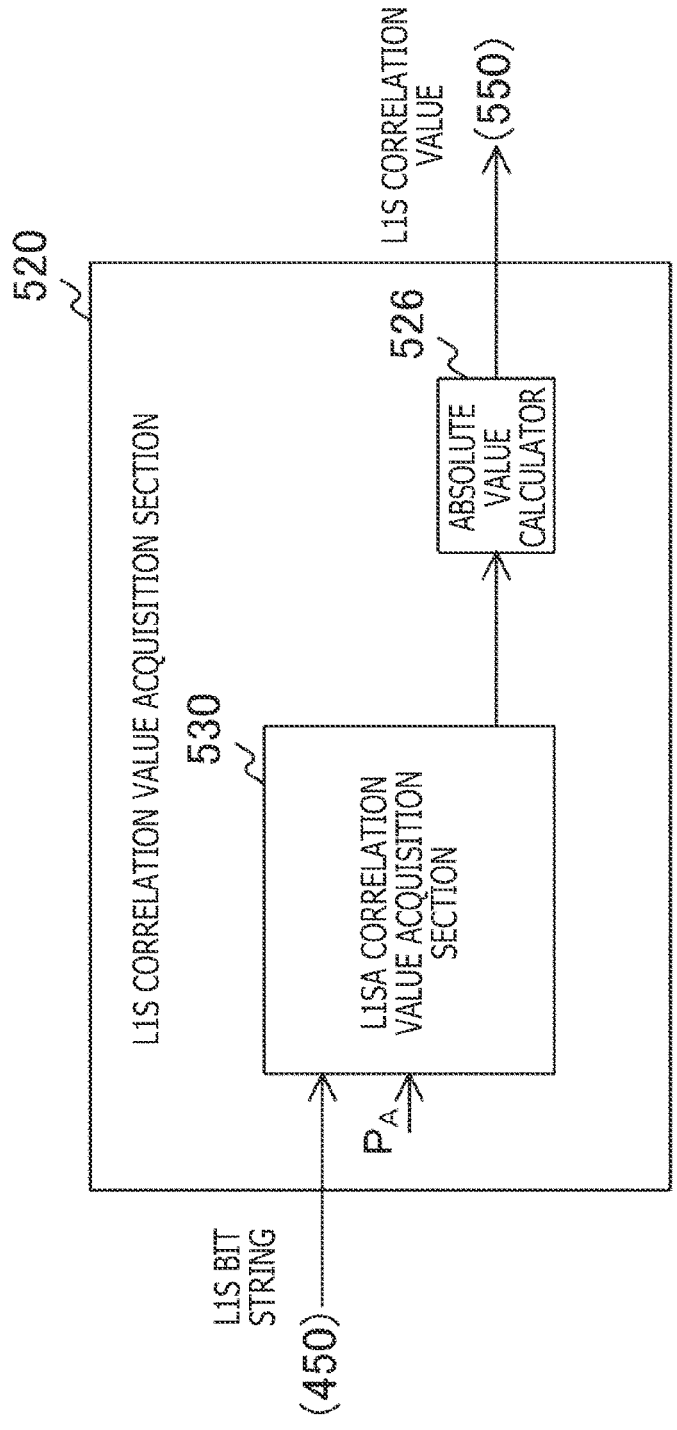
FIG. 29 is a block diagram illustrating a configuration example of an L1S correlation value acquisition section in a modification example of the fifth embodiment of the present technology.

FIG. 29 is a block diagram illustrating a configuration example of the L1S correlation value acquisition section 520 in the fifth embodiment of the present technology. The L1S correlation value acquisition section 520 of a modification example of the fifth embodiment differs from the counterpart of the first embodiment in that the L1SB correlation value acquisition section 540 and the L1SC correlation value acquisition section 521 are not provided. Also, the L1SA correlation value acquisition section 530 supplies the L1SA correlation value to the absolute value calculator 526.

The above configuration achieves a reduced circuit scale of the L1S correlation value acquisition section 520 by as much as the removal of the L1SB correlation value acquisition section 540 and the L1SC correlation value acquisition section 521.

It should be noted that, although obtaining only the L1SA correlation value, the L1S correlation value acquisition section 520 may obtain only one of the L1SB correlation value or the L1SC correlation value. Also, the L1S correlation value acquisition section 520 can obtain only two of the L1SA correlation value, the L1SB correlation value, or the L1SC correlation value (i.e., two seconds worth of the correlation values) and add them together. Also, the L1S correlation value acquisition section 520 can obtain four or five seconds worth of the correlation values.

As described above, in the modification example of the fifth embodiment of the present technology, the L1SB correlation value acquisition section 540 and the L1SC correlation value acquisition section 521 have been removed, thus achieving a reduced circuit scale of the L1S correlation value acquisition section 520 by as much as the removal thereof.

6. Sixth Embodiment

In the first embodiment described above, the preamble deter ton section 500 obtains the L1S correlation value from 24 bits having the preambles $P_A$, $P_B$, and $P_C$ arranged in this order. With this configuration, however, it is difficult to achieve faster phase matching between the L1C/A correlation value and the L1S correlation value. The preamble detection section 500 of this sixth embodiment differs from the counterpart of the first embodiment in that the intervals at which the L1S correlation value reaches a peak are reduced by obtaining the correlation values in a different order of the preambles for faster phase matching.

FIG. 30 is a block diagram illustrating a configuration example of the L1S correlation value acquisition section 520 in the sixth embodiment of the present technology. The L1S correlation value acquisition section 520 of the sixth embodiment includes sum acquisition sections 580 and 600 and an absolute value calculator 526.

The sum acquisition sections 580 and 600 obtain sums of three seconds worth of a correlation value. The sum acquisition section 580 supplies the sum to the sum acquisition section 600, after which the sum acquisition section 600 further adds the sum obtained by itself to the sum from the previous step and supplies the resulting sum to the absolute value calculator 526.

FIG. 31 is a block diagram illustrating a configuration example of the sum acquisition section 580 at a first stage in the sixth embodiment of the present technology. The sum acquisition section 580 includes delay sections 581, 583, and 585, registers 582, 584, and 586, a selector 587, preamble correlators 588, 589, and 590, and adders 591 and 592.

The delay section 581 delays the L1S bit string from the convolution code decoder 493 and causes the register 582 to retain the delayed bit string. The delay section 583 delays the L1S bit string from the register 582 and causes the register 584 to retain the delayed bit string. The delay section 585 delays the L1S bit string from the register 584 and causes the register 586 to retain the delayed bit string. The register 586 supplies the bits to the sum acquisition section 600 in sequence.

The selector 587 changes connection destinations of output terminals according to a selection signal. The selector 587 has input terminals In1 to In9 and output terminals Out1 to Out3. An eight-bit signal is input to or output from each of the terminals. It should be noted that the selector 587 is an example of the first selector set forth in the claims.

Eight bits retained by the register 582 are input to the input terminals In1, In5, and In9. Eight bits retained by the register 584 are input to the input terminals In2, In6, and In7. Eight bits retained by the register 586 are input to the input terminals In3, In4, and In8.

Also, the output terminal Out1 is connected to the preamble correlator 588, and the output terminal Out2 is connected to the preamble correlator 589. The output terminal Out3 is connected to the preamble correlator 590.

Also, a selection signal is input to the selector 587. The selection signal takes on one of three different values and changes from one value to another in a certain sequence every second. For example, the selection signal is set to "0" in an initial state, changes to "1" one second later, and then changes to "2" one more second later. From here onwards, the value changes similarly in the order of "0," "1," and "2" every second.

The selector 587 switches the connection destinations of the output terminals Out1 to Out3 to the input terminals In1 to In3, respectively, in the case where the selection signal is "0." Also, the selector 587 switches the connection destinations of the output terminals Out1 to Out3 to the input terminals In4 to In6, respectively, in the case where the selection signal is "1." The selector 587 switches the connection destinations of the output terminals Out1 to Out3 to the input terminals In7 to In9, respectively, in the case where the selection signal is "2."

The preamble correlators 588, 589, and 590 obtain L1SA, L1SB, and L1SB correlation values through correlation computation between specified values of the preambles $P_A$, $P_B$, and $P_C$ and an input bit string.

The adder 591 adds the L1SA correlation value and the L1SB correlation value together and supplies the sum to the adder 591. The adder 592 adds the L1SC correlation. value to the sum and supplies the resulting sum to the sum acquisition section 600.

It should be noted that the preamble correlator 588 is an example of the first correlation value acquisition section set forth in the clams. A circuit that includes the preamble correlator 589 and the adder 591 is an example of the second correlation value acquisition section set forth in the claims. A circuit that includes the preamble correlator 590 and the adder 592 is an example of the third correlation value acquisition section set forth in the claims.

Owing to the above configuration, correlation values are calculated from 24 bits having the preambles $P_A$, $P_B$, and $P_C$ arranged in this order, in the case where the selection signal is "0." Also, correlation values are calculated from 24 bits having the preambles $P_C$, $P_A$, and $P_B$ arranged in this order, in the case where the selection signal is "1." Further, correlation values are calculated from 24 bits having the preambles $P_B$, $P_C$, and $P_A$ arranged in this order, in the case where the selection signal is "2."

Figure 32:
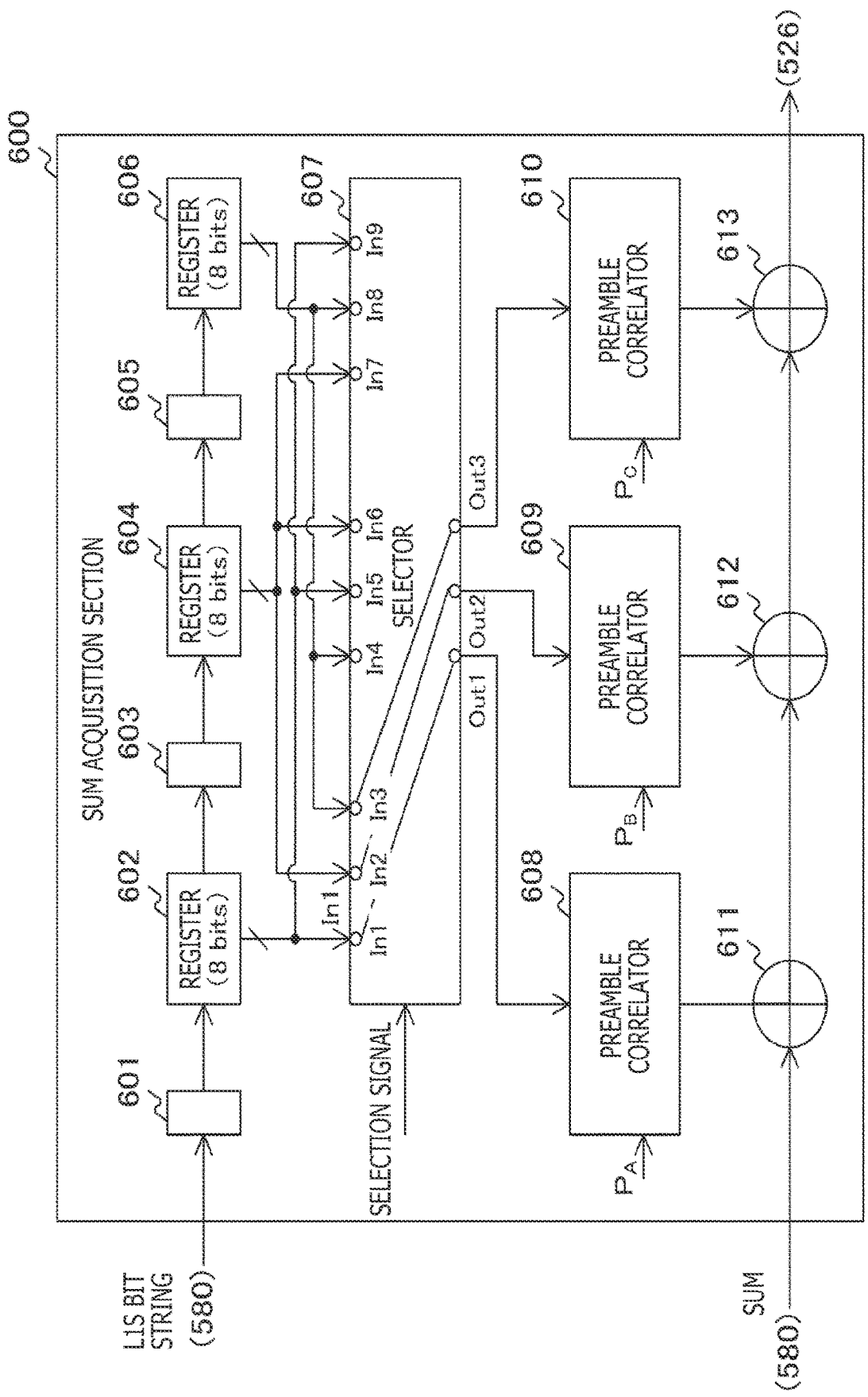
FIG. 32 is a block diagram illustrating a configuration example of a sum acquisition section at a second stage in the sixth embodiment of the present technology.

FIG. 32 is a block diagram illustrating a configuration example of the sum acquisition section 600 at a second stage in the sixth embodiment of the present technology. The sum acquisition section 600 includes delay sections 601, 603, and 605, registers 602, 604, and 606, a selector 607, preamble correlators 608, 609, and 610, and adders 611, 612, and 613.

The delay sections 601, 603, and 605, the registers 602, 604, and 606, the selector 607, and the preamble correlators 608, 609, and 610 are configured similarly to the corresponding circuits at the previous stage.

The adder 611 adds the sum from the sum acquisition section 580 and the L1SA correlation value of the preamble correlator 608 together and supplies the sum to the adder 612. The adder 612 adds the sum from the previous stage and the L1SB correlation value of the preamble correlator 609 and supplies the resulting sum to the adder 612. The adder 613 adds the sum from the previous stage and the L1SC correlation value of the preamble correlator 610 and supplies the resulting sum to the absolute value calculator 526.

It should be noted that the selector 607 is an example of the second selector set forth in the claims. A circuit that includes the preamble correlator 608 and the adder 611 is an example of the fourth correlation value acquisition section set forth in the claims. A circuit that includes the preamble correlator 609 and the adder 612 is as example of the fifth correlation value acquisition section set forth in the claims. A circuit that includes the preamble correlator 610 and the adder 613 is an example of the sixth correlation value acquisition section set forth in the claims.

Figure 33:
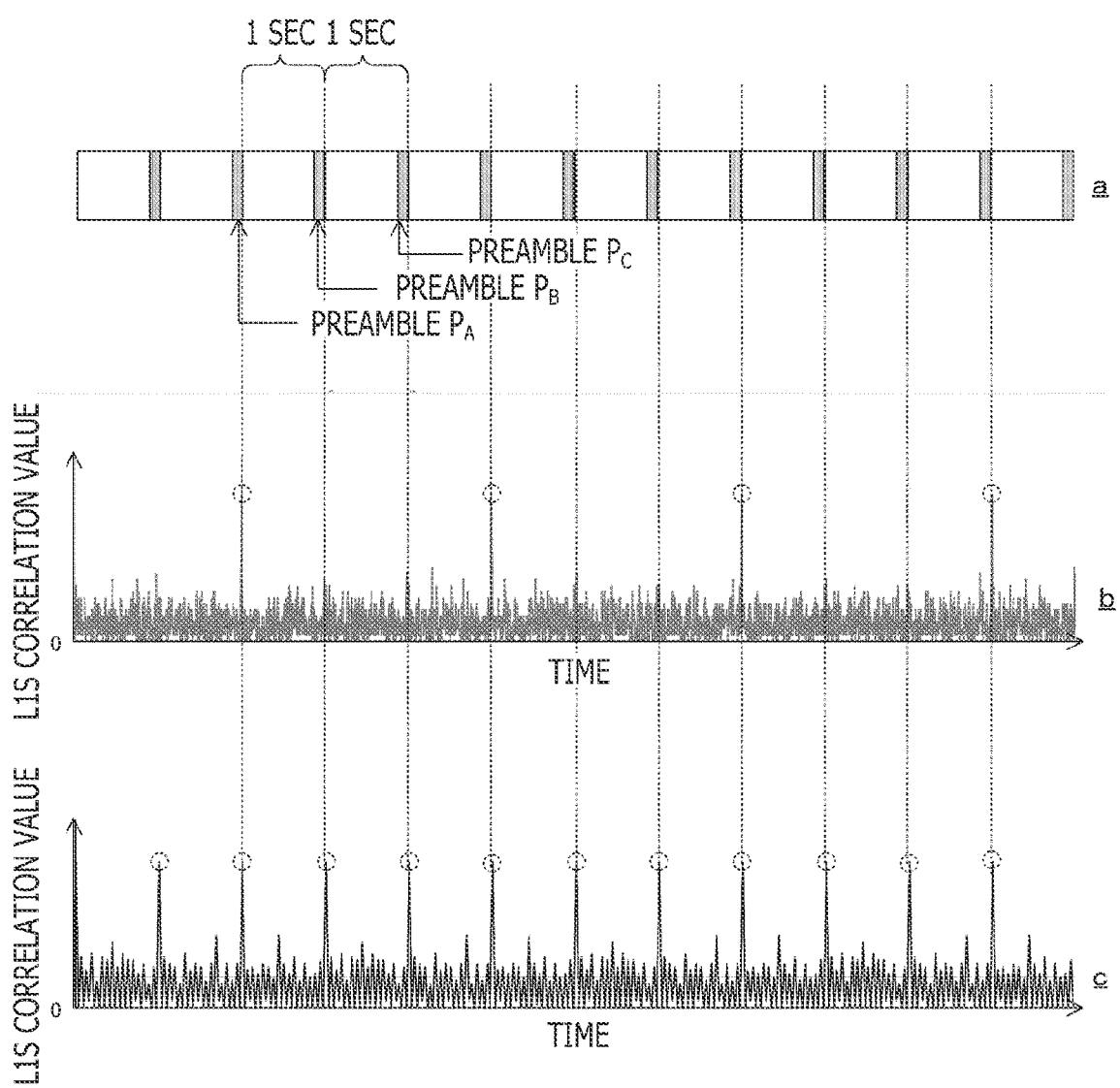
FIG. 33 depicts diagrams illustrating an example of an L1S subframe and an example of fluctuation of an L1S correlation value in the sixth embodiment of the present technology.

FIG. 33 depicts diagrams illustrating an example of an L1S subframe and an example of fluctuation of an L1S correlation value in the sixth embodiment of the present technology. In FIG. 33, *a* illustrates an example of a data structure of an L1S frame. In FIG. 33, *b* illustrates an example of fluctuation of an L1S correlation value in the first embodiment. In FIG. 33, *c* illustrates an example of fluctuation of an L1S correlation value in the sixth embodiment.

As illustrated in b of FIG. 33, in the first embodiment that calculates correlation values from 24 bits having the preambles $P_A$, $P_B$, and $P_C$ arranged in this order, the L1S correlation value reaches a peak every three seconds.

Meanwhile, as illustrated is c of FIG. 33, is the sixth embodiment that changes the order of the preambles every second, the L1S correlation value reaches a peak every second as a result of the change, thus providing a shorter time to reach a peak than in the first embodiment.

FIG. 34 is a diagram illustrating examples of fluctuation of correlation values in the sixth embodiment of the present technology. The L1S correlation value calculated from 24 bits having the preambles $P_C$, $P_A$, and $P_B$ arranged in this order is assumed to reach a peak at time T11.

Also, the reception of the preamble $P_{L1C}$ starts at time T12 following time T11. The reception ends at time T13 that is 160 milliseconds after time T12, and the L1C/A correlation value reaches a peak.

Meanwhile, the correlation computation on the preamble $P_A$ starts at time T14 at which a delay time Tb that is time required for Viterbi decoding has elapsed from time T12, and the L1S correlation value reaches a peak at time T15 that is 32 milliseconds later.

The time period from time T11 when the L1S correlation value reaches a peak to time T15 when the correlation value next reaches a peak is one second. Accordingly, a wait time Tw from time T11 when the correlation computation ends to time T12 when the next decoding starts can be expressed by the following equation:

$$Tw=1000-(Tb+32)$$

where
the wait time Tw and the delay time Tb are, for example, in the unit of milliseconds.

It should be noted that circuitry can be reduced in the satellite tracking section 420 of the sixth embodiment as in the second embodiment. Also, the circuitry of the third or fourth embodiment is applicable to the L1C/A preamble detection section 550 of the sixth embodiment.

As described above, according to the sixth embodiment of the present technology, the preamble detection section 500 obtains the L1S correlation value by changing the order of the preambles $P_A$, $P_B$, and $P_C$, thus providing shorter intervals or one-second intervals between peaks of the correlation value.

FIRST MODIFICATION EXAMPLE

In the sixth embodiment described above, the L1S correlation value is obtained by adding three seconds worth of the L1SA correlation value, the L1SB correlation value, and the L1SB correlation value for each satellite processing unit.

However, this configuration requires, for each satellite processing units 400, six circuits for computing the correlation values such as preamble correlators, thus resulting in an increased circuit scale with increase in the number of the satellite processing units 400. The L1S correlation value acquisition section 520 of a first modification example of this sixth embodiment differs from the counterpart of the sixth embodiment in that the circuit scale is reduced.

FIG. 35 is a block diagram illustrating a configuration example of the L1S correlation value acquisition section 520 in the sixth embodiment of the present technology. The L1S correlation value acquisition section 520 in the first modification example of the sixth embodiment differs from the counterpart of the first embodiment in that the sum acquisition section 600 and the absolute value calculator 526 are not provided. Also, the sum acquisition section 580 supplies the sum to the L1C/A preamble detection section 550, as the L1S correlation value.

The above configuration achieves a reduced circuit scale of the L1S correlation value acquisition section 520 by as much as the removal of the sum acquisition section 600 and the absolute value calculator 526.

Figure 36:
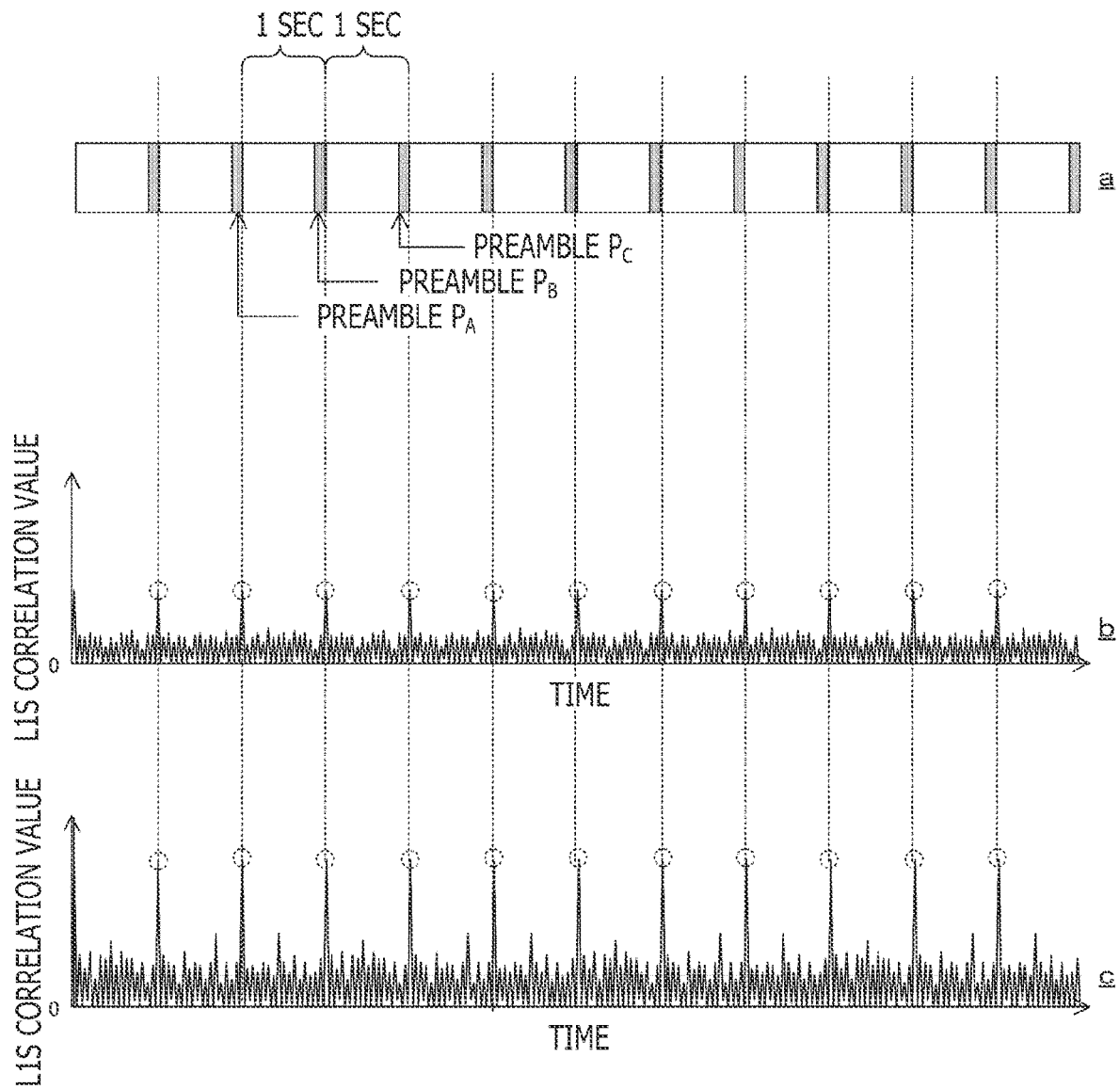
FIG. 36 depicts diagrams illustrating an example of an L1S subframe and an example of fluctuation of an L1S correlation value in the first modification example of the sixth embodiment of the present technology.

FIG. 36 depicts diagrams illustrating an example of an L1S subframe and an example of fluctuation of an L1S correlation value in the first modification example of the sixth embodiment of the present technology. In FIG. 36, a illustrates an example of a data structure of an L1S frame. In FIG. 36, b illustrates an example of fluctuation of an L1S correlation value in the first modification example of the sixth embodiment. In FIG. 36, c illustrates an example of fluctuation of an L1S correlation value in the sixth embodiment.

As illustrated in b of FIG. 36, the peak of the L1S correlation value has decreased to a half as compared to that in the sixth embodiment as a result of the removal of the sum acquisition section 600.

As described above, in the first modification example of the sixth embodiment of the present technology, the sum acquisition section 600 and the absolute value calculator 526 have been removed, thus achieving a reduced circuit scale of the L1S correlation value acquisition section 520 by as much as the removal thereof.

SECOND MODIFICATION EXAMPLE

In the first modification example of the sixth embodiment described above, the circuit scale is reduced by as much as the removal of the sum acquisition section 600 and the absolute value calculator 526. Instead, however, the peak value of the L1S correlation value is decreased to a half, thus resulting in a reduced SN ratio. This second modification example of the sixth embodiment differs from the first modification example in that the SN ratio improves owing to accumulation of sums.

Figure 37:
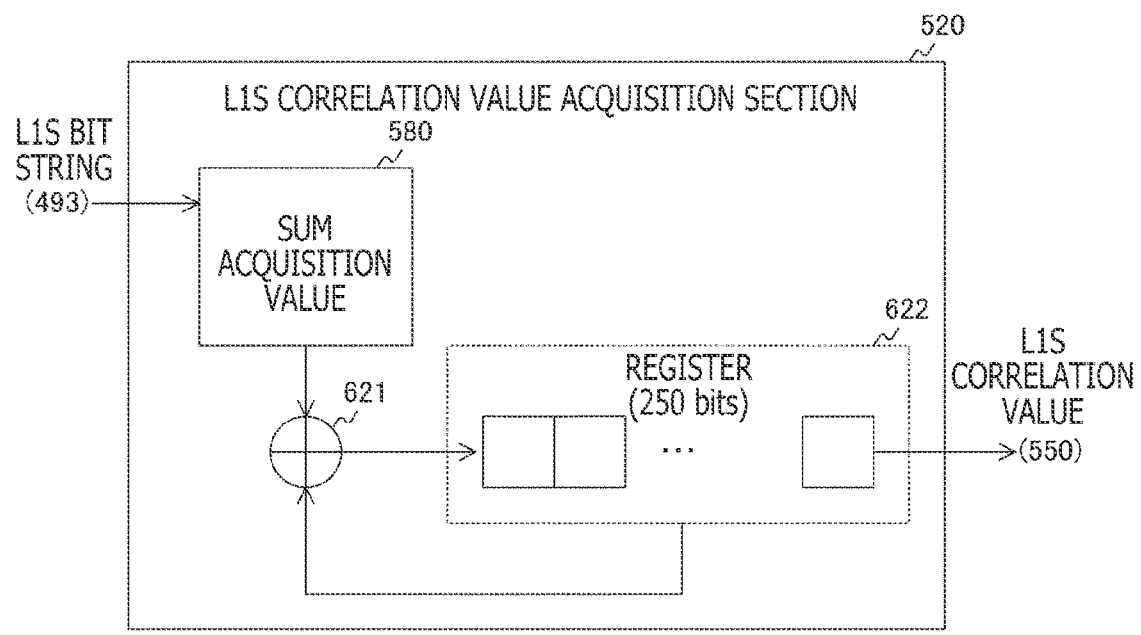
FIG. 37 is a block diagram illustrating a configuration example of an L1S correlation value acquisition section in a second modification example of the sixth embodiment of the present technology.

FIG. 37 is a block diagram illustrating a configuration example of the L1S correlation value acquisition section 520 in the second modification example of the sixth embodiment of the present technology. The L1S correlation value acquisition section 520 of the second modification example of the sixth embodiment differs from the counterpart of the first modification example of the sixth embodiment in that an adder 621 and a register 622 are further provided.

The adder 621 adds the sum from the sum acquisition section 580 and the value retained by the register 622 together and causes the register 622 to retain the sum.

The register 622 retains the sum from the adder 621. The register 622 is sized, for example, to retain three seconds worth of a cumulative sum (e.g., 250 bits). The register 622 outputs three seconds worth of a cumulative sum to the L1C/A preamble detection section 550, as an L1S correlation value.

The above configuration makes it possible for the adder 611 and the register 622 to accumulate the sums over a certain period of time and output the cumulative sum thereof as an L1S correlation value. This accumulation provides a higher level of the signal to be compared with the threshold, thus providing a better SN ratio, as compared to the case in which such accumulation is not performed. It should be noted that a circuit that includes the adder 611 and the register 622 is an example of the accumulation section set forth in the claims.

It should be noted that, although the preamble detection section 500 provides an improved SN ratio through accumulation, it is possible to provide an improved SN ratio by increasing the number of times to check whether or not the correlation value satisfies a given condition with the AND gate 553 and the like. In this case, for example, it is only necessary to add, to the L1C/A preamble detection section 550, delay circuits for delaying the two comparison result inputs to the AND gate 553 and AND gates at the first and second stages. Further, it is only necessary to input the two delayed comparison results to the AND gate at the first stage and input the output of the AND gate at the first stage and the output of the AND gate 553 to the AND gate at the second stage. A detection flag is output from the AND gate at the second stage. Also, the preamble detection section 500 can not only carry out the accumulation but also increase the number of times of checking.

As described above, according to the second modification example of the sixth embodiment of the present technology, the L1S correlation value acquisition section 520 accumulates the sum of the L1SA correlation value, the L1SB correlation value, and the L1SC correlation value, thus providing a higher level of the signal to be compared with the threshold as compared to the case in which accumulation is not performed and contributing to a better SN ratio.

7. Seventh Embodiment

In the first embodiment described above, a circuit for detecting a preamble (the preamble detection section 500) is provided for each of the satellite processing units 400. However, this configuration leads to redundant circuitry, thus resulting in an increased circuit scale. This seventh embodiment differs from the first embodiment in that the plurality of satellite processing units 400 share the preamble detection section 500.

Figure 38:
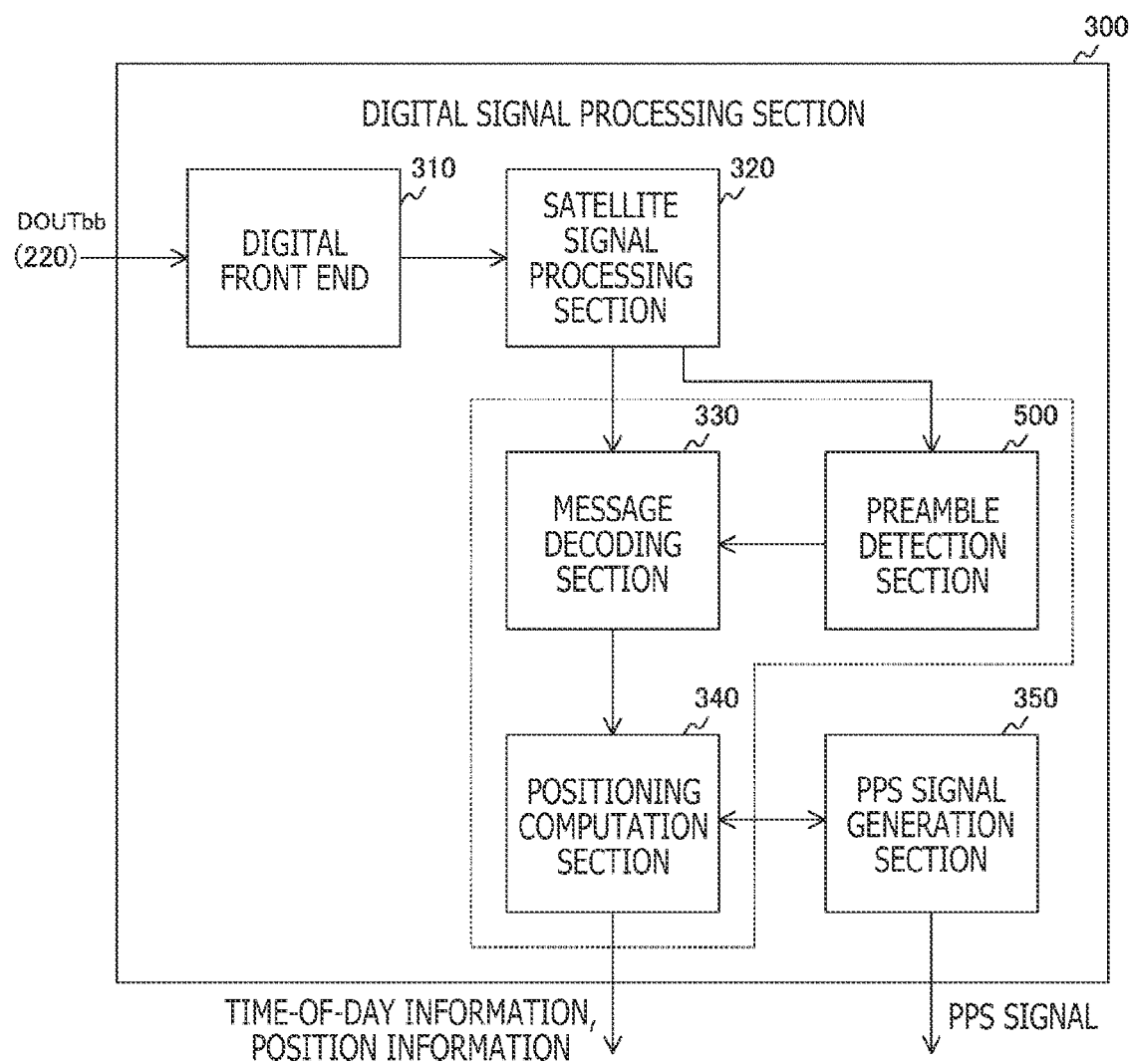
FIG. 38 is a block diagram illustrating a configuration example of a digital signal processing section in a seventh embodiment of the present technology.

FIG. 38 is a block diagram illustrating a configuration example of the digital signal processing section 300 in the seventh embodiment of the present technology. The digital signal processing section 300 differs from the counterpart of the first embodiment in that the preamble detection section 500 is provided outside the satellite signal procession section 320. The preamble detection section 500 of the seventh embodiment is realized as a result of execution of a given program by a CPU or the like. In FIG. 38, the area surrounded by a dotted line is the block realized by software.

Figure 39:
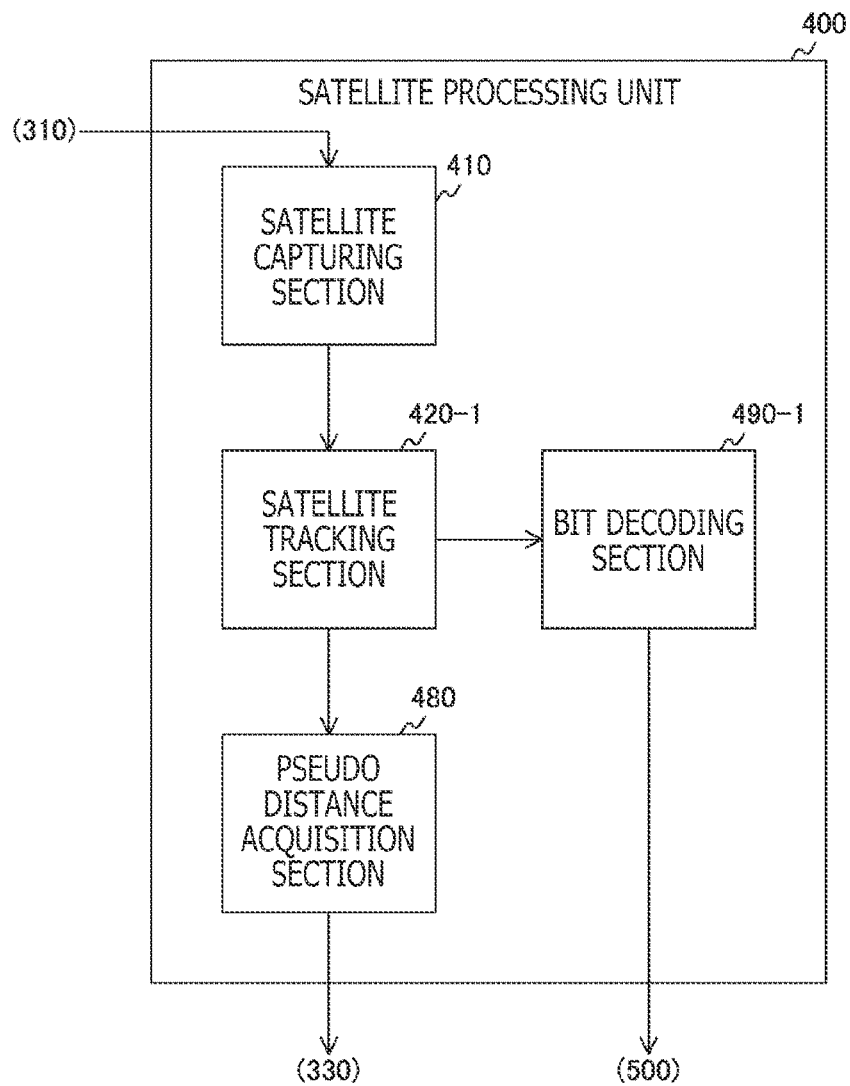
FIG. 39 is a block diagram illustrating a configuration example of a satellite processing snit in the seventh embodiment of the present technology.

FIG. 39 is a block diagram illustrating a configuration example or the satellite processing unit 400 in the seventh embodiment of the present technology. The satellite processing unit 400 of the seventh embodiment includes a satellite capturing section 410, a satellite tracking section 420-1, a pseudo distance acquisition section 480, and a bit decoding section 490-1. The satellite tracking section 420-1 can track not only an L1C/A signal from GPS but also satellite signals from GLONASS, Galileo, and QZSS. It is possible to switch from one target signal to be tracked to another by supplying the satellite tracking section 420-1 with a difference attributable to a signal format such as a spread code, as a parameter. Also, the bit decoding section 49-1 can decode not only an L1C/A signal from GPS but also satellite signals from GLONASS, Galileo, and QZSS. It is possible to switch from one target signal to be decoded to another by supplying the bit decoding section 49-1 with a difference attributable to a signal format such as a bit length, as a parameter.

Also, in the seventh embodiment, at least two of the plurality of satellite processing units 400 are assigned the same quasi-zenith satellite. One of the two satellite processing units 400 processes the L1C/A signal from the satellite whereas the other processes the L1S signal.

As described above, in the seventh embodiment of the present technology, the plurality of satellite processing units 400 share the preamble detection section 500. This achieves a reduced circuit scale of the unit as compared to the first embodiment in which the preamble detection section 400 is provided for each satellite processing unit 400.

8. Applicable Example

The technology according to the present disclosure is applicable to technologies called IoT (Internet of things). IoT is based on a mechanism in which an IoT devices 9100, which are the "things," are connected to another IoT device 9003, the Internet, a cloud 9005, and the like and exchange information therebetween to thereby control each other. IoT can be used in a variety of industries including agriculture, household, automobile, manufacturing, logistics, and energy.

Figure 40:
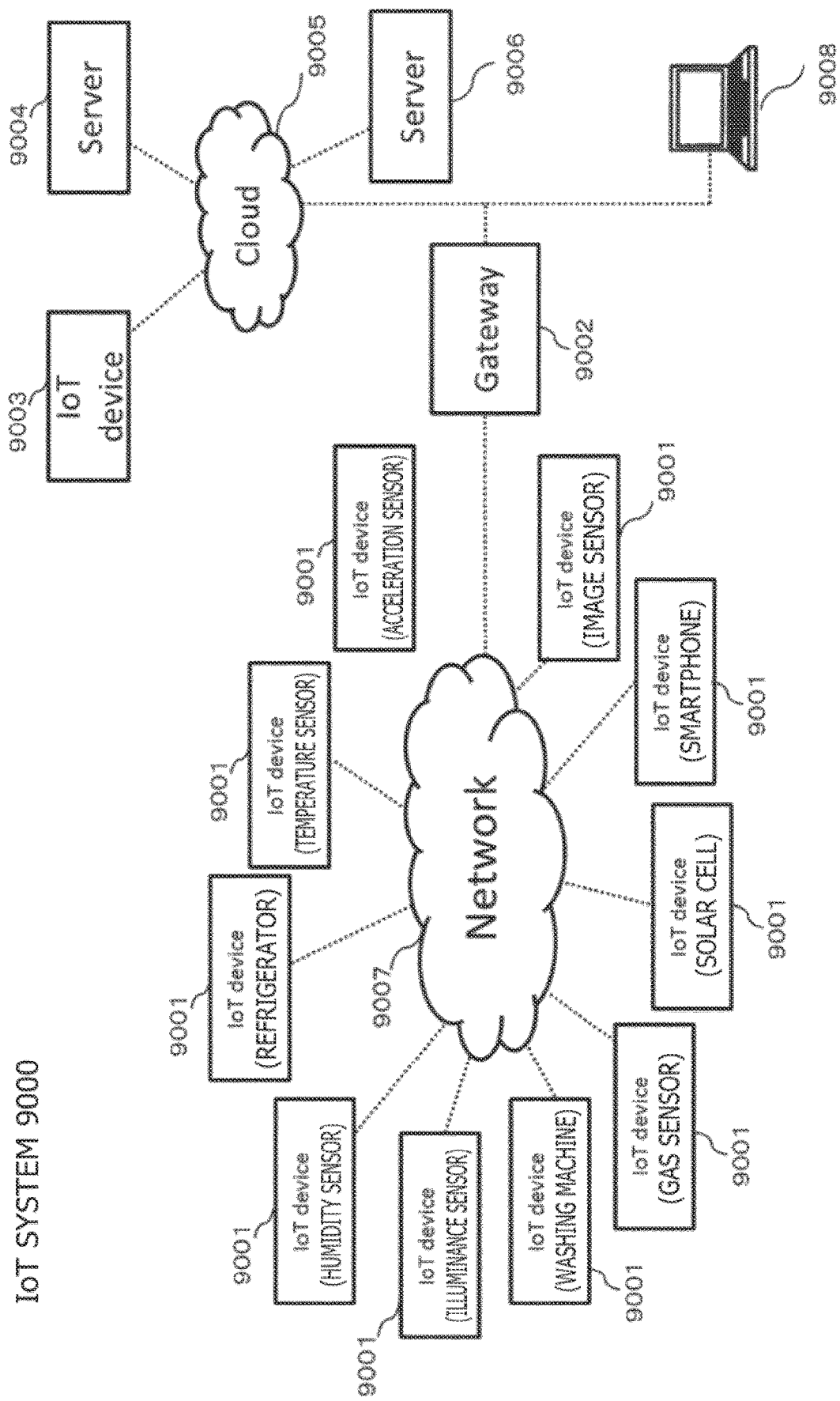
FIG. 40 is a diagram illustrating an example of a schematic configuration of as IoT system 9000 to which the technology of the present disclosure is applicable.

FIG. 40 is a diagram illustrating an example of a schematic configuration of an IoT system 9000 to which the technology according to an embodiment of the present disclosure is applicable.

The IoT devices 9001 include a variety of sensors such as temperature, humidity, illuminance, acceleration, distance, image, gas, and human sensors. Further, the IoT devices 9001 may additionally include terminals such as a smartphone, a mobile phone, a wearable terminal, and a gaming device. The IoT devices 9001 are powered, for example, by an alternating current (AC) power supply, a direct current (DC) power supply, a battery, a non-contact power supply, energy harvesting or the like. The IoT devices 9001 are capable, for example, of wired, wireless, and short-range wireless communication. Communication schemes suitably used are third-generation (3G)/LTE, wireless fidelity (Wi-Fi), institute of electrical and electronic engineers (IEEE) 802.15.4, Bluetooth, Zigbee, and Z-Wave. The IoT devices 9001 may switch between the plurality of these communication sections to achieve communication.

The IoT devices 9001 may form one-to-one, star, tree, and mesh networks. The IoT devices 9001 may connect to the external cloud 9005 directly or via a gateway 9002. An address is assigned to each of the IoT devices 9001, for example, by internet protocol version (IPv) 4, IPv6, or IPv6 over low power wireless personal area networks (6Low-PAN). Data collected from the IoT devices 9001 is sent to the other IoT device 9003, a server 9004, the cloud 9005, and so on. The timings and frequency for sending data from the IoT devices 9001 may be suitably adjusted for transmission of data in a compressed form. Such data may be used in an 'as-is' manner or analyzed by a computer 9008 by various sections such as statistical analysis, machine learning, data mining, cluster analysis, discriminant analysis, combinational analysis, and chronological analysis. Such use of data enables provision of numerous services including control, warning, monitoring, visualization, automation, and optimization.

The technology according to an embodiment of the present disclosure is also applicable to home-related devices and services. The IoT devices 9001 in homes include washing machine, drying machine, dryer, microwave oven, dish washing machine, refrigerator, oven, electric rice cooker, cooking appliances, gas appliances, fire alarm, thermostat, air-conditioner, television (TV) set, recorder, audio appliances, lighting appliances, electric water heater, hot water dispenser, vacuum cleaner, electric fan, air purifier, security camera, lock, door-shutter opener/closer, sprinkler, toilet, thermometer, weighing scale, sphygmomanometer and the like. Further, the IoT devices 9001 may include solar cell, fuel cell, storage battery, gas meter, electric power meter, and distribution panel.

A low power consumption communication scheme is desirable as a communication scheme for the IoT devices 9001 in homes. Further, the IoT devices 9001 may communicate by Wi-Fi indoors and by 3G/LTE outdoors. An external server 9006 designed to control IoT devices may be provided on the cloud 9005 to control the IoT devices 9001. The IoT devices 9001 send data including statuses of home appliances, temperature, humidity, power consumption, and presence or absence of humans and animals indoors and outdoors. Data sent from the home appliances is accumulated in the external server 9006 via the cloud 9005. New services are made available based on such data. The IoT devices 9001 designed as described above can be controlled by voice using voice recognition technologies.

In addition, direct transmission of information from the home appliances to the TV set permits visualization of the statuses of the home appliances. Further, determination of whether or not the resident is at home and transmission of data to air-conditioners and lighting appliances by various sensors makes it possible to turn the power thereof on and off. Still further, advertisements can be shown on the displays provided to various home appliances via the Internet.

An example of the IoT system 9000 to which the technology according to the present disclosure is applicable has been described above. The technology according to the present disclosure can suitably be applied to the IoT devices 9001 among the configurations described above. Specifically, the reception apparatus 200 of FIG. 1 can be applied to the IoT devices 9001. Applying the technology according to the present disclosure to the IoT devices 9001 makes it possible to prevent erroneous detection of preambles and thereby improve the reliability of the devices.

It should be noted that the above embodiments illustrate examples for realizing the present technology and that there is a correspondence between the matters in the embodiments and the matters defining the invention in the claims. Similarly, there is a correspondence between the matters defining the invention in the claims and the matters in the embodiments of the present technology having the same names. It should be noted, however, that the present technology is not limited to the embodiments and can be realized by modifying the embodiments in various ways without departing from the gist of the present technology.

Also, processing steps described in the above embodiments may be regarded as a method having a series of these steps, a program for causing a computer to perform a series of these steps, or a recording medium storing the program.

A CD (Compact Disc), an MD (MiniDisc), a DVD (Digital Versatile Disc), a memory card, a Blu-ray (registered trademark) disc, or the like can be used as this recording medium.

It should be noted that the advantageous effects described in the present specification are merely illustrative and not restrictive, and there may be other advantageous effects.

It should be noted that the present technology can also have the following configurations.

(1) A reception apparatus including:
a reception section adapted to receive a subframe including a subframe preamble and a message and a frame including a frame preamble;
a processing section adapted to perform a process of detecting presence or absence of the subframe preamble according to whether or not a given relation holds between a reception timing of the subframe preamble and a reception timing of the frame preamble; and
a message decoding section adapted to extract the message from the subframe and decode the message in a case where the presence of the subframe preamble is detected.

(2) The reception apparatus of feature (1), in which
the processing section includes
a satellite tracking section adapted to track a satellite signal from a given satellite, and
a preamble detection section adapted to detect the presence or absence of the subframe preamble according to whether or not the given relation holds on the basis of the subframe and the frame included in the satellite signal.

(3) The reception apparatus of feature (2), in which
the satellite tracking section includes
a first correlator adapted to output a first correlation output signal indicating a correlation between the satellite signal and a first code,
a first code generator adapted to generate the first code according to a first control signal,
a first numerically controlled oscillator adapted to generate the first control signal on the basis of the first correlation output signal,
a second correlator adapted to output a second correlation output signal indicating a correlation between the satellite signal and a second code,
a second code generator adapted to generate the second code according to a second control signal, and
a second numerically controlled oscillator adapted to generate the second control signal on the basis of the second correlation output signal.

(4) The reception apparatus of feature (2), in which
the satellite tracking section includes
a first correlator adapted to output a first correlation output signal indicating a correlation between the satellite signal and a first code,
a first code generator adapted to generate the first code according to a given control signal,
a second correlator adapted to output a second correlation output signal indicating a correlation between the satellite signal and a second code,
a second code generator adapted to generate the second code according to the control signal,
a correlation value addition section adapted to add the first and second correlation output signals together to output a sum signal, and
a numerically controlled oscillator adapted to generate the control signal on the basis of the sum signal.

(5) The reception apparatus of any one of features (2) to (4), in which
the preamble detection section includes
a subframe correlation value acquisition section adapted to obtain a subframe correlation value indicating a degree of similarity between a bit string obtained by delaying a bit string in the subframe and a specified value of the subframe preamble,
a frame correlation value acquisition section adapted to obtain a frame correlation value indicating a degree of similarity between a bit string obtained by delaying a bit string in the frame and a specified value of the frame preamble, and
a subframe preamble detection section adapted to detect the presence or absence of the subframe Preamble on the basis of the subframe correlation value and the frame correlation value.

(6) The reception apparatus of feature (5), in which
the subframe preamble detection section detects the presence or absence of the subframe preamble according to whether or not a condition where the subframe correlation value is equal to or larger than a first threshold and where the frame correlation value is equal to or larger than a second threshold holds.

(7) The reception apparatus of feature (5), in which
the subframe preamble detection section detects the presence or absence of the subframe preamble according to whether or not a value obtained by multiplying and adding at least either the subframe correlation value or the frame correlation value is equal to or larger than a given threshold.

(8) The reception apparatus of feature (5), in which
the subframe preamble detection section detects the presence or absence of the subframe preamble according to whether or not a condition where the larger of the subframe correlation value delayed by a certain period and the subframe correlation value that is not delayed is equal to or larger than a first threshold and where the frame correlation value is equal to or larger than a second threshold holds.

(9) The reception apparatus of any one of features (5) to (8), in which
the frame preamble includes first, second, and third frame preambles different from each other.

(10) The reception apparatus of feature (9), in which
the frame correlation value acquisition section includes
a first correlation value acquisition section adapted to obtain a first correlation value indicating a degree of similarity between a first delayed bit string obtained by delaying a bit string in the frame and a specified value of the first frame preamble;
a second correlation value acquisition section adapted to not only obtain a second correlation value indicating a degree of similarity between a second delayed bit string obtained by delaying the first delayed bit string and a specified value of the second frame preamble but also add the first and second correlation values to output a sum of the two values; and
a third correlation value acquisition section adapted to not only obtain a third correlation value indicating a degree of similarity between a third delayed bit string obtained by delaying the second delayed bit string and a specified value of the third frame preamble but also add the sum and the third correlation value together.

(11) The reception apparatus of feature (10), in which
the frame correlation value acquisition section further includes
a fourth sum acquisition section adapted to not only obtain a fourth correlation value indicating a degree of similarity between a fourth delayed bit string obtained by delaying the third delayed bit string and the specified value of the first frame preamble but also further add the fourth correlation value to the sum, a fifth correlation value acquisition section adapted to not only obtain a fifth correlation value indicating a degree of similarity between a fifth delayed bit string obtained by delaying the fourth delayed bit string and the specified value of the second frame preamble but also further add the fifth correlation value to the sum, and a sixth correlation value acquisition adapted to not only obtain a sixth correlation value indicating a degree of similarity between a sixth delayed bit string obtained by delaying the fifth delayed bit string and the specified value of the third frame preamble but also further add the sixth correlation value to the sum.

(12) The reception apparatus of feature (9), in which the frame correlation value acquisition section includes a first selector adapted to output a first delayed bit string obtained by delaying a bit string in the frame, a second delayed bit string obtained by further delaying the first delayed bit string, and a third delayed bit string obtained by further delaying the second delayed bit string, in an order consistent with a given selection signal, as first, second, and third selection signals, a first correlation value acquisition section adapted to obtain a first correlation value indicating a degree of similarity between the first selection signal and a specified value of the first frame preamble, a second correlation value acquisition section adapted to not only obtain a second correlation value indicating a degree of similarity between the second selection signal and a specified value of the second frame preamble but also add the first and second correlation values to output a sum of the two values, and a third correlation value acquisition section adapted to not only obtain a third correlation value indicating a degree of similarity between the third selection signal and a specified value of the third frame preamble but also add the sum and the third correlation value together.

(13) The reception apparatus of feature (12), in which the frame correlation value acquisition section further includes an accumulation section adapted to accumulate the sum to which the third correlation value is added.

(14) The reception apparatus of feature (12), in which the frame correlation value acquisition section includes a second selector adapted to output a fourth delayed bit string obtained by further delaying the third delayed bit string, a fifth delayed bit string obtained by further delaying the fourth delayed bit string, and a sixth delayed bit string obtained by further delaying the fifth delayed bit string, in an order consistent with a given selection signal, as fourth, fifth, and sixth selection signals, a fourth sum acquisition section adapted to not only obtain a fourth correlation value indicating a degree of similarity between the fourth selection signal and the specified value of the first frame preamble but also further add the sum and the fourth correlation value together, a fifth sum acquisition section adapted to not only obtain a fifth correlation value indicating a degree of similarity between the fifth selection signal and the specified value of the second frame preamble but also further add the sum and the fifth correlation value together, and a sixth sum acquisition section adapted to not only obtain a sixth correlation value indicating a degree of similarity between the sixth selection signal and the specified value of the third frame preamble but also further add the sum and the sixth correlation value together.

(15) The reception apparatus of feature (1), in which the processing section includes a first satellite processing unit adapted to process a first satellite signal including the subframe, a second satellite processing unit adapted to process a second satellite signal including the frame, and a preamble detection section adapted to detect the presence or absence of the subframe preamble according to whether or not the given relation holds on the basis of the subframe and the frame.

(16) The reception apparatus of any one of features (1) to (15), in which the subframe is an L1C/A subframe in QZSS (Quasi-Zenith Satellite System), and the frame is an L1S frame in the QZSS.

(17) A reception method including:

a reception step of receiving a subframe including a subframe preamble and a message and a frame including a frame preamble;

a processing step of performing a process of detecting presence or absence of the subframe preamble according to whether or not a given relation holds between a reception timing of the subframe preamble and a reception timing of the frame preamble; and a message decoding step of extracting the message from the subframe and decoding the message in a case where the presence of the subframe preamble is detected.

REFERENCE SIGNS LIST

100: Positioning satellite
200: Reception apparatus
201: Antenna
210: Crystal oscillator
220: RF circuit
221: Low-noise amplifier
222: Mixer
223: Low-pass filter
224: Phase-locked loop
225: AGC circuit
226: ADC
300: Digital signal processing section
310: Digital front end
320: Satellite signal processing section
330: Message decoding section
340: Positioning computation section
350: PPS signal generation section
400, 401, 402: Satellite processing units
410: Satellite capturing section
420, 420-1: Satellite tracking section
421: L1C/A signal tracking section
422, 436, 451: Multipliers
423, 437, 452, 453: Code correlators
424, 438, 454, 455: Code generators
425, 439, 462: Timing error detectors
426, 440, 463: Code synchronization loop filters
427, 441, 464: Code synchronization NCOs
428, 442, 466: Carrier error detectors
429, 443, 467: Carrier synchronization loop filters
430, 444, 468: Carrier synchronization NCOs
435: L1S signal tracking section
460: Shared circuit
461, 465: Correlation value addition sections
480: Pseudo distance acquisition section 490, 490-1: Bit decoding sections
491: L1C/A bit decoding section
492: Symbol decoding section
493: Convolution code decoder
500: Preamble detection section
510: L1C/A correlation value acquisition section
511, 531, 541, 554, 581, 583, 585, 601, 603, 605: Delay section
512, 532, 542, 582, 584, 586, 602, 604, 606, 622: Resisters
513, 533, 543, 588, 589, 590, 608, 609, 610: Preamble correlators
514, 526: Absolute value calculators
544, 561, 591, 592, 611, 612, 612, 613, 621: Adders
520: L1S correlation value acquisition section
521, 524: L1SC correlation value acquisition sections
522, 530: L1SA correlation value acquisition sections
523, 540: L1SB correlation value acquisition sections
550: L1C/A preamble detection section
551, 552, 563: Threshold comparators
553: AND (logical product) gate
562: Multiplier
571: Latch circuit
572: Delayed signal comparator
580, 600: Sum acquisition sections
587, 607: Selectors
9001: IoT devices

The invention claimed is:

1. A reception apparatus comprising:
a receiver configured to receive a subframe including a subframe preamble and a message and a frame including a frame preamble;
a processor configured to perform a process of detecting presence or absence of the subframe preamble according to whether or not a given relation holds between a reception timing of the subframe preamble and a reception timing of the frame preamble, the given relation being a predetermined time difference between an end reception timing of the subframe preamble and an end reception timing of the frame preamble; and
a message decoder configured to extract the message from the subframe and decode the message in a case where the presence of the subframe preamble is detected.

2. The reception apparatus of claim 1, wherein
the processor includes
a satellite tracking section configured to track a satellite signal from a given satellite, and
a preamble detection section configured to detect the presence or absence of the subframe preamble according to whether or not the given relation holds on a basis of the subframe and the frame included in the satellite signal.

3. The reception apparatus of claim 2, wherein
the satellite tracking section includes
a first correlator configured to output a first correlation output signal indicating a correlation between the satellite signal and a first code,
a first code generator configured to generate the first code according to a first control signal,
a first numerically controlled oscillator configured to generate the first control signal on a basis of the first correlation output signal,
a second correlator configured to output a second correlation output signal indicating a correlation between the satellite signal and a second code,
a second code generator configured to generate the second code according to a second control signal, and
a second numerically controlled oscillator configured to generate the second control signal on a basis of the second correlation output signal.

4. The reception apparatus of claim 2, wherein
the satellite tracking section includes
a first correlator configured to output a first correlation output signal indicating a correlation between the satellite signal and a first code,
a first code generator configured to generate the first code according to a given control signal,
a second correlator configured to output a second correlation output signal indicating a correlation between the satellite signal and a second code,
a second code generator configured to generate the second code according to the control signal,
a correlation value addition section configured to add the first and second correlation output signals together to output a sum signal, and
a numerically controlled oscillator configured to generate the control signal on a basis of the sum signal.

5. The reception apparatus of claim 2, wherein
the preamble detection section includes
a subframe correlation value acquisition section configured to obtain a subframe correlation value indicating a degree of similarity between a bit string obtained by delaying a bit string in the subframe and a specified value of the subframe preamble,
a frame correlation value acquisition section configured to obtain a frame correlation value indicating a degree of similarity between a bit string obtained by delaying a bit string in the frame and a specified value of the frame preamble, and
a subframe preamble detection section configured to detect the presence or absence of the subframe preamble on a basis of the subframe correlation value and the frame correlation value.

6. The reception apparatus of claim 5, wherein
the subframe preamble detection section detects the presence or absence of the subframe preamble according to whether or not a condition where the subframe correlation value is equal to or larger than a first threshold and where the frame correlation value is equal to or larger than a second threshold holds.

7. The reception apparatus of claim 5, wherein
the subframe preamble detection section detects the presence or absence of the subframe preamble according to whether or not a value obtained by multiplying and adding at least either the subframe correlation value or the frame correlation value is equal to or larger than a given threshold.

8. The reception apparatus of claim 5, wherein
the subframe preamble detection section detects the presence or absence of the subframe preamble according to whether or not a condition where the larger of the subframe correlation value delayed by a certain period and the subframe correlation value that is not delayed is equal to or larger than a first threshold and where the frame correlation value is equal to or larger than a second threshold holds.

9. The reception apparatus of claim 5, wherein
the frame preamble includes first, second, and third frame preambles different from each other.

10. The reception apparatus of claim 9, wherein
the frame correlation value acquisition section includes
a first correlation value acquisition section configured to obtain a first correlation value indicating a degree of similarity between a first delayed bit string obtained by delaying a bit string in the frame and a specified value of the first frame preamble, a second correlation value acquisition section configured to not only obtain a second correlation value indicating a degree of similarity between a second delayed bit string obtained by delaying the first delayed bit string and a specified value of the second frame preamble but also add the first and second correlation values together to output a sum of the two values, and a third correlation value acquisition section configured to not only, obtain a third correlation value indicating a degree of similarity between a third delayed bit string obtained by delaying the second delayed bit string and a specified value of the third frame preamble but also add the sum and the third correlation value together.

11. The reception apparatus of claim 10, wherein the frame correlation value acquisition section further includes a fourth sum acquisition section configured to not only obtain a fourth correlation value indicating a degree of similarity between a fourth delayed bit string obtained by delaying the third delayed bit string and the specified value of the first frame preamble but also further add the fourth correlation value to the sum, a fifth correlation value acquisition section configured to not only obtain a fifth correlation value indicating a degree of similarity between a fifth delayed bit string obtained by delaying the fourth delayed bit string and the specified value of the second frame preamble but also further add the fifth correlation value to the sum, and a sixth correlation value acquisition configured to not only obtain a sixth correlation value indicating a degree of similarity between a sixth delayed bit string obtained by delaying the fifth delayed bit string and the specified value of the third frame preamble but also further add the sixth correlation value to the sum.

12. The reception apparatus of claim 9, wherein the frame correlation value acquisition section includes a first selector configured to output a first delayed bit string obtained by delaying a bit string in the frame, a second delayed bit string obtained by further delaying the first delayed bit string, and a third delayed bit string obtained by further delaying the second delayed bit string, is an order consistent with a given selection signal, as first, second, and third selection signals, a first correlation value acquisition section configured to obtain a first correlation value indicating a degree of similarity between the first selection signal and a specified value of the first frame preamble, a second correlation value acquisition section configured to not only obtain a second correlation value indicating a degree of similarity between the second selection signal and a specified value of the second frame preamble but also add the first and second correlation values together to output a sum of the two values, and a third correlation value acquisition section configured to not only obtain a third correlation value indicating a degree of similarity between the third selection signal and a specified value of the third frame preamble but also add the sum and the third correlation value together.

13. The reception apparatus of claim 12, wherein the frame correlation value acquisition section further includes an accumulation section configured to accumulate the sum to which the third correlation value is added.

14. The reception apparatus of claim 12, wherein the frame correlation value acquisition section includes a second selector configured to output a fourth delayed bit string obtained by further delaying the third delayed bit string, a fifth delayed bit string obtained by further delaying the fourth delayed bit string, and a sixth delayed bit string obtained by further delaying the fifth delayed bit string, is an order consistent with a given selection signal, as fourth, fifth, and sixth selection signals, a fourth sum acquisition section configured to not only obtain a fourth correlation value indicating a degree of similarity between the fourth selection signal and the specified value of the first frame preamble but also further add the sum and the fourth correlation value together, a fifth sum acquisition section configured to not only obtain a fifth correlation value indicating a degree of similarity between the fifth selection signal and the specified value of the second frame preamble but also further add the sum and the fifth correlation value together, and a sixth sum acquisition section configured to not only obtain a sixth correlation value indicating a degree of similarity between the sixth selection signal and the specified value of the third frame preamble but also further add the sum and the sixth correlation value together.

15. The reception apparatus of claim 1, wherein the processor includes a first satellite processing unit configured to process a first satellite signal including the subframe;

a second satellite processing unit configured to process a second satellite signal including the frame; and a preamble detection section configured to detect the presence or absence of the subframe preamble according to whether or not the given relation holds on a basis of the subframe and the frame.

16. The reception apparatus of claim 1, wherein the subframe is an L1C/A subframe in QZSS (Quasi-Zenith Satellite System), and the frame is an L1S frame in the QZSS.

17. A reception method comprising:

receiving a subframe including a subframe preamble and a message and a frame including a frame preamble;

performing a process of detecting presence or absence of the subframe preamble according to whether or not a given relation holds between a reception timing of the subframe preamble and a reception timing of the frame preamble, the given relation being a predetermined time difference between an end reception timing of the subframe preamble and an end reception timing of the frame preamble; and extracting the message from the subframe and decoding the message in a case where the presence of the subframe preamble is detected.

18. The reception method according to claim 17, further comprising:

tracking a satellite signal from a given satellite; and detecting the presence or absence of the subframe preamble according to whether or not the given relation holds on a basis of the subframe and the frame included in the satellite signal.

19. A non-transitory computer readable medium storing program code for receiving and decoding a message, the program code being executable by a processor to perform operations comprising:

receiving a subframe including a subframe preamble and the message and a frame including a frame preamble;

performing a process of detecting presence or absence of the subframe preamble according to whether or not a given relation holds between a reception timing of the subframe preamble and a reception timing of the frame preamble, the given relation being a predetermined time difference between an end reception timing of the subframe preamble and an end reception timing of the frame preamble; and extracting the message from the subframe and decoding the message in a case where the presence of the subframe preamble is detected.

20. The non-transitory computer readable medium according to claim 19, wherein the operations further comprise:

tracking a satellite signal from a given satellite; and detecting the presence or absence of the subframe preamble according to whether or not the given relation holds on a basis of the subframe and the frame included in the satellite signal.

\* \* \* \* \*